(12) United States Patent
Kusaka

(10) Patent No.: US 7,586,588 B2
(45) Date of Patent: Sep. 8, 2009

(54) CORRELATION OPERATION METHOD, CORRELATION OPERATION DEVICE, FOCUS DETECTION DEVICE AND IMAGING DEVICE

(75) Inventor: Yosuke Kusaka, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 11/798,275

(22) Filed: May 11, 2007

(65) Prior Publication Data

US 2007/0269127 A1    Nov. 22, 2007

(30) Foreign Application Priority Data

May 17, 2006   (JP)   ............... 2006-137288
May 17, 2006   (JP)   ............... 2006-137289
Nov. 6, 2006   (JP)   ............... 2006-300607

(51) Int. Cl.
*G01N 21/00* (2006.01)
(52) U.S. Cl. ...................................... 356/30
(58) Field of Classification Search ........... 356/3.01–22
See application file for complete search history.

(56) References Cited

U.S. PATENT DOCUMENTS 6,768,540 B2   7/2004   Kanemitsu

2005/0129393 A1 *   6/2005   Mihara et al. ............... 396/128

FOREIGN PATENT DOCUMENTS

| JP | A-04-338905 | 11/1992 |
| JP | B2-06-025820 | 4/1994 |
| JP | B2-07-050241 | 5/1995 |

\* cited by examiner

*Primary Examiner*—Thomas H Tarcza
*Assistant Examiner*—Luke D Ratcliffe
(74) *Attorney, Agent, or Firm*—Oliff & Berridge, PLC

(57) ABSTRACT

A correlation operation method adopted when calculating a degree of correlation manifesting between a first signal data string and a second signal data string, includes: a first information generation step of generating first operation data by calculating a product of first data in the first signal data string and nearby data present near second data in the second signal data string which correspond to the first data; a second information generation step of generating second operation data by calculating a product of the second data in the second signal data string and nearby data present near the first data in the first signal data string; and a correlation degree detection step of calculating a degree of correlation between the first operation data and the second operation data.

57 Claims, 61 Drawing Sheets

FIG. 40

FOCUS DETECTION OPERATION PROCESSING

S310: GENERATE FIRST DATA STRING AND SECOND DATA STRING BY EXECUTING HIGH-FREQUENCY CUT FILTER PROCESSING ON PAIR OF DATA STRINGS FROM FOCUS DETECTION PIXELS

S315: GENERATE FIRST' DATA STRING AND SECOND' DATA STRING BY SUBTRACTING CORRESPONDING AVERAGE VALUES FROM FIRST DATA STRING AND SECOND DATA STRING

S320: SHIFT FIRST DATA STRING AND SECOND DATA STRING RELATIVE TO EACH OTHER BY PREDETERMINED EXTENT

S330: MULTIPLY DATA OBTAINED BY EXECUTING FIRST ARITHMETIC OPERATION ON DATA IN FIRST DATA STRING OVER MINISCULE RANGE BY DATA OBTAINED BY EXECUTING SECOND ARITHMETIC OPERATION ON DATA IN SECOND DATA STRING OVER MINISCULE RANGE SO AS TO GENERATE FIRST ARITHMETIC OPERATION DATA

S340: MULTIPLY DATA OBTAINED BY EXECUTING FIRST ARITHMETIC OPERATION ON DATA IN SECOND DATA STRING OVER MINISCULE RANGE BY DATA OBTAINED BY EXECUTING SECOND ARITHMETIC OPERATION ON DATA IN FIRST DATA STRING OVER MINISCULE RANGE SO AS TO GENERATE SECOND ARITHMETIC OPERATION DATA

S350: DETERMINE CORRELATION BETWEEN FIRST DATA STRING AND SECOND DATA STRING BY CALCULATING ABSOLUTE VALU REPRESENTING DIFFERENCE BETWEEN FIRST OPERATION DATA AND SECOND ARITHMETIC OPERATION DATA

S360: REPEATEDLY EXECUTE PROCESSING IN S330 ~ S350 BY SHIFTING MINISCULE RANGE AND CALCULATE SUM OF ABSOLUTE VALUES REPRESENTING DIFFERENCES AT PREDETERMINED SHIFT QUANTITY

S370: CALCULATE SUM OF ABSOLUTE VALUES IN CORRESPONDENCE TO VARIOUS SHIFT QUANTITIES BY REPEATEDLY EXECUTING PROCESSING IN S320 ~ S360 OVER PREDETERMINED SHIFT QUANTITY RANGE

S380: DETERMINE THROUGH INTERPOLATION SHIFT QUANTITY THAT PROVIDES MAXIMUM LEVEL OF CORRELATION BASED UPON VALUE REPRESENTING SUM OF ABSOLUTE VALUES OF DIFFERENCES CORRESPONDING TO SHIFT QUANTITY AT WHICH SUM OF ABSOLUTE VALUES OF DIFFERENCES ASSUMES SMALLEST VALUE IN COMBINATION WITH VALUES REPRESENTING SUM OF ABSOLUTE VALUES OF DIFFERENCES CORRESPONDING TO THE SHIFT QUANTITY SLIGHTLY LESS OR SLIGHTLY MORE THAN THE SHIFT QUANTITY

S390: CALCULATE DEFOCUS AMOUNT BY MULTIPLYING SHIFT QUANTITY CORRESPONDING TO MAXIMUM LEVEL OF CORRELATION BY PREDETERMINED CONVERSION COEFFICIENT

S400: RETURN

CORRELATION OPERATION METHOD, CORRELATION OPERATION DEVICE, FOCUS DETECTION DEVICE AND IMAGING DEVICE

INCORPORATION BY REFERENCE

The disclosures of the following priority applications are herein incorporated by reference:
Japanese Patent Application No. 2006-137288 filed May 17, 2006
Japanese Patent Application No. 2006-137289 filed May 17, 2006
Japanese Patent Application No. 2006-300607 filed Nov. 6, 2006

BACKGROUND OF THE INVENTION

1. Field of the Invention

The present invention relates to a correlation operation method and a correlation operation device to be adopted when determining through an arithmetic operation a correlational relationship that exists among a plurality of signal data strings. It also relates to a focus detection device and an imaging device adopting the correlation operation method and the correlation operation device.

2. Description of Related Art

There are devices known in the related art that determine through an arithmetic operation the correlation between a pair of electrical signal data strings output from a pair of photoelectric conversion element arrays on which optical images of a target object are formed. For instance, there is a focus detection device that receives at image sensors a pair of light fluxes having passed through different areas of an exit pupil plane of a photographic optical system, converts a pair of optical images formed on the image sensor to a pair of electrical signal data strings and detects the focus adjustment state at the photographic optical system by determining through an arithmetic operation the correlation between the signal data strings (see Japanese Laid Open Patent Publication No. H04-338905.

SUMMARY OF THE INVENTION

In the correlation operation method in the related art described above, the pair of signal data strings $A_1, A_2, \ldots A_N$ and $B_1, B_2, \ldots B_N$ (N indicates the number of sets of data) are compared with each other by varying a shift quantity k and a correlation quantity C(k) indicating the level of correlation between the two signal data strings is calculated simply by determining a total sum $\Sigma |A_N - B_{n+k}|$ representing the total sum of the absolute values of differences between the two signal data strings. Thus, a problem arises in that the correlation between the two signal data strings cannot be detected accurately if, for instance, an "eclipse" attributable to the photographic optical system occurs in either of the pair of light fluxes and a relative distortion occurs with regard to the pair of signal data strings output from the image sensor.

According to the 1st aspect of the present invention, a correlation operation method adopted when calculating a degree of correlation manifesting between a first signal data string and a second signal data string, comprises: a first information generation step of generating first operation data by calculating a product of first data in the first signal data string and nearby data present near second data in the second signal data string which correspond to the first data; a second information generation step of generating second operation data by calculating a product of the second data in the second signal data string and nearby data present near the first data in the first signal data string; and a correlation degree detection step of calculating a degree of correlation between the first operation data and the second operation data.

According to the 2nd aspect of the present invention, in the correlation operation method according to the 1st aspect, it is preferred that the first signal data string and the second signal data string are each a signal data string corresponding to signals output from an image sensor.

According to the 3rd aspect of the present invention, in the correlation operation method according to the 1st aspect, it is preferred that the first information generation step and the second information generation step are executed after processing for eliminating a high frequency component from the first signal data string and the second signal data string is executed.

According to the 4th aspect of the present invention, in the correlation operation method according to the 1st aspect, it is preferred that: there is further provided an average value subtraction step of subtracting an average value corresponding to the first data from the first data in the first signal data string and subtracting an average value corresponding to the second data from the second data in the second signal data string; and the first operation data and the second operation data are generated respectively through the first information generation step and the second information generation step by using the first signal data string and the second signal data string having undergone the average value subtraction step.

According to the 5th aspect of the present invention, an correlation operation method adopted when calculating a degree of correlation manifesting between a first signal data string and a second signal data string, comprises: a first information generation step of generating first operation data by calculating a product of first data in the first signal data string and nearby data present near second data in the second signal data string which correspond to the first data; a second information generation step of generating second operation data by calculating a product of the second data in the second signal data string and nearby data present near the first data in the first signal data string; and a correlation degree detection step of calculating a degree of correlation between the first operation data and the second operation data by calculating an absolute value representing a difference between the first operation data and the second arithmetic operation data.

According to the 6th aspect of the present invention, in the correlation operation method according to the 5th aspect, it is preferred that: the first information generation step and the second information generation step are both executed by sequentially switching data used as the first data in the first signal data string; and in the correlation degree detection step, a sum of absolute values representing differences between the first operation data and the second operation data is calculated.

According to the 7th aspect of the present invention, in the correlation operation method according to the 6th aspect, it is preferred that: the first information generation step and the second information generation step are both executed by shifting the first signal data string and the second signal data string relative to each other along a direction in which data are strung in the data strings; and in the correlation degree detection step, the degree of correlation between the first operation data and the second operation data is calculated by sequentially altering an extent to which the first signal data string and the second signal data string are shifted relative to each other.

According to the 8th aspect of the present invention, in the correlation operation method according to the 7th aspect, it is preferred that in the correlation degree detection step, a shift quantity between the first signal data string and the second signal data string is detected based upon the extent to which the first signal data string and the second signal data string are shifted relative to each other when the degree of correlation peaks.

According to the 9th aspect of the present invention, a correlation operation method adopted when calculating a degree of correlation manifesting between a first signal data string and a second signal data string, comprises: a first information generation step of obtaining operation data by executing a first arithmetic operation on first data and nearby data present near the first data in the first signal data string, obtaining operation data by executing a second arithmetic operation on second data in the second signal data string corresponding to the first data and nearby data present near the second data in the second signal data string, and obtaining first operation data by calculating a product of the two types of operation data thus obtained; a second information generation step of obtaining operation data by executing the first arithmetic operation on the second data and the nearby data in the second signal data string, obtaining operation data by executing the second arithmetic operation on the first data and the nearby data in the first signal data string, and obtaining second operation data by calculating a product of the two types of operation data thus obtained; and a correlation degree detection step of calculating a degree of correlation between the first operation data and the second operation data.

According to the 10th aspect of the present invention, in the correlation operation method according to the 9th aspect, it is preferred that the first arithmetic operation is addition and subtraction executed on the first data and the nearby data present near the first data or addition and subtraction executed on the second data and the nearby data present near the second data.

According to the 11th aspect of the present invention, in the correlation operation method according to the 9th aspect, it is preferred that the second arithmetic operation is an operation for calculating a sum of the first data and the nearby data present near the first data or an operation for calculating a sum of the second data and the nearby data present near the second data.

According to the 12th aspect of the present invention, in the correlation operation method according to the 9th aspect, it is preferred that the second arithmetic operation is an averaging operation for averaging the first data and the corresponding nearby data or an averaging operation for averaging the second data and the corresponding nearby data.

According to the 13th aspect of the present invention, in the correlation operation method according to the 9th aspect, it is preferred that the first arithmetic operation is a differentiation executed on the first data and the nearby data present near the first data or a differentiation executed on the second data and the nearby data present near the second data.

According to the 14th aspect of the present invention, in the correlation operation method according to the 9th aspect, it is preferred that in the correlation degree detection step, an absolute value representing a difference between the first operation data and the second operation data is calculated.

According to the 15th aspect of the present invention, a correlation operation device that calculates a degree of correlation manifesting between a first signal data string and a second signal data string, comprises: a first information generation unit that generates first operation data by calculating a product of first data in the first signal data string and nearby data present near second data in the second signal data string which correspond to the first data; a second information generation unit that generates second operation data by calculating a product of the second data in the second signal data string and nearby data present near the first data in the first signal data string; and a correlation degree detection unit that calculates a degree of correlation between the first operation data and the second arithmetic operation data.

According to the 16th aspect of the present invention, a correlation operation device that calculates a degree of correlation manifesting between a first signal data string and a second signal data string, comprises: a first information generation unit that obtains operation data by executing a first arithmetic operation on first data and nearby data present near the first data in the first signal data string, obtains operation data by executing a second arithmetic operation on second data corresponding to the second data in the second signal data string corresponding to the first data and nearby data present near the second data in the second signal data string, and obtains first operation data by calculating a product of the two types of operation data thus obtained; a second information generation unit that obtains operation data by executing the first arithmetic operation on the second data and the nearby data present near the second data in the second signal data string, obtains operation data by executing the second arithmetic operation on the first data and the nearby data present near the first data in the first signal data string and obtains second operation data by calculating a product of the two types of operation data thus obtained; and a correlation degree detection unit that calculates a degree of correlation between the first operation data and the second arithmetic operation data.

According to the 17th aspect of the present invention, in the correlation operation device according to the 15th aspect, it is preferred that there is further provided a subtraction unit that subtracts an average value corresponding to the first data from the first data in the first signal data string and subtracts an average value corresponding to the second data from the second data in the second signal data string; and the first information generating unit and the second information generating unit respectively generate the first operation data and the second operation data by using the first signal data string and the second signal data string having undergone an average value subtraction.

According to the 18th aspect of the present invention, a focus detection device, comprises; a photoelectric conversion element that receives light fluxes having passed through a pair of pupil areas of a photographic optical system via a focus detection optical system and outputs a pair of subject image signals; an image shift detection unit that detects an image shift quantity between the pair of subject image signals by executing a correlation operation adopting a correlation operation method according to the 1st aspect on the pair of subject image signals output from the photoelectric conversion element; and a focus detection unit that detects a state of focus adjustment achieved at the photographic optical system based upon the image shift quantity.

According to the 19th aspect of the present invention, in the focus detection device according to the 18th aspect, it is preferred that the focus detection optical system is an image reforming optical system that reforms an image formed on an predetermined focal plane of the photographic optical system onto the photoelectric conversion element.

According to the 20th aspect of the present invention, a focus detection device comprises: a micro-lens; a photoelectric conversion element disposed in correspondence to the micro-lens, which receives via the micro-lens light fluxes having passed through a pair of pupil areas of a photographic optical system and outputs a pair of subject image signals; an image shift detection unit that detects an image shift quantity between the pair of subject image signals output from the photoelectric conversion element by executing a correlation operation adopting a correlation operation method according to the 1st aspect on the pair of subject image signals; and a focus detection unit that detects a state of focus adjustment achieved at the photographic optical system based upon the image shift quantity.

According to the 21st aspect of the present invention, a range-finding device, comprises: a pair of photoelectric conversion elements that receive image light fluxes from a subject via a pair of optical systems; an image shift detection unit that detects an image shift quantity between the pair of subject image signals output from the pair of photoelectric conversion elements by executing a correlation operation adopting a correlation operation method according to the 1st aspect on the pair of subject image signals; and a range-finding unit that measures a distance to the subject based upon the image shift quantity.

According to the 22nd aspect of the present invention, an imaging device comprises: a photoelectric conversion element that receives light fluxes having passed through a pair of pupil areas of a photographic optical system via a focus detection optical system and outputs a pair of subject image signals; an image shift detection unit that detects an image shift quantity between the pair of subject image signals by executing a correlation operation adopting a correlation operation method according to the 1st aspect on the pair of subject image signals output from the photoelectric conversion element; a focus detection unit that detects a state of focus adjustment achieved at the photographic optical system based upon the image shift quantity; and an image sensor that captures a subject image via the photographic optical system.

According to the 23rd aspect of the present invention, a correlation operation method adopted when calculating a degree of correlation manifesting between a first signal data string and a second signal data string, comprises: a first information generation step of generating first operation data and second operation data respectively by executing a first arithmetic operation or a second arithmetic operation on at least one of first data in the first signal data string and nearby data present near the first data in the first signal data string, and generating third operation data by dividing the first operation data by the second operation data; a second information generation step of generating fourth operation data and fifth operation data respectively by executing the first arithmetic operation or the second arithmetic operation on at least one of second data in the second signal data string corresponding to the first data and nearby data present near the second data in the second signal data string, and generating sixth operation data by dividing the fourth operation data by the fifth operation data; and a correlation degree detection step of calculating a degree of correlation between the third operation data and the sixth operation data.

According to the 24th aspect of the present invention, in the correlation operation method according to the 23rd aspect, it is preferred that the first signal data string and the second signal data string are each a signal data string corresponding to signals output from an image sensor.

According to the 25th aspect of the present invention, in the correlation operation method according to the 23rd aspect, it is preferred that the first information generation step and the second information generation step are executed after processing for eliminating a high frequency component from the first signal data string and the second signal data string is executed.

According to the 26th aspect of the present invention, in the correlation operation method according to the 23rd aspect, it is preferred that the first arithmetic operation is addition and subtraction executed on the first data and the nearby data present near the first data or addition and subtraction executed on the second data and the nearby data present near the second data.

According to the 27th aspect of the present invention, in the correlation operation method according to the 23rd aspect, it is preferred that the first arithmetic operation is a differentiation executed on the first data and the nearby data present near the first data or a differentiation executed on the second data and the nearby data present near the second data.

According to the 28th aspect of the present invention, in the correlation operation method according to the 23th aspect, it is preferred that the second arithmetic operation is an operation for calculating the sum of the first data and the nearby data present near the first data or an operation for calculating the sum of the second data and the nearby data present near the second data.

According to the 29th aspect of the present invention, in the correlation operation method according to the 23th aspect, it is preferred that the second arithmetic operation is an averaging operation for averaging the first data and the nearby data present near the first data or an averaging operation for averaging the second data and the nearby data present near the second data.

According to the 30th aspect of the present invention, in the correlation operation method according to the 23rd aspect, it is preferred that in the correlation degree detection step, the degree of correlation between the third operation data and the sixth operation data is weighted in correspondence to a smaller value among values indicated by the second operation data and the fifth operation data.

According to the 31st aspect of the present invention, a correlation operation method adopted when calculating a degree of correlation manifesting between a first signal data string and a second signal data string, comprises: a first information generation step generating first operation data and second operation data respectively by executing a first arithmetic operation or a second arithmetic operation on at least one of first data in the first signal data string and nearby data present near the first data in the first signal data string, and generating third operation data by dividing the first operation data by the second arithmetic operation data: a second information generation step of generating fourth operation data and fifth operation data respectively by executing the first arithmetic operation or the second arithmetic operation on at least one of second data in the second signal data string corresponding to the first data and nearby data present near the second data in the second signal data string, and generating sixth operation data by dividing the fourth operation data by the fifth operation data; and a correlation degree detection step of calculating a degree of correlation between the third operation data and the sixth operation data by calculating an absolute value of a difference between the third operation data and the sixth operation data.

According to the 32nd aspect of the present invention, in the correlation operation method according to the 31st aspect, it is preferred that: the first information generation step and the second information generation step are both executed by sequentially switching data used as the first data in the first signal data string; and in the correlation degree detection step, a sum of absolute values representing differences between the third operation data and the sixth operation data is calculated.

According to the 33rd aspect of the present invention, in the correlation operation method according to the 32nd aspect, it is preferred that: the first information generation step and the second information generation step are both executed by shifting the first signal data string and the second signal data string relative to each other along a direction in which data are strung in the data strings; and in the correlation degree detection step, the degree of correlation between the third operation data and the sixth operation data is calculated by sequentially altering an extent to which the first signal data string and the second signal data string are shifted relative to each other.

According to the 34th aspect of the present invention, in the correlation operation method according to the 33rd aspect, it is preferred that in the correlation degree detection step, a shift quantity between the first signal data string and the second signal data string is detected based upon the extent to which the first signal data string and the second signal data string are shifted relative to each other when the degree of correlation peaks.

According to the 35th aspect of the present invention, a correlation operation device that calculates a degree of correlation manifesting between a first signal data string and a second signal data string, comprises: a first information generation unit that generates first operation data and second operation data respectively by executing a first arithmetic operation or a second arithmetic operation on at least one of first data in the first signal data string and nearby data present near the first data in the first signal data string and generates third operation data by dividing the first operation data by the second arithmetic operation data; a second information generation unit that generates fourth operation data and fifth operation data respectively by executing the first arithmetic operation or the second arithmetic operation on at least one of second data in the second signal data string corresponding to the first data and nearby data present near the second data in the second signal data string and generates sixth operation data by dividing the fourth operation data by the fifth operation data; and a correlation degree detection unit that calculates a degree of correlation between the third operation data and the sixth operation data.

According to the 36th aspect of the present invention, a correlation operation method adopted when calculating a degree of correlation manifesting between a first signal data string and a second signal data string, comprises: a first information generation step of generating first operation data by executing a first arithmetic operation on at least one of first data in the first signal data string and nearby data present near the first data in the first signal data string, generating second operation data by executing the first arithmetic operation on at least one of second data in the second signal data string corresponding to the first data and nearby data present near the second data in the second signal data string, and generating third operation data by dividing the first operation data by the second arithmetic operation data; a second information generation step of generating fourth operation data by executing a second arithmetic operation on at least one of the first data and nearby data present near the first data in the first signal data string, generating fifth operation data by executing the second arithmetic operation on at least one of the second data and nearby data present near the second data in the second signal data string, and generating sixth operation data by dividing the fourth operation data by the fifth operation data; and a correlation degree detection step of calculating a degree of correlation between the third operation data and the sixth operation data.

According to the 37th aspect of the present invention, in the correlation operation method according to the 36th aspect, it is preferred that the first arithmetic operation and the second arithmetic operation are addition and subtraction executed on the first data and the nearby data present near the first data or addition and subtraction executed on the second data and the nearby data present near the second data.

According to the 38th aspect of the present invention, in the correlation operation method according to the 37th aspect, it is preferred that in the correlation degree detection step, the degree of correlation between the third operation data and the sixth operation data is weighted in correspondence to a smaller value among values indicated by the second operation data and the fifth operation data.

According to the 39th aspect of the present invention, in the correlation operation method according to the 38th aspect, it is preferred that the first arithmetic operation and the second arithmetic operation each include a differentiation executed on the first data and the nearby data present near the first data or a differentiation executed on the second data and the nearby data present near the second data.

According to the 40th aspect of the present invention, in the correlation operation method according to the 39th aspect, it is preferred that in the correlation degree detection step, an absolute value representing a difference between the third operation data and the sixth operation data is calculated.

According to the 41st aspect of the present invention, in the correlation operation method according to the 40th aspect, it is preferred that: the first information generation step and the second information generation step are both executed by sequentially switching data used as the first data in the first signal data string; and in the correlation degree detection step, a sum of absolute values representing differences between the third operation data and the sixth operation data is calculated.

According to the 42nd aspect of the present invention, in the correlation operation method according to the 41st aspect, it is preferred that: the first information generation step and the second information generation step are both executed by shifting the first signal data string and the second signal data string relative to each other along a direction in which data are strung in the data strings; and in the correlation degree detection step, the degree of correlation between the third operation data and the sixth operation data is calculated by sequentially altering an extent to which the first signal data string and the second signal data string are shifted relative to each other.

According to the 43rd aspect of the present invention, in the correlation operation method according to the 42nd aspect, it is preferred that in the correlation degree detection step, a shift quantity between the first signal data string and the second signal data string is detected based upon the extent to which the first signal data string in the second signal data string are shifted relative to each other when the degree of correlation degree peaks.

According to the 44th aspect of the present invention, in the correlation operation method according to the 36th aspect, it is preferred that the first signal data string and the second signal data string are each a signal data string corresponding to signals output from an image sensor.

According to the 45th aspect of the present invention, in the correlation operation method according to the 36th aspect, it is preferred that the first information generation step and the second information generation step are executed after processing for eliminating a high frequency component from the first signal data string and the second signal data string is executed.

According to the 46th aspect of the present invention, a correlation operation device that calculates a degree of correlation manifesting between a first signal data string and a second signal data string, comprises: a first information generation unit that generates first operation data by executing a first arithmetic operation on at least one of first data in the first signal data string and nearby data present near the first data in the first signal data string, generates second operation data by executing the first operation data on at least one of second operation data in the second signal data string corresponding to the first data and nearby data present near the second data in the second signal data string, and generates third operation data by dividing the first operation data by the second arithmetic operation data; a second information generation unit that generates fourth operation data by executing a second arithmetic operation on at least one of the first data and nearby data present near the first data in the first signal data string, generates fifth operation data by executing the second arithmetic operation on at least one of the second data and nearby data present near the second data in the second signal data string, and generates sixth operation data by dividing the fourth operation data by the fifth operation data; and a correlation degree detection unit that calculates a degree of correlation between the third operation data and the sixth operation data.

According to the 47th aspect of the present invention, a focus detection device, comprises: a photoelectric conversion element that receives light fluxes having passed through a pair of pupil areas of a photographic optical system via a focus detection optical system and outputs a pair of subject image signals; an image shift detection unit that detects an image shift quantity indicating an extent of image shift manifested by the pair of subject image signals by executing a correlation operation adopting a correlation operation method according to the 23rd aspect on the pair of subject image signals output from the photoelectric conversion unit; and a focus detection unit that detects a state of focus adjustment achieved at the photographic optical system based upon the image shift quantity.

According to the 48th aspect of the present invention, a focus detection device, comprises: a photoelectric conversion element that receives light fluxes having passed through a pair of pupil areas of a photographic optical system via a focus detection optical system and outputs a pair of subject image signals; an image shift detection unit that detects an image shift quantity indicating an extent of image shift manifested by the pair of subject image signals by executing a correlation operation adopting a correlation operation method according to the 36th aspect on the pair of subject image signals output from the photoelectric conversion unit; and a focus detection unit that detects a state of focus adjustment achieved at the photographic optical system based upon the extent of image shift.

According to the 49th aspect of the present invention, a focus detection device, comprises: a micro-lens; a photoelectric conversion element disposed in correspondence to the micro-lens, which receives via the micro-lens light fluxes having passed through a pair of pupil areas of a photographic optical system and outputs a pair of subject image signals; an image shift detection unit that detects an image shift quantity indicating an extent of image shift manifested by the pair of subject image signals output from the photoelectric conversion element by executing a correlation operation adopting a correlation operation method according to the 23rd aspect on the pair of subject image signals; and a focus detection unit that detects a state of focus adjustment achieved at the photographic optical system based upon the image shift quantity.

According to the 50th aspect of the present invention, a focus detection device, comprises: a micro-lens; a photoelectric conversion element disposed in correspondence to the micro-lens, which receives via the micro-lens light fluxes having passed through a pair of pupil areas of a photographic optical system and outputs a pair of subject image signals; an image shift detection unit that detects an image shift quantity indicating an extent of image shift manifested by the pair of subject image signals output from the photoelectric conversion element by executing an operation adopting a correlation operation method according to the 36th aspect on the pair of subject image signals; and a focus detection unit that detects a state of focus adjustment achieved at the photographic optical system based upon the image shift quantity.

According to the 51st aspect of the present invention, in the focus detection device according to the 47th aspect, it is preferred that the focus detection optical system is an image reforming optical system that reforms an image formed on an predetermined focal plane of the photographic optical system onto the photoelectric conversion element.

According to the 52nd aspect of the present invention, in the focus detection device according to the 48th aspect, it is preferred that the focus detection optical system is an image reforming optical system that reforms an image formed on an predetermined focal plane of the photographic optical system onto the photoelectric conversion element.

According to the 53rd aspect of the present invention, a range-finding device, comprises: a pair of photoelectric conversion elements that receive image light fluxes from a subject via a pair of optical systems: an image shift detection unit that detects an image shift quantity indicating an extent of image shift manifested by the pair of subject image signals output from the pair of photoelectric conversion unit by executing a correlation operation adopting a correlation operation method according to the 23rd aspect on the pair of subject image signals; and a range-finding unit that measures a distance to the subject based upon the image shift quantity.

According to the 54th aspect of the present invention, a range-finding device, comprises: a pair of photoelectric conversion elements that receive image light fluxes from a subject via a pair of optical systems; an image shift detection unit that detects an image shift quantity indicating an extent of image shift manifested by the pair of subject image signals output from the pair of photoelectric conversion unit by executing a correlation operation adopting a correlation operation method according to the 36th aspect on the pair of subject image signals; and a range-finding unit that measures a distance to the subject based upon the image shift quantity.

According to the 55th aspect of the present invention, an imaging device, comprises: a photoelectric conversion element that receives light fluxes, having passed through a pair of pupil areas of a photographic optical system, via a focus detection optical system and outputs a pair of subject image signals; an image shift detection unit that detects an image shift quantity indicating an extent of image shift manifested by the pair of subject image signals by executing a correlation operation adopting an correlation operation method according to the 23rd aspect on the pair of subject image signals output from the photoelectric conversion element; a focus detection unit that detects a state of focus adjustment achieved at the photographic optical system based upon the image shift quantity; and an image sensor that captures a subject image via the photographic optical system.

According to the 56th aspect of the present invention, an imaging device, comprises: a photoelectric conversion element that receives light fluxes, having passed through a pair of pupil areas of a photographic optical system, via a focus detection optical system and outputs a pair of subject image signals: an image shift detection unit that detects an image shift quantity indicating an extent of image shift manifested by the pair of subject image signals by executing a correlation operation adopting a correlation operation method according to the 36th aspect on the pair of subject image signals output from the photoelectric conversion element; a focus detection unit that detects a state of focus adjustment achieved at the photographic optical system based upon the image shift quantity; and an image sensor that captures a subject image via the photographic optical system.

According to the 57th aspect of the present invention, in the correlation operation method adopted when calculating a degree of correlation manifesting between a first signal data string and a second signal data string, comprises: a first information generation step of generating first operation data by dividing first data in the first signal data string by nearby data present near the first data; a second information generation step of generating second operation data by dividing second data in the second signal data string corresponding to the first data by nearby data present near the second data; and a correlation degree detection step of calculating a degree of correlation between the first operation data and the second operation data.

BRIEF DESCRIPTION OF THE DRAWINGS

FIG. 40 presents a detailed flowchart of the focus detection operation executed in a second embodiment;

DESCRIPTION OF PREFERRED EMBODIMENTS

First Embodiment

Figure 1:
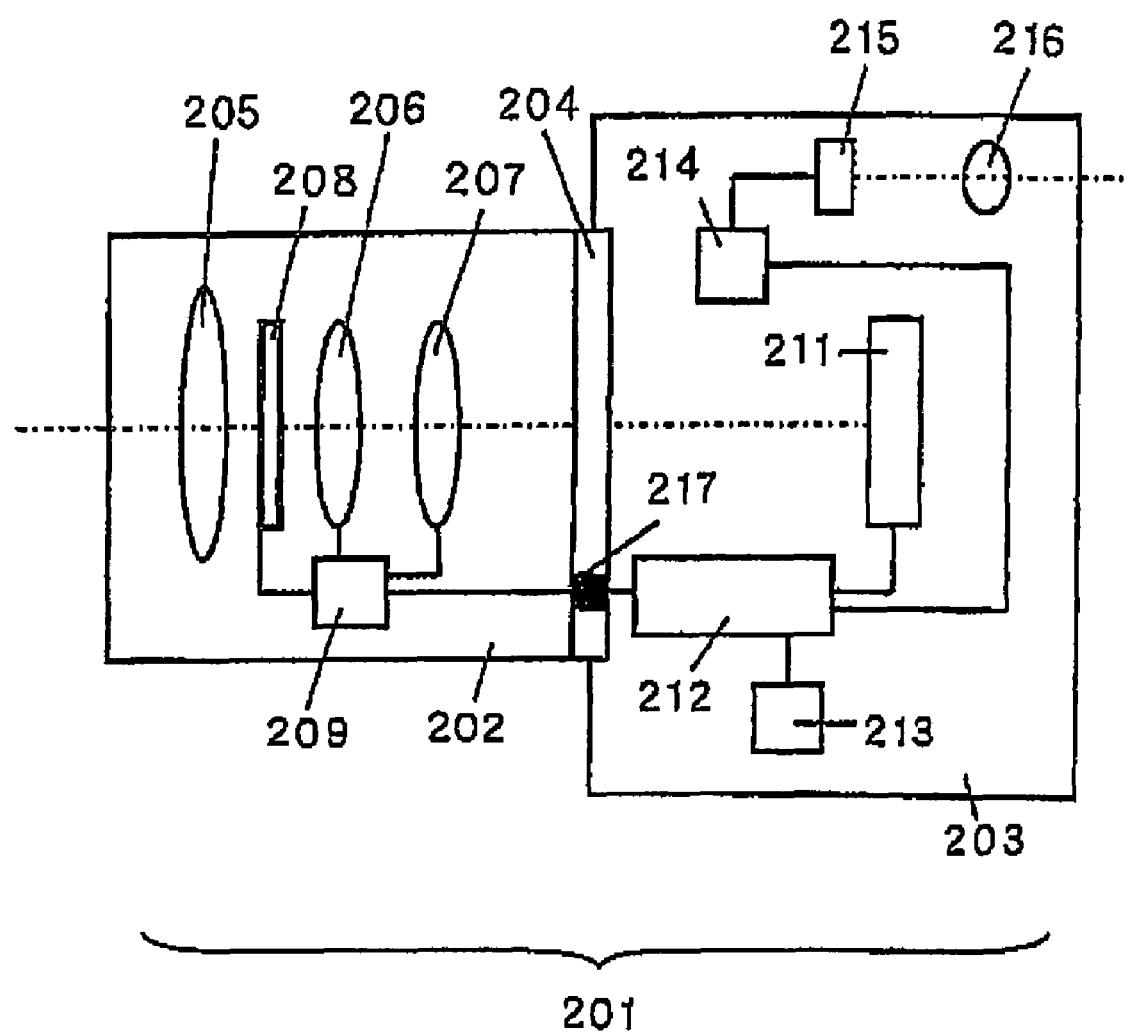
FIG. 1 shows the structure adopted in the digital still camera achieved in an embodiment.

An explanation is now given on an embodiment achieved by realizing the imaging device (the image-capturing device) according to the present invention in the form of a digital still camera. FIG. 1 shows the structure adopted in the digital still camera achieved in the embodiment. The digital still camera 201 in the embodiment comprises an exchangeable lens 202 and a camera body 203. The exchangeable lens 202 is mounted on a mount unit 204 at the camera body 203.

The exchangeable lens 202 includes lenses 205~207, an aperture 208 and a lens drive control device 209. It is to be noted that the lens 206 is a zooming lens and that the lens 207 is a focusing lens. The lens drive control device 209, constituted with a CPU and its peripheral components, controls the drive of the focusing lens 207 and the aperture 208, detects the positions of the zooming lens 206, the focusing lens 207 and the aperture 208, and transmits lens information and receives camera information by communicating with a control device in the camera body 203.

An image sensor 211, a camera drive control device 212, a memory card 213, an LCD driver 214, an LCD 215, an eyepiece lens 216 and the like are mounted at the camera body 203. The image sensor 211, set at the predetermined imaging plane (predetermined focal plane) of the exchangeable lens 202, captures a subject image formed through the exchangeable lens 202 and outputs image signals. At the image sensor 211, pixels used for imaging (hereafter simply referred to as imaging pixels) are disposed two-dimensionally, and rows of pixels used for focus detection (hereafter simply referred to as focus detection pixels), instead of imaging pixels, are disposed in the two-dimensional array over areas corresponding to focus detection positions.

The camera drive control device 212, constituted with a CPU and its peripheral components such as a memory, controls the drive of the image sensor 211, processes the captured image, executes focus detection and focus adjustment for the exchangeable lens 202, controls the aperture 208, controls display operation at the LCD 215, communicates with the lens drive control device 209 and controls the overall operational sequence in the camera. It is to be noted that the camera drive control device 212 communicates with the lens drive control device 209 via an electrical contact point 217 at the mount unit 204.

The memory card 213 is an image storage device in which captured images are stored. The LCD 215 is used as a display unit of a liquid crystal viewfinder (EVF: electronic viewfinder). The photographer is able to visually check a captured image displayed at the LCD 215 via the eyepiece lens 216.

The subject image formed on the image sensor 211 after passing through the exchangeable lens 202 undergoes photoelectric conversion at the image sensor 211 and an image output is provided to the camera drive control device 212. The camera drive control device 212 determines through an arithmetic operation the defocus amount indicating the extent of defocusing manifesting at a focus detection position based upon the outputs from the focus detection pixels and transmits the defocus amount to the lens drive control device 209. In addition, the camera drive control device 212 provides image signals generated based upon the outputs from the imaging pixels to the LCD driver 214 so as to display the image at the LCD 215 and also stores the image signals into the memory card 213.

The lens drive control device 209 detects the positions of the zooming lens 206, the focusing lens 207 and the aperture 208 and obtains through an arithmetic operation the lens information based upon the detected positions. Alternatively, the lens information corresponding to the detected positions may be selected from a lookup table prepared in advance. The lens information is then provided to the camera drive control device 212. In addition, the lens drive control device 209 calculates a lens drive quantity indicating the extent to which the lens is to be driven based upon the defocus amount received from the camera drive control device 212, and controls the drive of the focusing lens 207 based upon the lens drive quantity.

Figure 2:
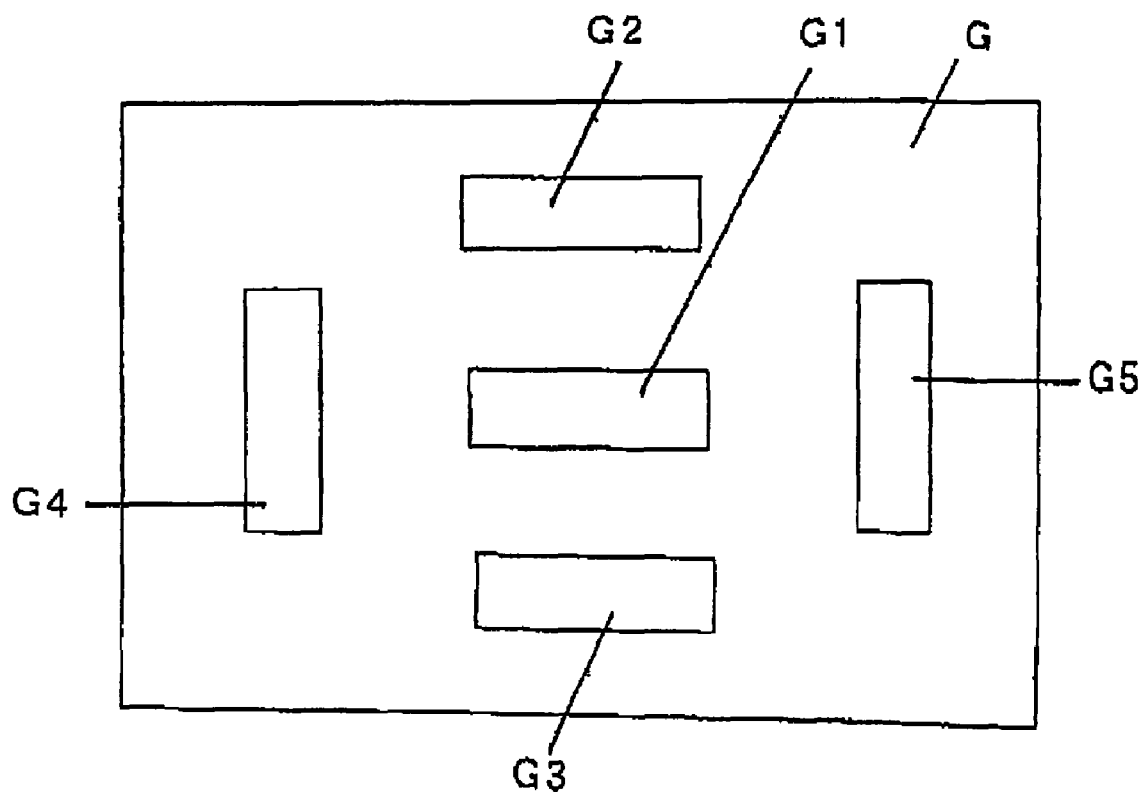
FIG. 2 shows the focus detection areas on the imaging plane set at the predetermined imaging plane of the exchangeable lens.

FIG. 2 shows focus detection areas on an imaging plane G set on the predetermined imaging plane of the exchangeable lens 202. Focus detection areas G1~G5 are set on the imaging plane G and focus detection pixels are arrayed in a row at the image sensor 211 in correspondence to each of the focus detection areas G1~G5 so that the focus detection pixel rows linearly extend along the lengthwise direction of the corresponding focus detection areas G1~G5. Namely, in the focus detection pixel rows on the image sensor 211, the image portions in the focus detection areas G1~G5 within the subject image formed on the photographic image plane G are sampled. The photographer manually selects a desired focus detection area among the focus detection areas G1~G5 in correspondence to the photographic composition.

Figure 3:
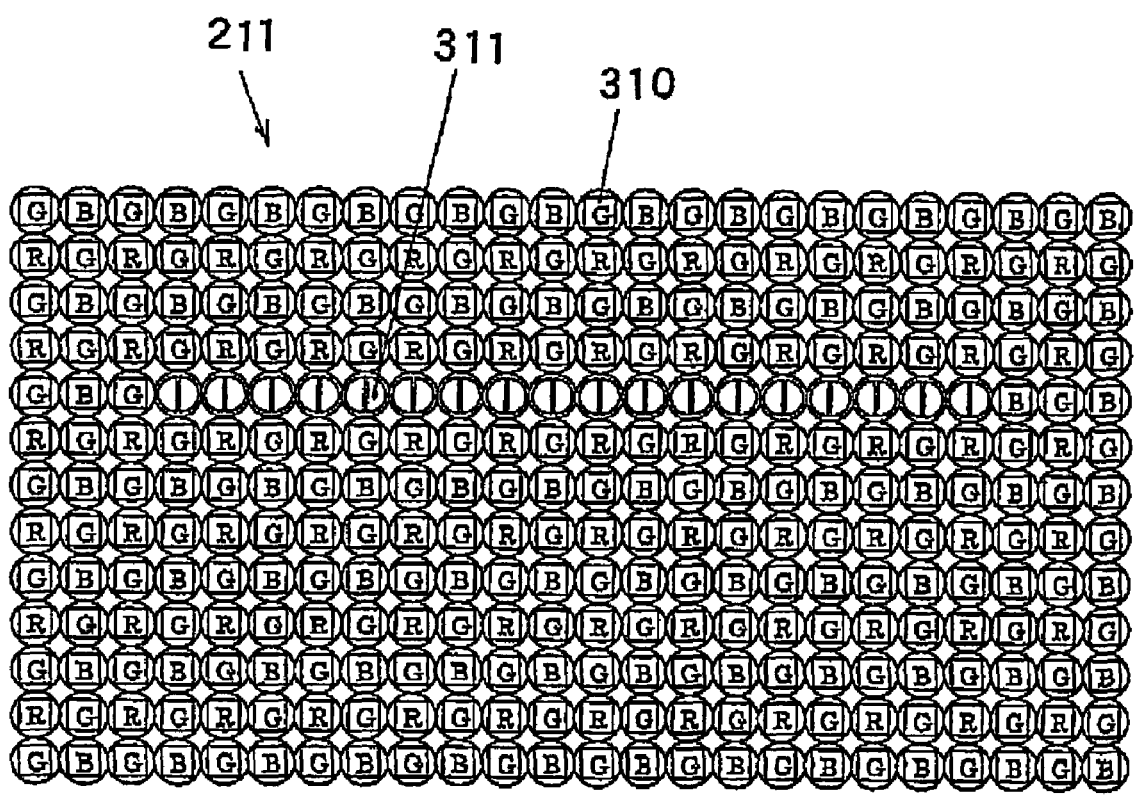
FIG. 3 is a front view showing in detail the structure adopted at the image sensor.

FIG. 3 is a front view showing in detail the structure adopted in the image sensor 211. It is to be noted that FIG. 3 shows in an enlargement part of the image sensor 211, near a given focus detection area set on the image sensor 211. The image sensor 211 is constituted with imaging, pixels 310 and focus detection pixels 311 used in focus detection.

Figure 4:
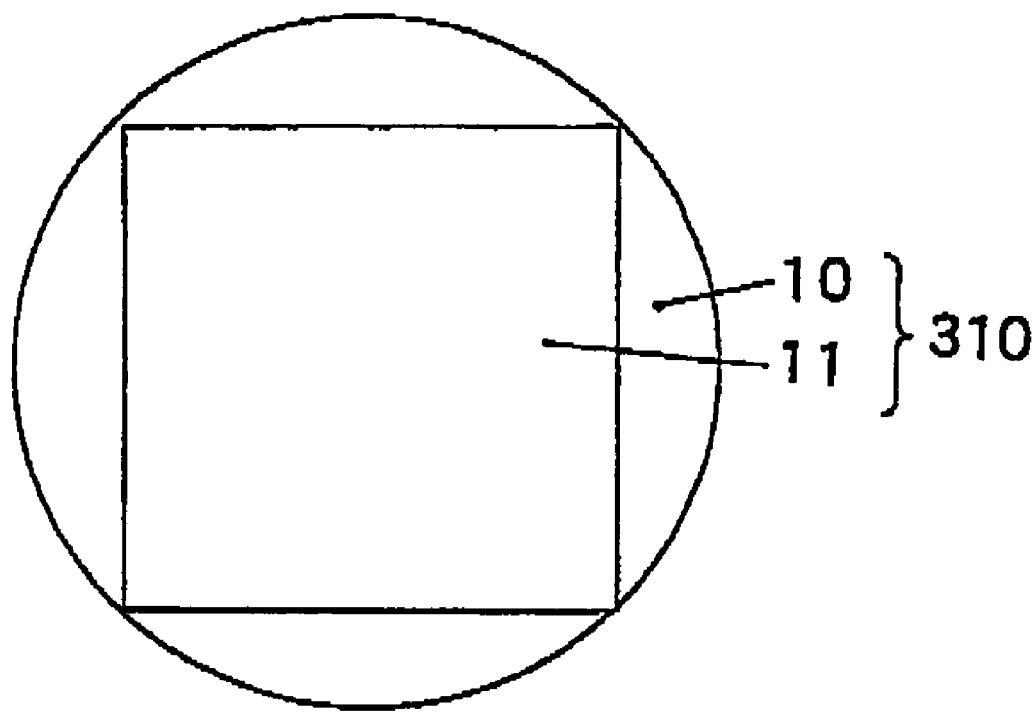
FIG. 4 shows the structure adopted in the imaging pixels.
Figure 5:
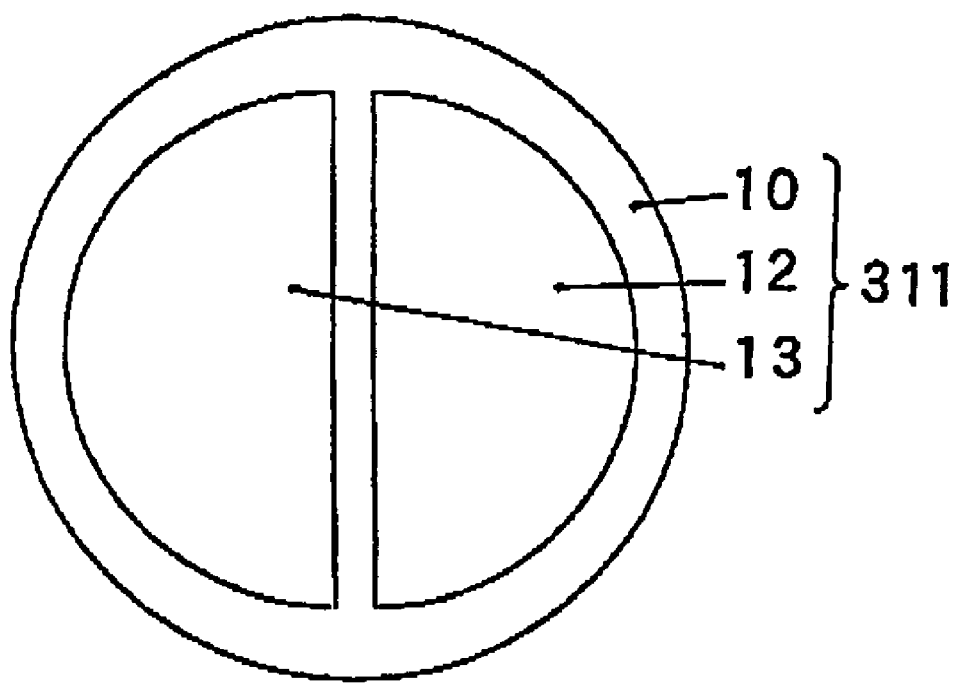
FIG. 5 shows the structure adopted in the focus detection pixels.

As shown in FIG. 4, the imaging pixels 310 each include a micro-lens 10, a photoelectric conversion unit 11 and a color filter (not shown). In addition, as shown in FIG. 5, the focus detection pixels 311 each include a micro-lens 10 and a pair of photoelectric conversion units 12 and 13. The photoelectric conversion unit 11 at the imaging pixel 310 is designed in a shape that allows the photoelectric conversion unit to receive all the light flux passing through the exit pupil of a high-speed exchangeable lens, e.g., an exit pupil equivalent to F 1.0, via the micro-lens 10. In addition, the pair of photoelectric conversion units 12 and 13 at the focus detection pixel 311 is designed in a shape that allows the photoelectric conversion units to receive all the light flux passing through a specific exit pupil of the exchangeable lens, e.g., an exit pupil equivalent to F 2.8, via the micro-lens 10. It is to be noted that the micro-lenses 10 used in the embodiment have a diameter equal to or less than 20 μm.

Figure 6:
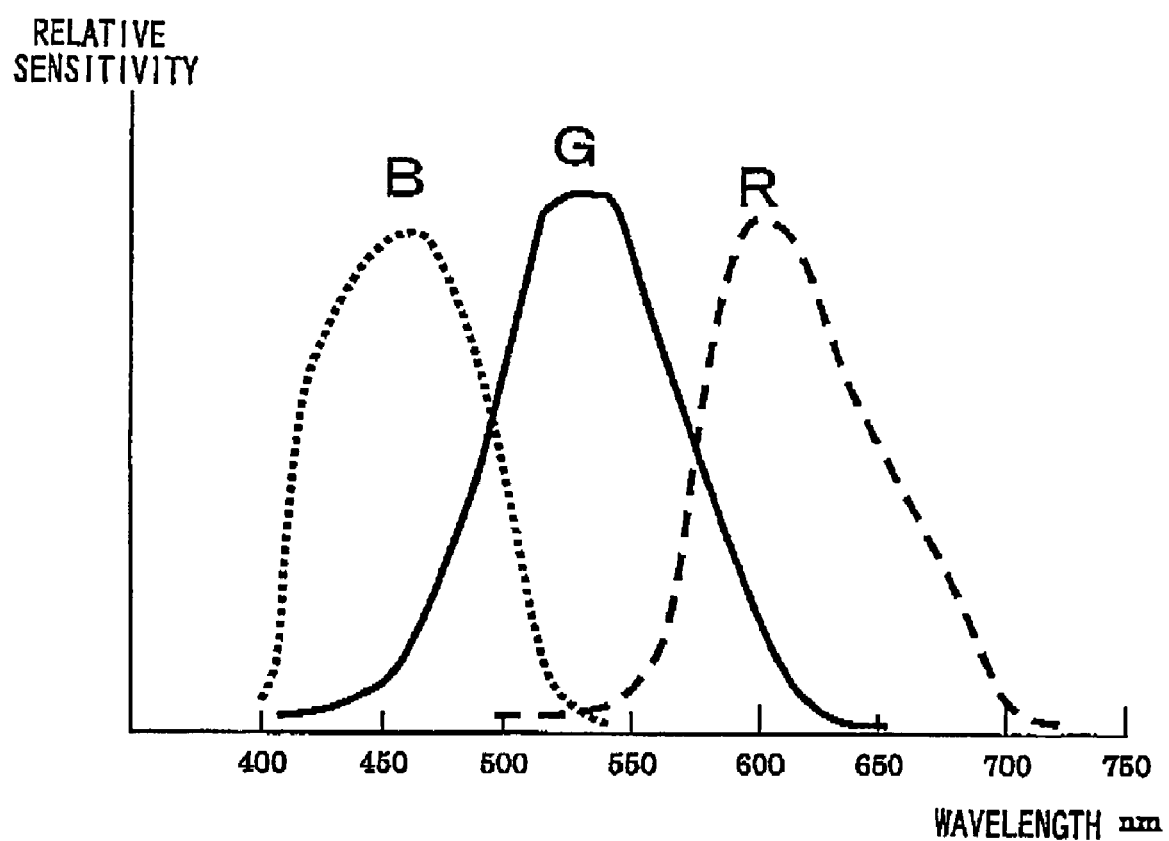
FIG. 6 shows the spectral sensitivity characteristics of the filters in various colors disposed at imaging pixels.

A color filter assuming red (R) color, green (G) color or blue (B) color is disposed at each of the imaging pixels 310 which are two-dimensionally arrayed, and the color filters achieve the spectral sensitivity characteristics respectively shown in FIG. 6. The imaging pixels 310 each equipped with a color filter in R, G or B are disposed in a Bayer array, as shown in FIG. 3.

Figure 7:
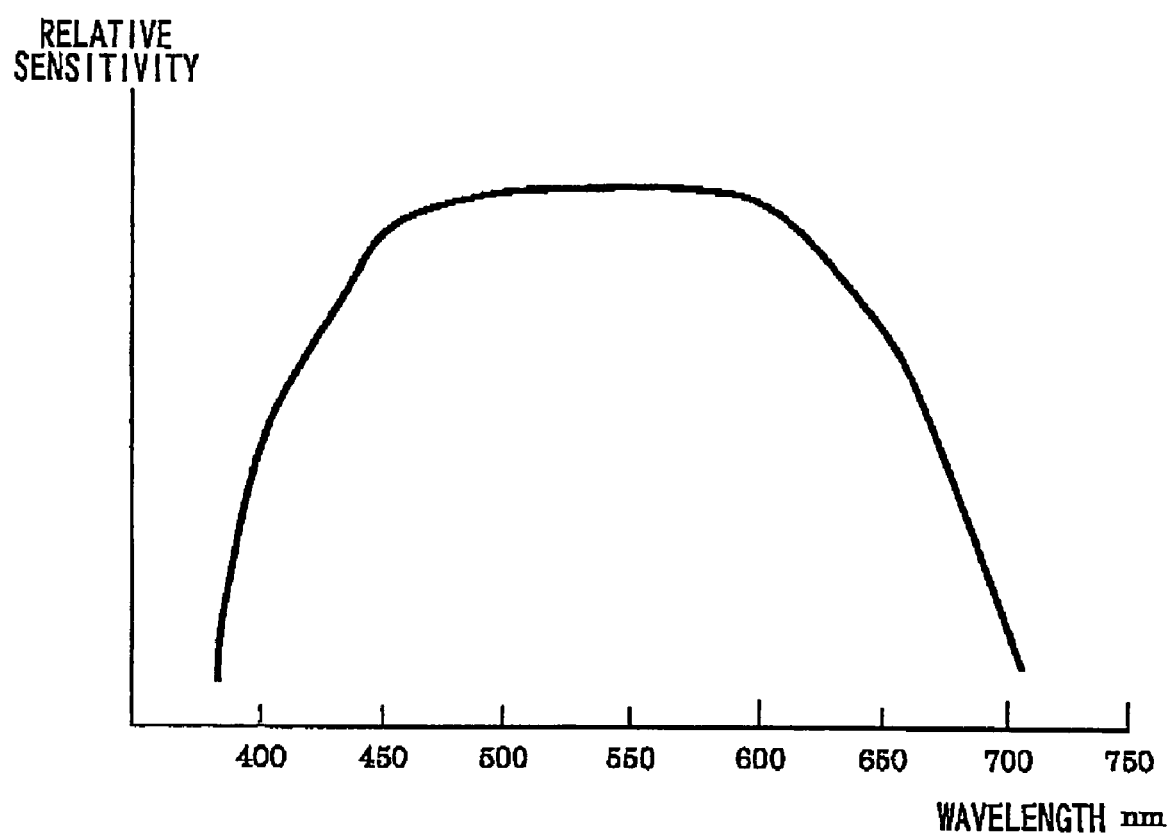
FIG. 7 shows the spectral sensitivity characteristics of the focus detection pixels.

It is to be noted that in order to assure a sufficient light quantity, no color filters are disposed at the focus detection pixels 311 and thus, the focus detection pixels 311 have the spectral sensitivity characteristics shown in FIG. 7, which are achieved by integrating the spectral sensitivity of the photo-diodes engaged in photoelectric conversion and the spectral sensitivity characteristics of the infrared cut filters (not shown). Namely, the spectral sensitivity characteristics of the focus detection pixels 311 are similar to the sum of spectral sensitivity characteristics of the green pixels (G), the red pixels (R) and the blue pixels (B) shown in FIG. 6, which indicate sensitivity in a light wavelength range containing the light wavelength ranges corresponding to the sensitivity characteristics of all the pixels, i.e., the green pixels (G), the red pixels (R) and the blue pixels (B).

The focus detection pixels 311 are densely disposed along a straight line without allowing any interval in between at a horizontal or vertical row that would otherwise be occupied by imaging pixels 310 with B filters and G filters, in each of the focus detection areas G1 to G5 shown in FIG. 2. By disposing the focus detection pixels 311 along the horizontal or vertical rows that would otherwise be occupied by imaging pixels 310 equipped with B filters and G filters, it is ensured that a slight error occurring when generating pixel signals at positions occupied by the focus detection pixels 311 through pixel interpolation, can remain more or less unnoticeable to the human eye, since the human eye is more perceptive to red than to blue and the green pixels, disposed with higher density compared to the blue pixels and the red pixels, have a lower image defect contribution factor per pixel.

It is to be noted that in an image sensor achieved by two-dimensionally reiterating the imaging pixel array unit made up of imaging pixels equipped with the complementary color filters mentioned earlier, the focus detection pixels 311 should be disposed at pixel positions that would otherwise be occupied by imaging pixels equipped with cyan filters and magenta filters, i.e., imaging pixels equipped with color filters that contain a blue component with which the output error is relatively unnoticeable.

Figure 8:
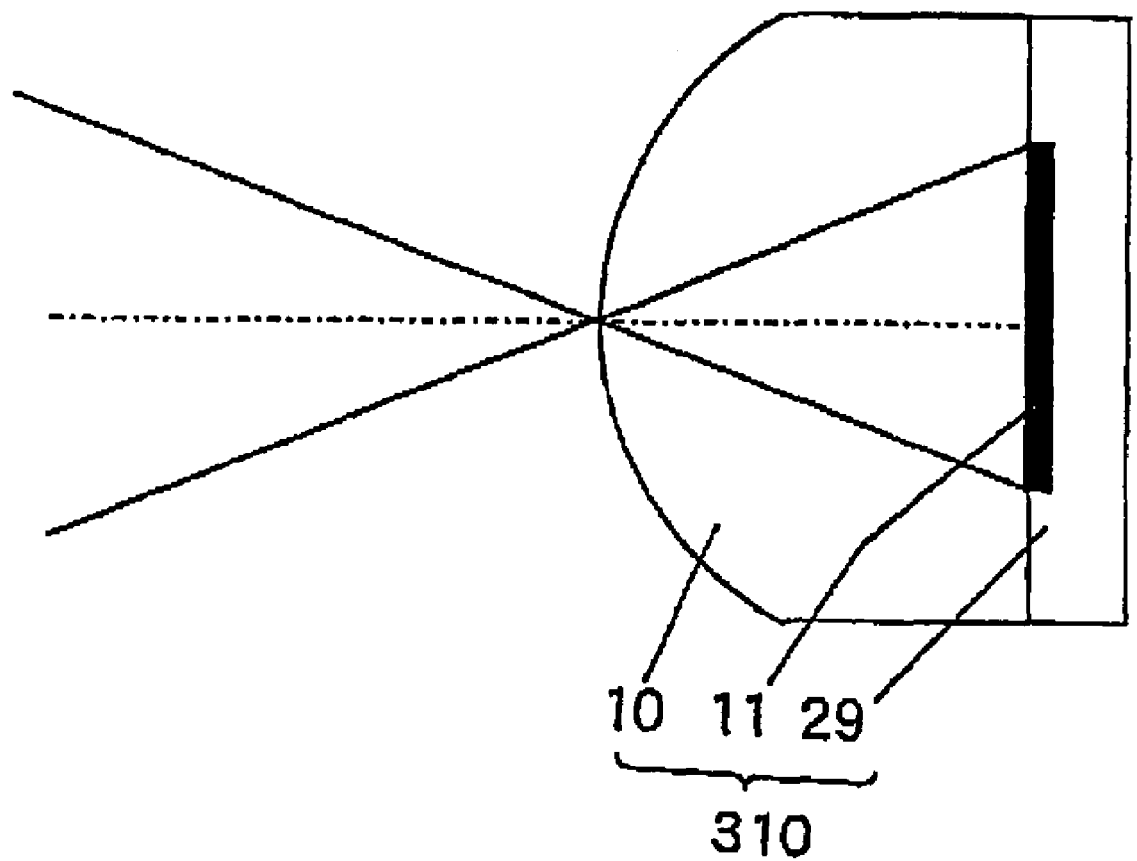
FIG. 8 is a sectional view of an imaging pixel.

FIG. 8 is a sectional view of an imaging pixel 310. The micro-lens 10 is set to the front of the imaging photoelectric conversion unit 11 at the imaging pixel 310 and, as a result, an image of the photoelectric conversion unit 11 is projected frontward via the micro-lens 10. The photoelectric conversion unit 11 is formed on a semiconductor circuit substrate 29, with a color filter (not shown) disposed between the micro-lens 10 and the photoelectric conversion unit 11.

Figure 9:
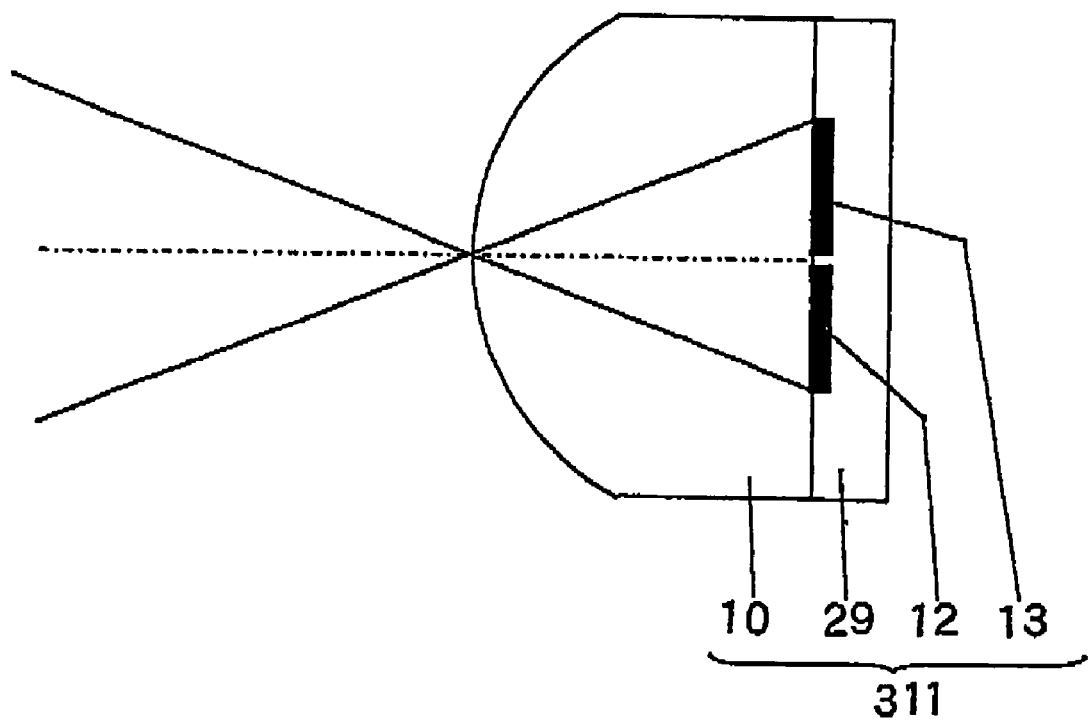
FIG. 9 is a sectional view of a focus detection pixel.

FIG. 9 is a sectional view of a focus detection pixel 311. In the focus detection pixel 311, the micro-lens 10 is disposed to the front of the photoelectric conversion units 12 and 13 used for focus detection and thus, images of the photoelectric conversion units 12 and 13 are projected frontward via the micro-lens 10. The photoelectric conversion units 12 and 13 are formed on the semiconductor circuit substrate 29.

Figure 10:
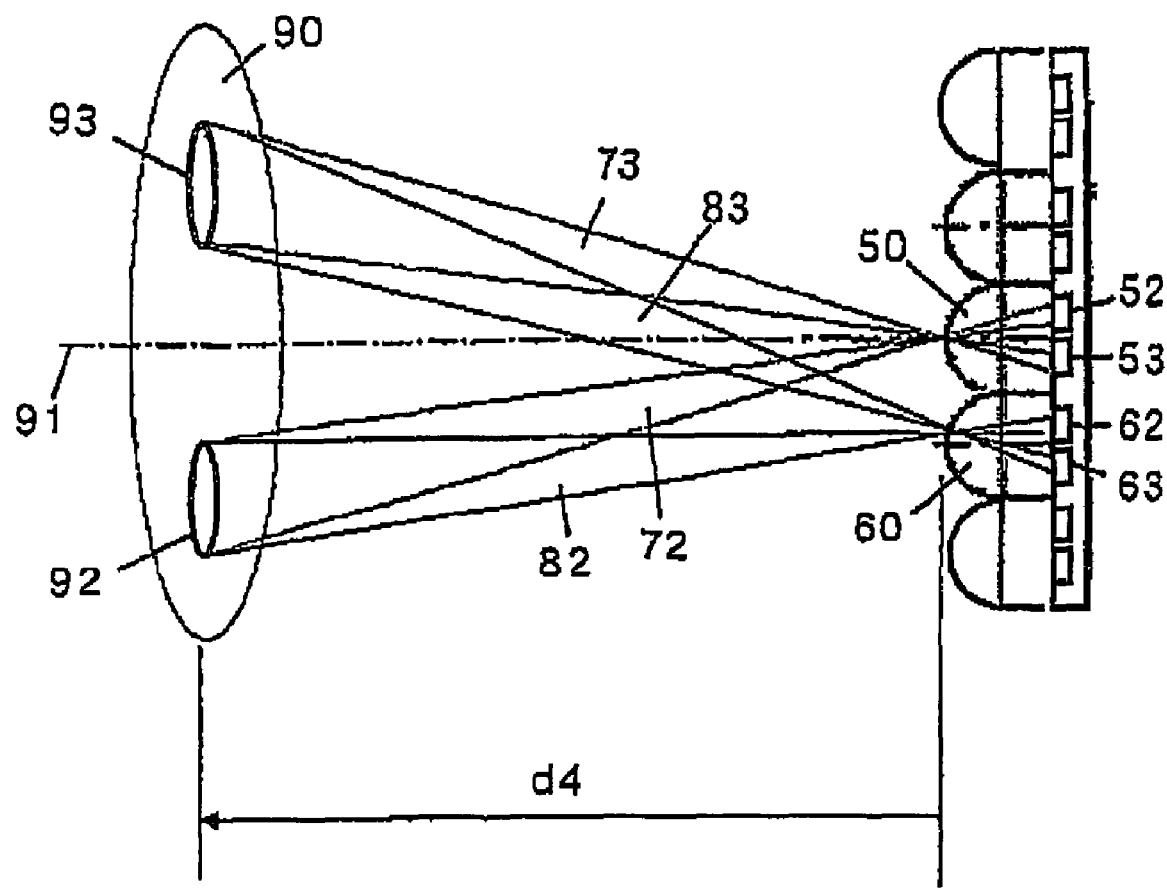
FIG. 10 illustrates focus detection executed through a split-pupil method.

Next, in reference to FIG. 10, focus detection executed by adopting a split-pupil method (a pupil division-type method) is explained. FIG. 10 shows a micro-lens 50 of a focus detection pixel 311 disposed on an optical axis 91 of the exchangeable lens 202, a pair of photoelectric conversion units 52 and 53 disposed to the rear of the micro-lens 50, a micro-lens 60 of a focus detection pixel 311 disposed off the optical axis 91 of the exchangeable lens 202 and a pair of photoelectric conversion units 62 and 63 disposed to the rear of the micro-lens 60. An exit pupil 90 of the exchangeable lens 202 is set at a position assumed over a distance d4 to the front of the micro-lenses 50 and 60 disposed on the predetermined imaging plane of the exchangeable lens 202. The distance d4 takes a value determined in correspondence to the curvature and the refractive index of the micro-lenses 50 and 60, the distance between the micro-lenses 50 and 60 and the photoelectric conversion units 52/53 and 62/63 and the like. In the description, the distance d4 is referred to as a range-finding pupil distance.

The micro-lenses 50 and 60 are set at the predetermined imaging plane of the exchangeable lens 202. The shapes of the pair of photoelectric conversion units 52 and 53 are projected via the micro-lens 50 set on the optical axis 91 onto the exit pupil 90 set apart from the micro-lens 50 by the projection distance d4, and the projected shapes define range-finding pupils 92 and 93. The shapes of the pair of photoelectric conversion units 62 and 63 are projected via the micro-lens 60 set off the optical axis 91 onto the exit pupil 90 set apart by the projection distance d4, and the projected shapes define the range-finding pupils 92 and 93. Namely, the projecting direction for each pixel is determined so that the projected shapes (range-finding pupils 92 and 93) of the photoelectric conversion units in the individual pixels are aligned on the exit pupil 90 set over the projection distance d4.

The photoelectric conversion unit 52 outputs a signal corresponding to the intensity of an image formed on the micro-lens 50 with a focus detection light flux 72 having passed through the range-finding pupil 92 and having advanced toward the micro-lens 50. The photoelectric conversion unit 53 outputs a signal corresponding to the intensity of an image formed on the micro-lens 50 with a focus detection light flux 73 having passed through the range-finding pupil 93 and having advanced toward the micro-lens 50. Also, the photoelectric conversion unit 62 outputs a signal corresponding to the intensity of an image formed on the micro-lens 60 with a focus detection light flux 82 having passed through the range-finding pupil 92 and having advanced toward the micro-lens 60. The photoelectric conversion unit 63 outputs a signal corresponding to the intensity of an image formed on the micro-lens 60 with a focus detection light flux 83 having passed through the range-finding pupil 93 and having advanced toward the micro-lens 60. It is to be noted that the focus detection pixels 311 are arrayed in a direction matching the direction along which the pair of range-finding pupils are separated from each other.

Many focus detection pixels each structured as described above are arranged in a straight row and the outputs from the pairs of photoelectric conversion units at the individual pixels are integrated into output groups each corresponding to one of the two range-finding pupils 92 and 93. Thus, information related to the intensity distribution of the pair of images formed on the focus detection pixel row with the individual focus detection light fluxes passing through the pair of range-finding pupils 92 and 93 is obtained. Next, image shift detection calculation processing (correlation processing, phase difference detection processing) to be detailed later is executed by using the information thus obtained so as to detect the extent of image shift (image misalignment) manifested by the pair of images through the split-pupil detection method. The image shift quantity (the image misalignment quantity) indicating the extent of image shift (image misalignment) is then multiplied by a predetermined conversion coefficient and, as a result, the extent of deviation (defocus amount) of the current imaging plane (the imaging plane on which the image is formed at the focus detection position corresponding to a specific micro-lens array position on the predetermined imaging plane) relative to the predetermined imaging plane is calculated.

It is to be noted that FIG. 10 schematically shows the focus detection pixel (the micro-lens 50 and the pair of photoelectric conversion units 52 and 53) disposed on the optical axis 91 and the adjacent focus detection pixel (the micro-lens 60 and the pair of photoelectric conversion units 62 and 63). At each of the other focus detection pixels, too, the light fluxes arriving at the micro-lens from the pair of range-finding pupils are received at the pair of photoelectric conversion units.

Figure 11:
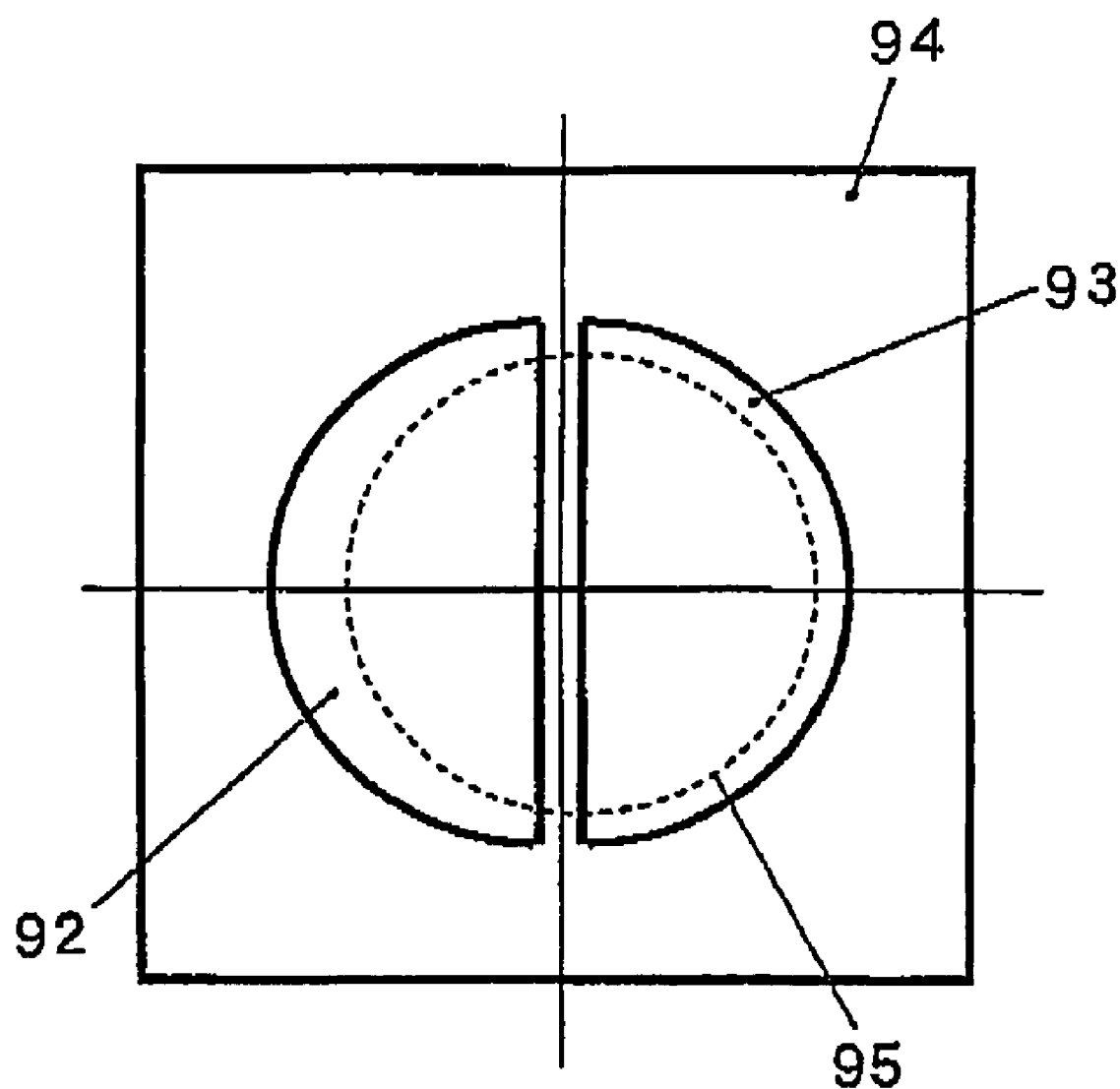
FIG. 11 is a front view, showing the relationship between the projection areas achieved, at the exit pupil plane.

FIG. 11 is a front view, showing the relationship between the projection areas at the exit pupil plane. The circle circumscribing the range-finding pupils 92 and 93 formed by projecting the pair of photoelectric conversion units 12 and 13 in the focus detection pixel 311 onto the exit pupil plane 90 via the micro-lens 10, viewed from the imaging plane, assumes a specific opening F value (referred to as a range-finding pupil F value in this description. F 2.8 in this example). The photoelectric conversion unit 11 in each imaging pixel 310 is projected onto the exit pupil plane 90 over an area 94 via the micro-lens 10. The area 94 is large enough to contain both the range-finding pupils 92 and 93.

Since the positional relationship between the center of an area 95 corresponding to the aperture opening at the exchangeable lens 202, indicated by the dotted line, and the center of the circle circumscribing the range-finding pupils 92 and 93 in FIG. 11 changes in correspondence to the position of the exit pupil inherent to the exchangeable lens 202 and the position of the focus detection pixel on the image plane (the distance from the optical axis), the center of the area 95 and the center of the circumscribing circle do not necessarily match. If the area of the exit pupil of the exchangeable lens 202 is smaller than the area of the circle circumscribing the range-finding pupils 92 and 93 and the centers do not match, the light fluxes passing through the pair of range-finding pupils 92 and 93 become unevenly "eclipsed". In such a case, since the quantities of light in the pair of images formed with these light fluxes do not match, distortion occurs.

Figure 12:
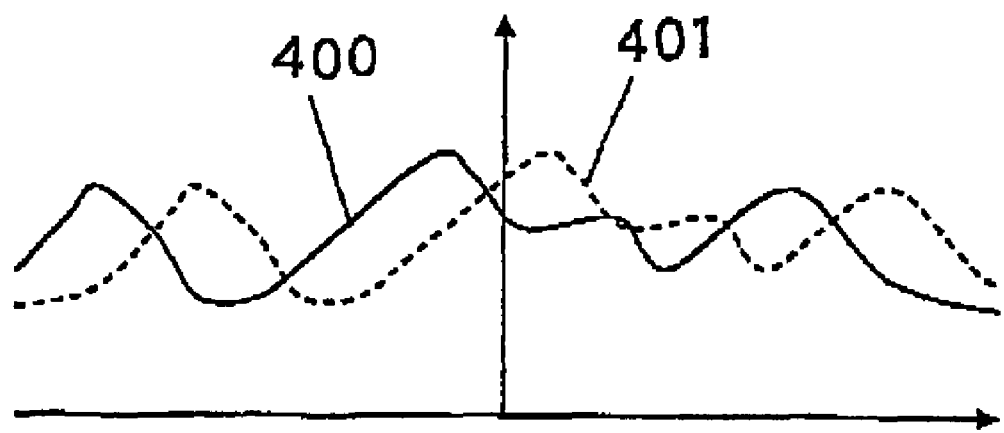
FIGS. 12A and 12B each present a graph with the image signal intensity distribution (light quantities) at a given focus detection position indicated along the vertical axis and the positional deviation manifesting within the focus detection position indicated along the horizontal axis.
Figure 12:
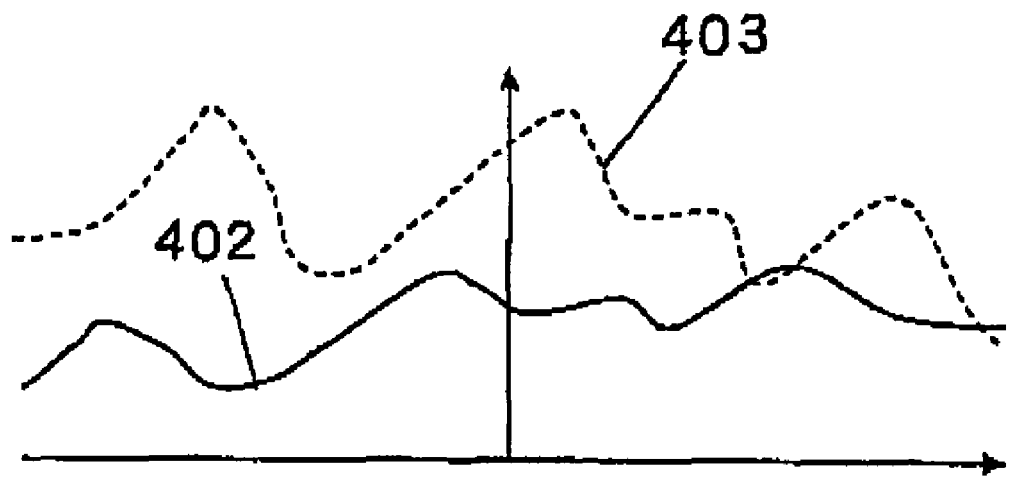

FIGS. 12A and 12B each present a graph with the image signal intensity distribution (light quantities) at a given focus detection position indicated along the vertical axis and the positional deviation occurring within the focus detection position indicated along the horizontal axis. The term "positional deviation occurring within the focus detection position" refers to the positions assumed by a plurality of focus detection pixels belonging to one of the focus detection positions on, for instance, the image sensor 211 shown in FIG. 3. A pair of image signals 400 and 401, output when there is no eclipse of the focus detection light fluxes, are represented by identical image signal functions, which are simply shifted relative to each other along the horizontal direction, as shown in FIG. 12A. However, if an eclipse of the focus detection light fluxes occurs, the quantities of focus detection light fluxes passing through the range-finding pupils change in correspondence to the focus detection position and the positional deviation occurring within the focus detection position and, as a result, a pair of image signals 402 and 403, output under such circumstances, as shown in FIG. 12B, are not identical signals shifted relative to each other.

(Imaging Operation)

Figure 13:
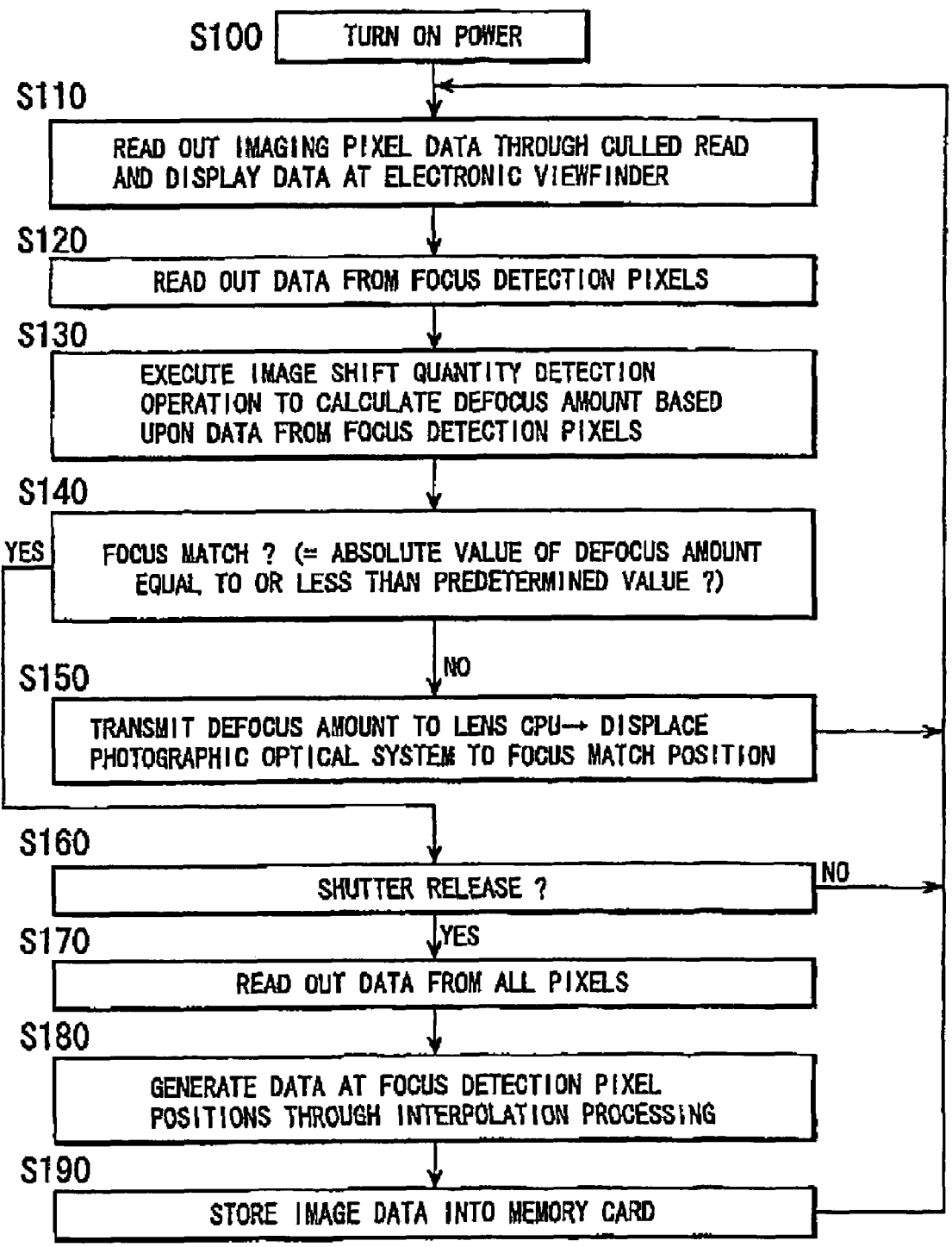
FIG. 13 presents a flowchart of the imaging operation executed in the digital still camera (imaging device) achieved in the embodiment.

FIG. 13 presents a flowchart of the imaging operation executed in the digital still camera (imaging device) 210 achieved in the embodiment. The camera drive control device 212 repeatedly executes the imaging operation after the power to the camera is turned on in step 100. In step 110, a culled read of the data from the imaging pixels 310 is executed and the data thus read out through the culled read are displayed at the electronic viewfinder LCD 215. The number of sets of data from the focus detection pixels 311 read out through the culled read of the data from the imaging pixels 310 should be minimized, so as to assure better display quality. As an alternative, data from the focus detection pixels 311 may be read out through the culled read and the focus detection pixel outputs in an uncorrected form may be displayed on the electronic viewfinder LCD 215 so as to enable the user to identify the focus detection position with ease.

In step 120, data are read out from the focus detection pixel row. It is to be noted that since a specific area among the focus detection areas G1~G5 in FIG. 2 will have been already selected via an area selecting operation member (not shown), the data are read from the focus detection pixel row corresponding to the selected focus detection area. In the following step 130, an image shift detection operation processing, i.e., correlation operation processing, to be detailed later, is executed based upon the pair of sets of image data corresponding to the particular focus detection pixel row, so as to calculate the image shift quantity indicating the extent of image shift and then to calculate the defocus amount indicating the extent of defocusing. In step 140, a decision is made as to whether or not the current condition is close to a focus match state, i.e., whether or not the absolute value of the defocus amount having been calculated is equal to or less than a focus match decision-making reference value.

If it is decided that the current condition is not close to the focus match state, the operation proceeds to step 150 to transmit the calculated defocus amount to the lens drive control device 209 which then drives the focusing lens 207 at the exchangeable lens 202 to the focus match position. Then, the operation returns to step 110 to repeatedly execute the operation described above. It is to be noted that the operation also branches to step 150 if focus detection is not possible to transmit a scan drive instruction to the lens drive control device 209. In response, the lens drive control device 209 drives the focusing lens 207 at the exchangeable lens 202 to scan between the infinity position and the close-up position. Then the operation returns to step 110 to repeatedly execute the operation described above.

If, on the other hand, it is decided that the current condition is close to the focus match state, the operation proceeds to step 160 to make a decision as to whether or not a shutter release has occurred in response to an operation of the shutter release button (not shown). If it is decided that a shutter release has not yet occurred, the operation returns to step 110 to repeatedly execute the operation described above. If it is decided that a shutter release has occurred, the operation proceeds to step 170 to transmit an aperture adjustment instruction to the lens drive control device 209. In response, the aperture 208 at the exchangeable lens 202 is set to a control F value determined by the camera drive control device 212 through exposure calculation or to an F value manually selected by the user.

Upon completing the aperture control, the image sensor 211 is engaged in an imaging operation and image data are read out from the imaging pixels 310 and all the focus detection pixels 311 at the image sensor 211. In step 180, image data at positions assumed by the individual pixels in the focus detection pixel rows are interpolated based upon the data at the focus detection pixels 311 and the data at surrounding imaging pixels 310. In step 190, image data constituted with the data at the imaging pixels 310 and the interpolated data at the focus detection pixel positions are saved into the memory card 213, and then the operation returns to step 110 to repeatedly execute the operation described above.

(Focus Detection Operation)

Figure 14:
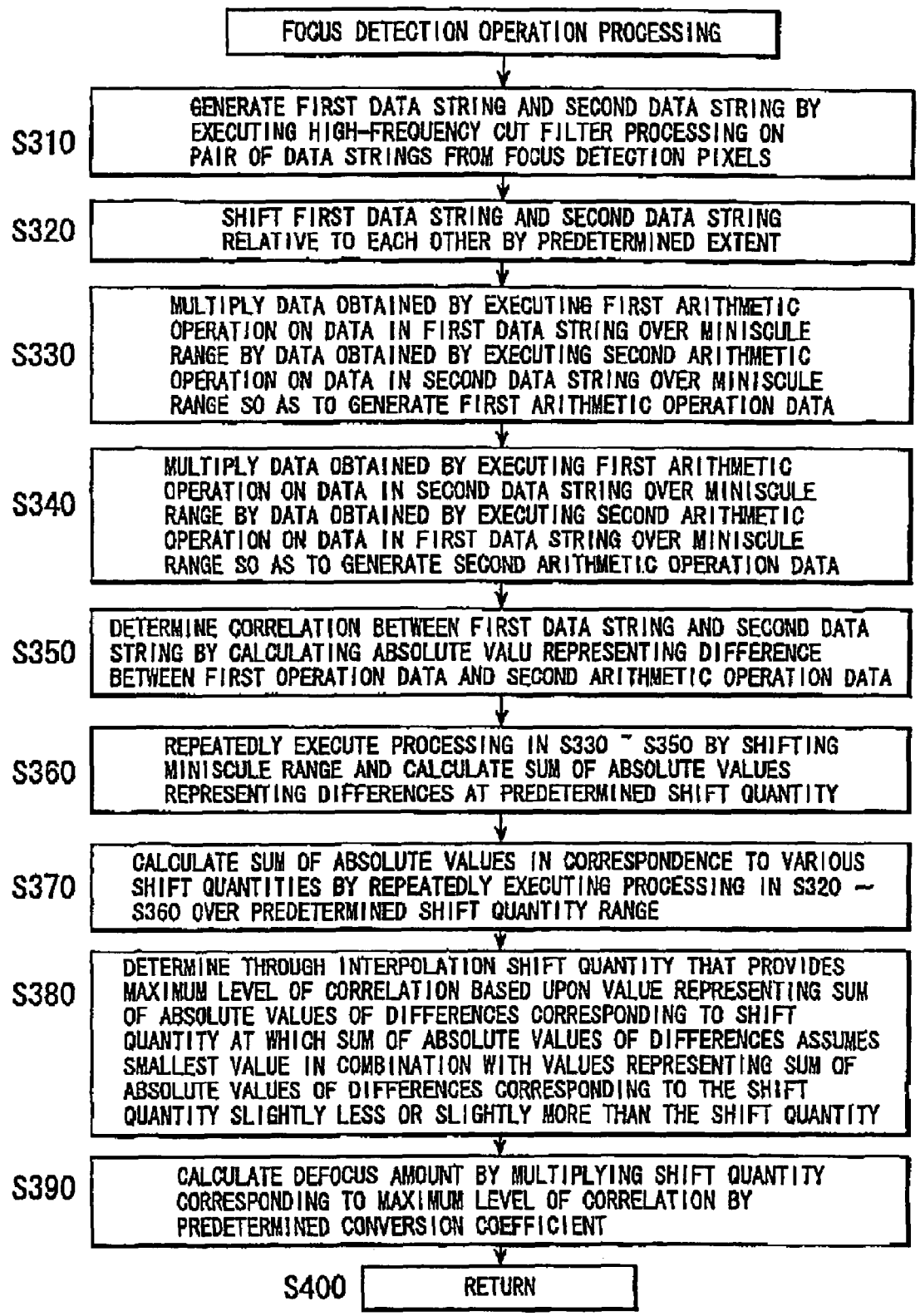
FIG. 14 presents a detailed flowchart of the focus detection operation.

FIG. 14 presents a detailed flowchart of the focus detection operation executed in step 130 during the imaging operation shown in FIG. 13. After starting focus detection operation processing, i.e., the correlation operation processing, in step 300, high-frequency cut filter processing such as that expressed in (1) below is executed on a pair of signal data strings ($\alpha_1$~$\alpha_M$ and $\beta_1$~$\beta_M$: M indicates the number of sets of data) output from the focus detection pixel row, so as to generate a first signal data string $A_1$~$A_N$ and a second signal data string $B_1$~$B_N$ (N indicates the number of sets of data), from which a noise component or a high-frequency component that would adversely affect the correlation processing has been eliminated.

$$A_n = \alpha_n + 2 \times \alpha_{n+1} + \alpha_{n+2},$$
$$B_n = \beta_n + 2 \times \beta_{n+1} + \beta_{n+2} \qquad (1)$$

In expression (1) above, n=1~N. It is to be noted that the high-frequency cut filter processing in step 310 may be skipped if the arithmetic operation needs to be completed faster or if the extent of defocusing is already significant and thus it is obvious that only a very small high-frequency component is present.

In step 320, the second signal data string $B_1$~$B_N$ is shifted relative to the first signal data string $A_1$~$A_N$ by a predetermined extent k in order to determine through an arithmetic operation the correlation quantity indicating the level or degree of correlation between the first signal data string $A_1$~$A_N$ and the second signal data string $B_1$~$B_N$ at the shift quantity k (k is an integer).

In the following step 330, operation data are obtained by executing a first arithmetic operation (to be detailed later) on data over a given range in the first signal data string $A_1$~$A_N$, i.e., data that include target data $A_n$ and nearby data $A_{n-r}$~$A_{n+s}$ (r and s each indicate a given integer: hereafter this range is to be referred to as a "miniscule range") and also, operation data are obtained by executing a second arithmetic operation (to be detailed later) on data $B_{n+k}$ corresponding to the target data $A_n$ in the first signal data string and nearby miniscule range data $B_{n-r}$~$B_{n+s}$ in the second signal data string $B_1$~$B_N$, having been shifted by the shift quantity k. Then, by calculating the product of these operation data, first operation data are obtained.

In step 340, operation data are obtained by executing the first arithmetic operation on the miniscule range data $B_{n-r}$~$B_{n+s}$ in the second signal data string $B_1$~$B_N$, and also operation data are obtained by executing the second arithmetic operation on the miniscule range data $A_{n-r}$~$A_{n+s}$ in the first signal data string $A_1$~$A_N$. Then, the product of these operation data is calculated, and thus, second operation data are obtained.

It is to be noted that the first operation data and the second operation data to be detailed later, which result from the arithmetic operations executed in steps 330 and 340, are data in which the distortion in the first signal data string and in the second signal data string is canceled out over the given "miniscule range".

In addition, while the operation data are obtained by executing the first arithmetic operation and the second arithmetic operation on the data in the first signal data string and in the second signal data string over the "miniscule range" in steps 330 and 340 described above, first operation data may be generated by multiplying the target data $A_n$ at a given position in the first signal data string $A_1$~$A_N$ by, for instance, data such as $B_{n+1+k}$ or $B_{n+2+k}$ near the data $B_{n+k}$ corresponding to the position of the target data $A_n$ in the second signal data string $B_1$~$B_N$ shifted by the shift quantity k and second operation data may be generated by multiplying the data $B_{n+k}$ in the second signal data string $B_1$~$B_N$ by nearby data such as $A_{n+1}$ or $A_{n+2}$ near the target data $A_n$ in the first signal data string $A_1$~$A_N$, instead.

In step 350, the absolute value of the difference between the first operation data and the second operation data is calculated. The results of this calculation indicate the level (or degree) of correlation (similarity level) between the first signal data string and the second signal data string over the "miniscule range". In the following step 360, the processing in steps 330~350 is repeatedly executed by shifting the "miniscule range" and thus, the correlation quantity C(k) corresponding to the predetermined shift quantity k is calculated by calculating the cumulative sum of the operation results indicating the correlation level (or degree) determined in step 350.

In step 370, the processing in steps 320 through 360 is repeatedly executed with the shift quantity k altered over a predetermined range and data indicating the correlation quantity C(k) corresponding to the shift quantity k are obtained through calculation. With $E_{n,k}$ and $F_{n,k}$ respectively representing the first operation data and the second operation data obtained at a central position n of the "miniscule range" in correspondence to the shift quantity k, the correlation quantity C(K) that is ultimately obtained is expressed as in (2) below.

$$C(k) = \Sigma |E_{n,k} - F_{n,k}| \qquad (2)$$

In expression (2) the $\Sigma$ operation is cumulatively executed with regard to n and the range assumed for n is limited to the range over which the data $E_{n,k}$ and $F_{n,k}$ exist in correspondence to the shift quantity k. In addition, the shift quantity k is an integer which represents a relative shift quantity assuming a value taken in units matching the detection pitch with which the pair of sets of data are detected.

Figure 15:
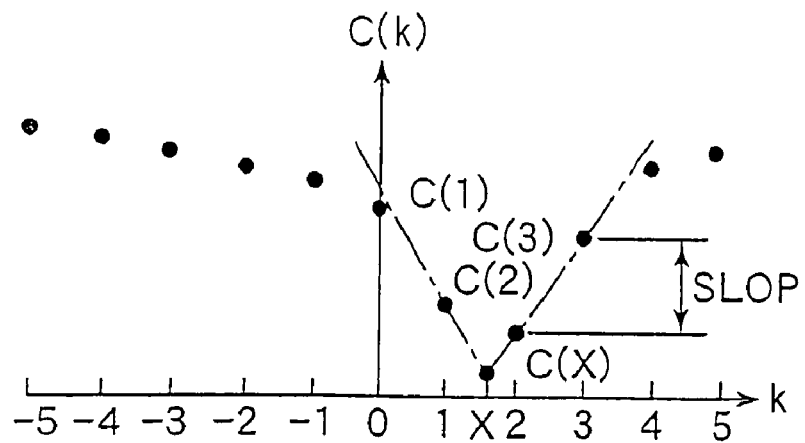
FIGS. 15A, 15B and 15C illustrate how the correlation operation is executed.
Figure 15:
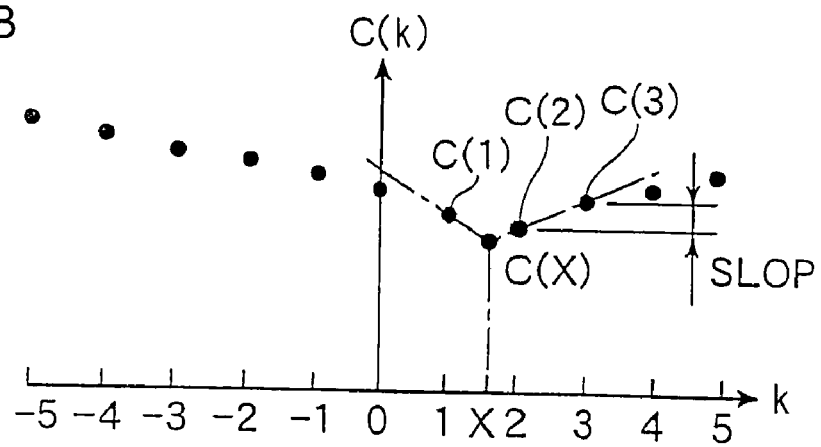
Figure 15:
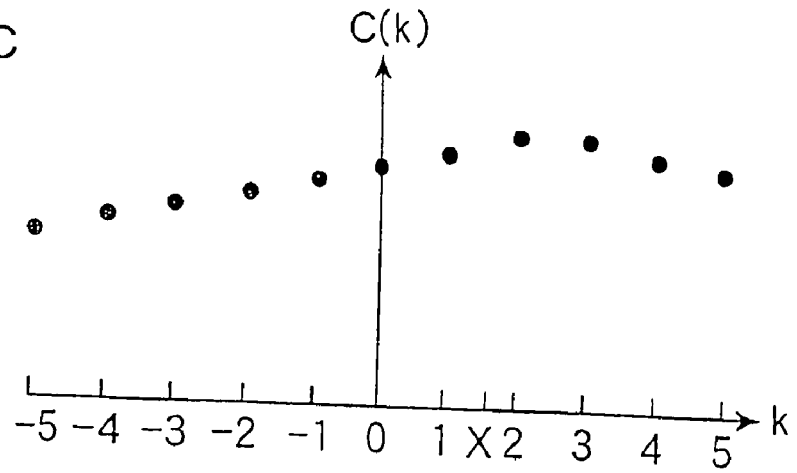

The results of the arithmetic operation executed as expressed in (2) may indicate that the correlation quantity C(k) assumes the smallest value (the smaller the value, the higher the correlation level) at the shift quantity k=kj=2 at which the pair of sets of data achieve a high level of correlation as shown in FIG. 15A. In step 380, the shift quantity x, which gives the smallest value C(x) in the continuous correlation quantity graph is determined by adopting a three-point interpolation method expressed in (3)-(6) below.

$$x = kj + D/\text{SLOP} \qquad (3)$$
$$C(x) = C(kj) - |D| \qquad (4)$$
$$D = \{C(kj-1) - C(kj+1)\}/2 \qquad (5)$$
$$\text{SLOP} - \text{MAX}\{C(kj+1) - C(kj), C(kj-1) - C(kj)\} \qquad (6)$$

In step 390, a defocus amount DEF indicating the extent of defocusing of the subject image plane relative to the predetermined imaging plane is determined as expressed in (7)

below in correspondence to the shift quantity x determined as expressed in (3).

$$DEF = KX \cdot PY \cdot x \quad (7)$$

PY in expression (7) represents the detection pitch, whereas KX in expression (7) represents the conversion coefficient that is determined in correspondence to the opening angle formed with the gravitational centers of the pair of range-finding pupils. The judgment as to whether or not the calculated defocus amount DEF is reliable is made as follows. As shown in FIG. 15B, the interpolated minimum value C(x) of the correlation quantity increases when the level of correlation between the pair of sets of data is low. Accordingly, if C(x) is equal to or greater than a predetermined value, the defocus amount is judged to be less reliable. Alternatively, C(x) may be standardized with regard to the data contrast, and in such a case, if the value obtained by dividing C(x) by SLOP indicating a value in proportion to the contrast is equal to or greater than a predetermined value, the defocus amount should be judged to be not reliable. As a further alternative, if SLOP indicating the value in proportion to the contrast is equal to or less than a predetermined value, the subject should be judged to be a low contrast subject and, accordingly, the reliability of the calculated defocus amount DEF should be judged to be low.

If the level of correlation between the pair of sets of data is low and the correlation quantity C(k) does not dip at all over the shift range kmin to kmax, as shown in FIG. 15C, the minimum value C(x) cannot be determined. Under such circumstances, it is judged that the focus detection is disabled. If, on the other hand, focus detection is possible, the defocus amount is calculated by multiplying the image shift quantity having been calculated by the predetermined conversion coefficient. In step 400, the focus detection operation processing (correlation operation processing) ends and the operation makes a return.

(Correlation Operation)

Figure 16:
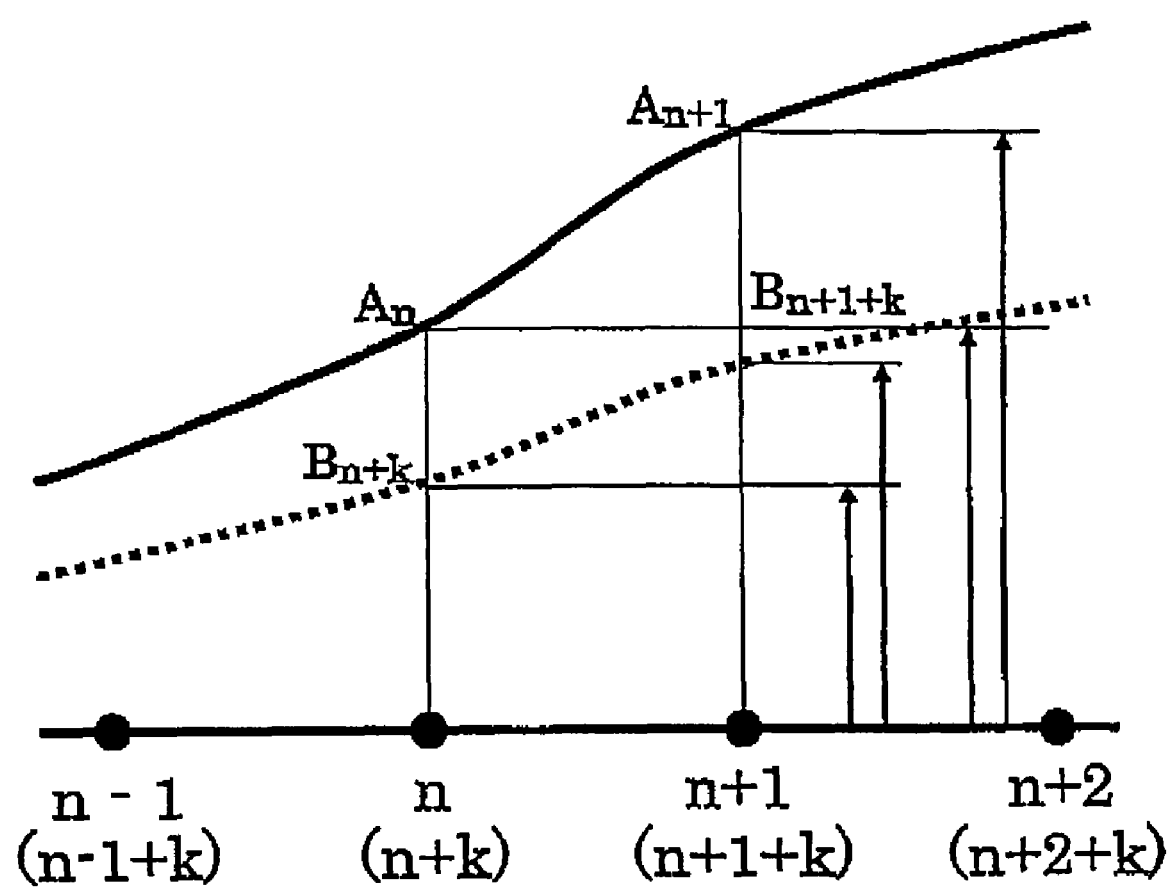
FIG. 16 illustrates the concept of the correlation operation executed in the first embodiment.

Next, an embodiment of the correlation operation processing shown in FIG. 14 is explained. FIG. 16, provided to illustrate the concept of the correlation operation executed in the embodiment, indicates that a gain difference has manifested between the waveforms of the two signal data strings due to distortion occurring in the first signal data string $A_1 \sim A_N$ represented by the solid line and the second signal data string $B_1 \sim B_N$ represented by the dotted line, which may be attributable to an eclipse at the exchangeable lens 202. Even when such a gain difference manifests, the characteristics of the signal data strings over the "miniscule range", i.e., the ratios $A_n/A_{n+1}$ and $B_{n+k}/B_{n+1+k}$ of the adjacent sets of data, are not greatly affected. Since the characteristics $A_n/A_{n+1}$ and $B_{n+k}/B_{n+1+k}$ over this "miniscule range" contain denominators, the adverse effect of divergence that would occur if either denominator takes on the value of 0 or the adverse effect of noise occurring when the denominators assume small values can be minimized by multiplying the characteristics over the "miniscule range" by the common term $(A_{n+1} \times B_{n+1+k})$ which is the product of values taken in the denominators.

For instance, $A_n \times B_{n+1+k}$ and $B_{n+k} \times A_{n+1}$ may be obtained by multiplying the ratios $A_n/A_{n+1}$ and $B_{n+k}/B_{n+1+k}$ of the adjacent sets of data by the common term $(A_{n+1} \times B_{n+1+k})$ of the denominators. Then, by determining the correlation of the characteristics of the two signal data strings over the "miniscule range" calculated as described above, e.g., by determining the absolute value of the difference between the characteristics, the correlation level (similarity level) indicating the level of correlation between the two signal data strings can be detected with high accuracy. In addition, by cumulatively calculating the correlation level while shifting the position of the "miniscule range" over a predetermined range, any chance correlation that has occurred can be eliminated and thus, very accurate correlation detection is enabled.

First operation data $(A_n \times B_{n+1+k})$ or $(A_n \times B_{n+2+k})$ are generated by multiplying a given set of data $A_n$ in the first signal data string $A_1 \sim A_n$ nearby data present near the data $B_{n+k}$ corresponding to the data $A_n$ in the second signal data string $B_1 \sim B_N$ shifted by the shift quantity k. Such nearby data may be data $B_{n+1+k}$ directly adjacent to the data $B_{n+k}$ or data $B_{n+2+k}$, which is the second set of data obtained after the data $B_{n+k}$. Also, second operation data $(B_{n+k} \times A_{n+1})$ or $(B_{n+k} \times A_{n+2})$ are generated by multiplying the data $B_{n+k}$ in the second signal data string $B_1 \sim B_N$ by nearby data present near the target data $A_n$ in the first data string $A_1 \sim A_N$ e.g., data $A_{n+1}$ directly adjacent to the data $A_{n+k}$ or data $A_{n+2}$, which is the second set of data obtained after the data $A_n$. Then, based upon the first operation data and the second arithmetic operation data, the level of correlation existing between the first signal data string and the second signal data string is determined as expressed in (2). This correlation operation is explained later by quoting specific processing examples 1 and 2.

As an alternative to the correlation operation described above, operation data may be obtained by executing a first arithmetic operation on data present over a given range in the first signal data string $A_1 \sim A_N$, i.e. the miniscule data range $A_{n-r}$ to $A_{n+s}$ containing the target data $A_n$, and operation data may also be obtained by executing a second arithmetic operation on the data $B_{n+k}$ in the second signal data string $B_1 \sim B_N$ shifted by the shift quantity k, which correspond to the target data $A_n$ in the first signal data string, and data in the miniscule range $B_{n-r} \sim B_{n+s}$ containing the data $B_{n+k}$. Then, first operation data may be obtained by calculating the product of these operation data.

In this alternative, operation data should also be obtained by executing the first arithmetic operation on the data $B_{n-r} \sim B_{n+s}$ over the miniscule range in the second signal data string $B_1 \sim B_N$ and operation data are also obtained by executing the second arithmetic operation on the data $A_{n-r} \sim A_{n+s}$ over the miniscule range in the first signal data string $A_1 \sim A_N$. Then, second operation data should be obtained by calculating the product of these operation data.

Consequently, the correlation existing between the first signal data string and the second signal data string is determined as expressed in (2) based upon the first operation data and the second operation data having been obtained as described above. This correlation operation is explained later by quoting specific processing examples 3 through 8.

CORRELATION OPERATION PROCESSING EXAMPLE 1

The correlation quantity C(k) is determined as expressed below.

$$C(k) = \Sigma |(A_n \times B_{n+1+k}) - (B_{n+k} \times A_{n+1})| \quad (8)$$

Figure 17:
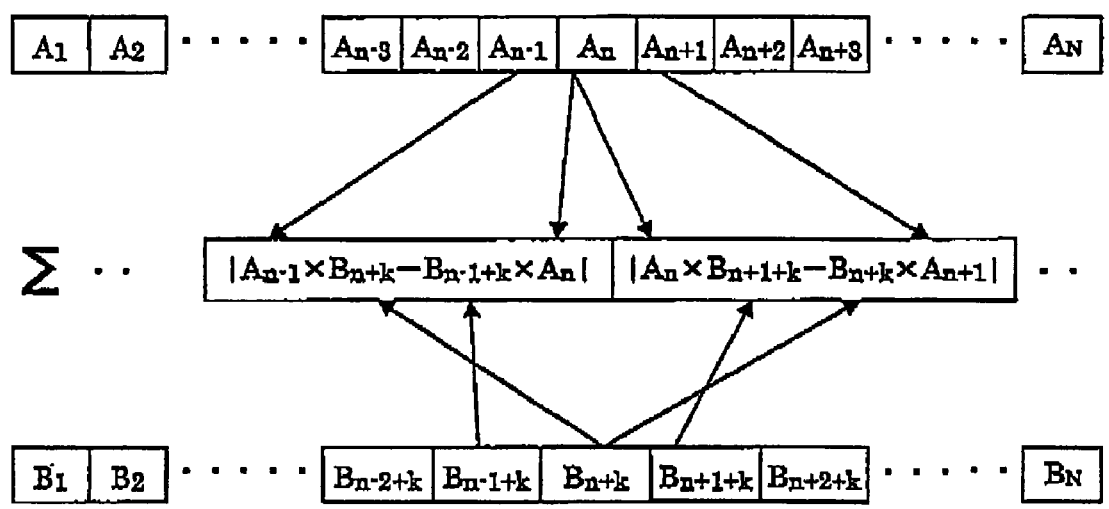
FIG. 17 shows the data flow in correlation operation processing example 1.

In expression (8) the $\Sigma$ operation is cumulatively executed with regard to n and the range assumed for n is limited to the range over which the data $A_n$, $A_{n+1}$, $B_{n+k}$ and $B_{n+1+k}$ exist in correspondence to the shift quantity k. FIG. 17 shows the data flow in correlation operation processing example 1. In processing example 1, first operation data $(A_n \times B_{n+k})$ are obtained by multiplying the target data $A_n$ in the first signal data string A by the data $B_{n+1+k}$ offset by a single data position from the data $B_{n+k}$ in the second signal data string B shifted by the shift quantity k, which correspond to the target data $A_n$. In addition, second operation data $(B_{n+k} \times A_{n+1})$ are obtained by multiplying the data $B_{n+k}$ in the second signal data string B by the data $A_{n+1}$ offset by a single data position from the target data $A_n$ in the first signal data string A. Then, the correlation quantity C(k) for the first signal data string A and the second signal data string B is calculated as the total sum of the absolute values of the differences between the first operation data and the second arithmetic operation data.

Figure 18:
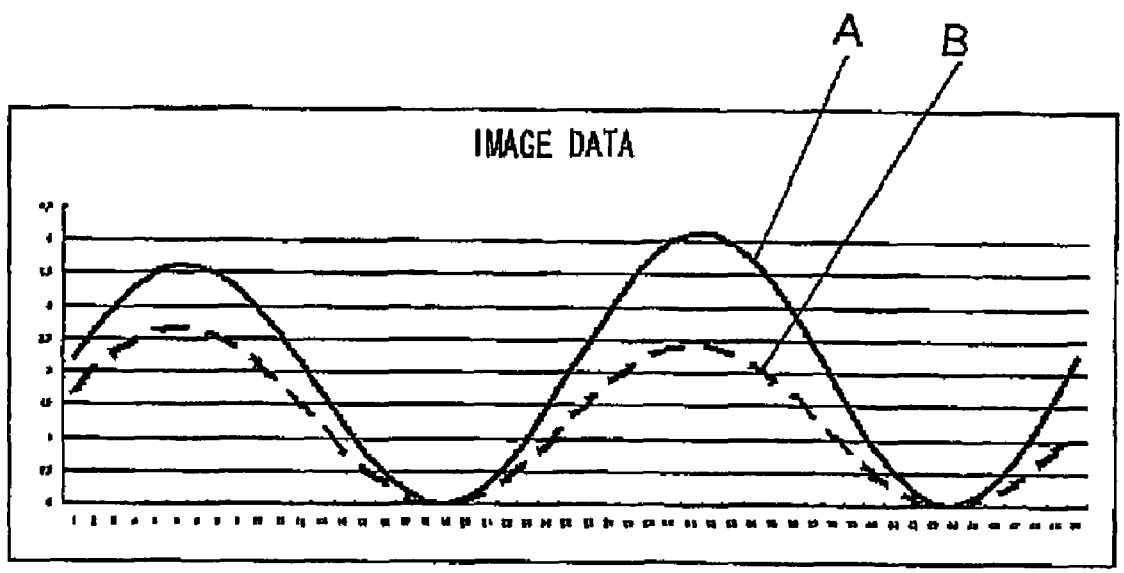
FIG. 18 shows a relative distortion manifesting with regard to two signal data strings A and B.
Figure 19:
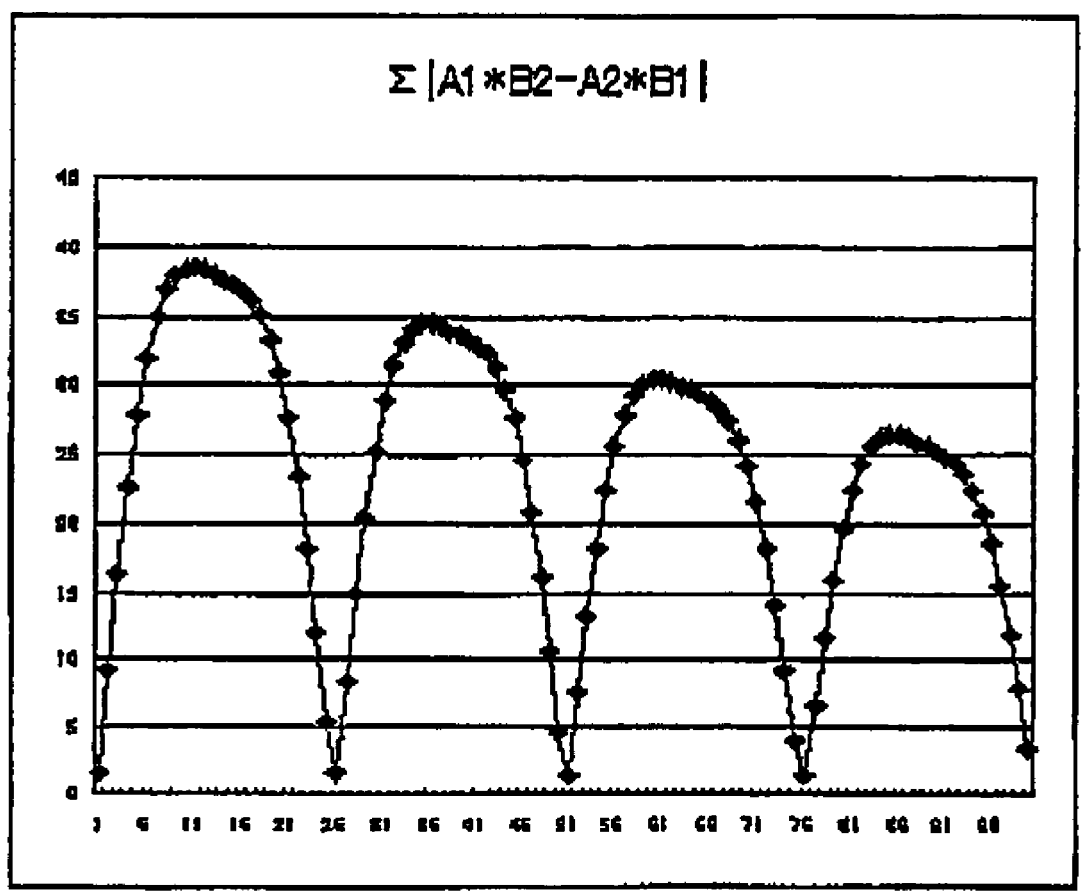
FIG. 19 shows the results obtained by executing the processing in correlation operation processing example 1.

Now, let us consider the correlation operation in correlation operation processing example 1 executed on a pair of image signal data strings A and B such as those shown in FIG. 18. Let us assume that a relative distortion has occurred in the pair of image signal data strings $(A_1, A_2, \ldots A_N)$ and $(B_1, B_2, \ldots B_N)$ output from the image sensor 211 and that differences in the gain and the slope between the waveforms (1+sin ω) of the two image signal data strings have resulted as shown in FIG. 18. FIG. 19 presents the results of the correlation operation in correlation operation processing example 1 executed on these two signal data strings A and B. As FIG. 19 clearly indicates, although the two signal data strings A and B are distorted, a high level of correlation is cyclically achieved (at the dipped positions) by executing the correlation operation in correlation operation processing example 1.

Compared to the correlation operation method in the related art described earlier in which the correlation quantity C(k) for the two signal data strings is calculated simply as the total sum $\Sigma |A_n - B_{n+k}|$ of the absolute values of the differences between the two signal data strings A and B, the correlation quantity indicating the level of correlation between the two signal data strings A and B can be determined with a higher level of accuracy even when a relative distortion has occurred in the two signal data strings A and B by adopting correlation operation processing example 1. In addition, since correlation operation expression (8) used in correlation operation processing example 1 does not assume a fraction format, an operational divergence that would occur if a value of 0 is assumed for a denominator, is prevented and the adverse effect of noise manifesting when a denominator takes on a value close to 0 is eliminated as well.

CORRELATION OPERATION PROCESSING EXAMPLE 2

The correlation quantity C (k) is determined as expressed below.

$$C(k) = \Sigma |(A_n \times B_{n+2+k}) - (B_{n+k} \times A_{n+2})| \qquad (9)$$

Figure 20:
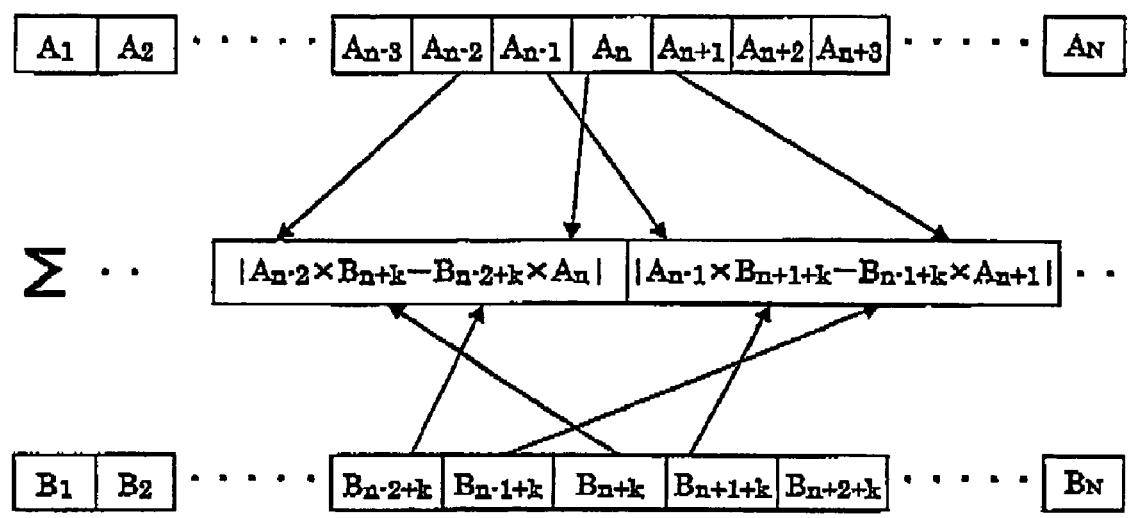
FIG. 20 shows the data flow in correlation operation processing example 2.

In expression (9), the Σ operation is cumulatively executed with regard to n and the range assumed for n is limited to the range over which the data $A_n, A_{n+2}, B_{n+k}'$ and $B_{n+2+k}$ exist in correspondence to the shift quantity k. FIG. 20 shows the data flow in correlation operation processing example 2. A correlation operation in correlation operation processing example 2 is executed by using a wider range of data compared to the range of data used in correlation operation processing example 1 expressed in (8).

Figure 21:
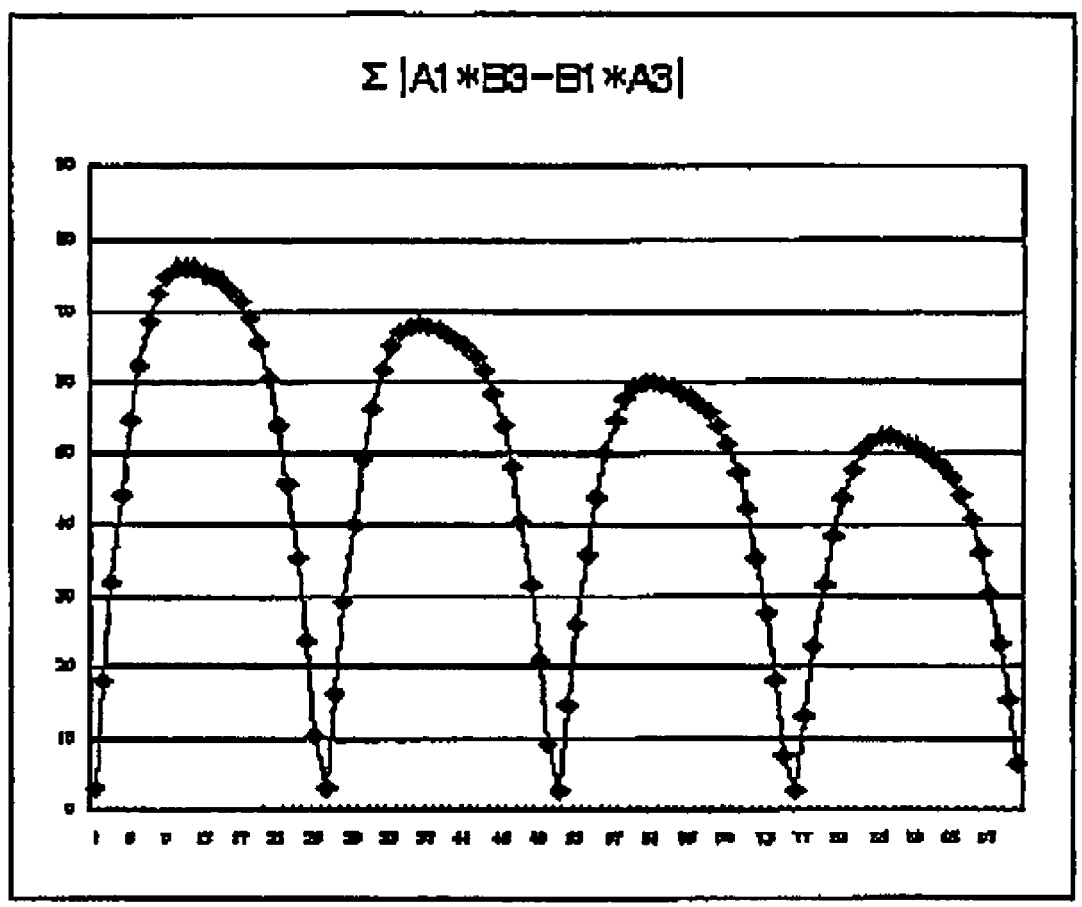
FIG. 21 shows the results obtained by executing the processing in correlation operation processing example 2.

FIG. 21 presents the results of the correlation operation in correlation operation processing example 2 executed on the two signal data strings A and B shown in FIG. 18 manifesting a relative distortion. As FIG. 21 clearly indicates, although the two signal data strings A and B are distorted, a high level of correlation is cyclically achieved (at the dipped positions) by executing the correlation operation in correlation operation processing example 2. In addition to the advantages achieved through correlation operation processing 1, correlation operation processing example 2, in which the data $B_{n+2+k}$ and the data $A_{n+2}$, offset by two data positions from the target data $B_{n+k}$ and $A_n$ are used in the arithmetic operations and thus, a wider range of data is used for the arithmetic operations, reduces the adverse effects of the high frequency component and noise contained in the signal data strings, resulting in improved anti-noise performance.

CORRELATION OPERATION PROCESSING EXAMPLE 3

The correlation quantity C (k) is determined as expressed below.

$$C(k) = \Sigma |(A_n - A_{n+1}) \times (B_{n+k} + B_{n+1+k}) - (B_{n+k} - B_{n+1+k}) \times (A_n + A_{n+1})| \qquad (10)$$

Figure 22:
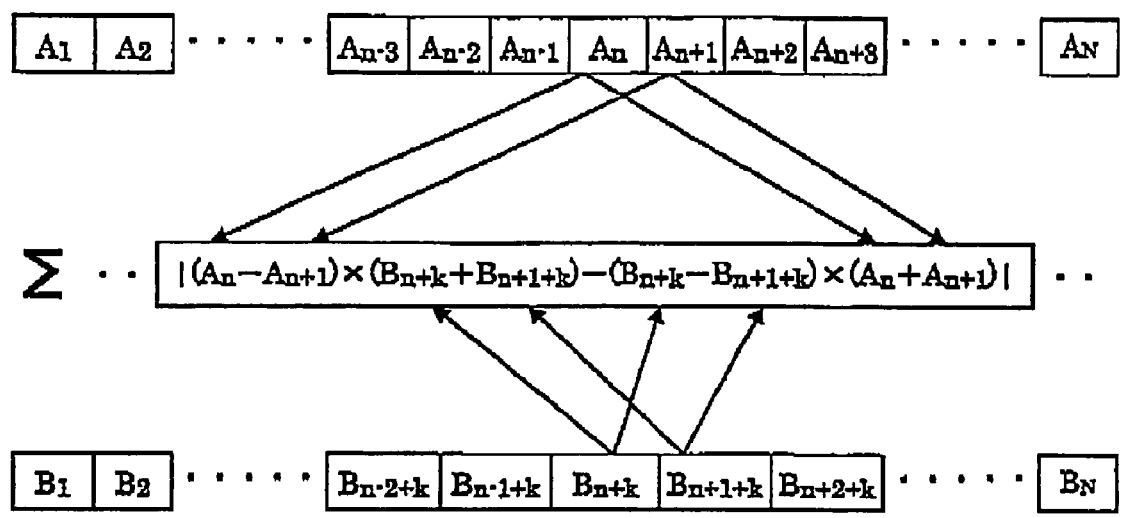
FIG. 22 shows the data flow in correlation operation processing example 3.

In expression (10), the Σ operation is cumulatively executed with regard to n and the range assumed for n is limited to the range over which data $A_n, A_{n+1}, B_{n+k}$ and $B_{n+1+k}$ exist in correspondence to the shift quantity k. FIG. 22 shows the data flow in correlation operation processing example 3.

As expression (10) indicates, operation data $(A_n - A_{n+1})$ are obtained by executing a first arithmetic operation to determine the difference, i.e., the linear differential between adjacent sets of data in a miniscule range containing the target data $A_n$ and the nearby data $A_{n+1}$ in the first signal data string A and operation data $(B_{n+k} + B_{n+1+k})$ are obtained through addition, i.e., averaging (second arithmetic operation), of data in the miniscule range containing the data $B_{n+k}$ in the second signal data string shifted by the shift quantity k, which correspond to the target data $A_n$ in the first signal data string and nearby data $B_{n+1+k}$ in correlation operation processing example 3. Then, first operation data $(A_n - A_{n+1}) \times (B_{n+k} + B_{n+1+k})$ are obtained by calculating the product of these operation data.

In addition, operation data $(B_{n+k} - B_{+1+k})$ are obtained by taking the difference between the adjacent sets of data, i.e., by taking the linear differential (first arithmetic operation), over the miniscule range containing the data $B_{n+k}$ and the data $B_{n+1+k}$ in the second signal data string B and operation data $(A_n + A_{n+1})$ are obtained through addition, i.e., averaging (second arithmetic operation) of the data over the miniscule range in the first signal data string A containing the data $A_n$ and the data $A_{n+1}$. Second operation data $(B_{n+k} - B_{n+1+k}) \times (A_n + A_{n+1})$ are then obtained by calculating the product of these operation data. Consequently, based upon the first operation data and the second arithmetic operation data, the correlation between the first signal data string and the second signal data string is determined as expressed in (2).

Figure 23:
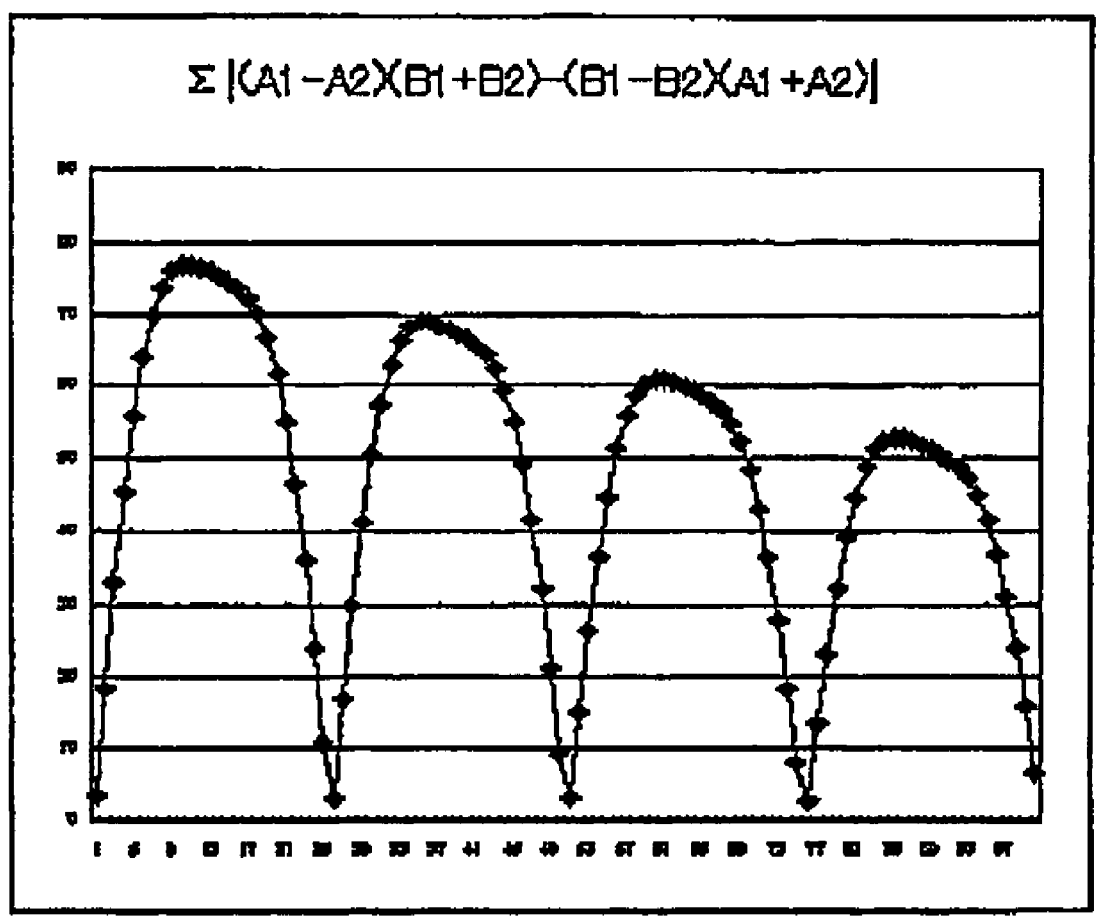
FIG. 23 shows the results obtained by executing the processing in correlation operation processing example 3.

FIG. 23 presents the results of the correlation operation in correlation operation processing example 3 executed on the two signal data strings A and B shown in FIG. 18 manifesting a relative distortion. As FIG. 23 clearly indicates, although the two signal data strings A and B are distorted, a high level of correlation is cyclically achieved (at the dipped positions) by executing the correlation operation in correlation operation processing example 3. In addition to the advantages achieved through correlation operation processing 1, correlation operation processing example 3, in which the characteristics of each signal data string is represented by the ratio of the difference (linear differential) between the adjacent sets of data and the average value of the values corresponding to the adjacent sets of data, achieves an advantage in that the adverse effects of the high frequency component and the noise contained in the signal data strings are lessened to result in better anti-noise performance. Furthermore, since the DC component contained in the signal data strings A and B is eliminated, highly accurate correlation detection is enabled even when a DC offset is contained in the two signal data strings A and B.

CORRELATION OPERATION PROCESSING EXAMPLE 4

The correlation quantity C(k) is determined as expressed below.

$$C(k)=\Sigma|(A_n-A_{n+2})\times(B_{n+k}+B_{n+2+k})-(B_{n+k}-B_{n+2+k})\times(A_n+A_{n+2})| \quad (11)$$

Figure 24:
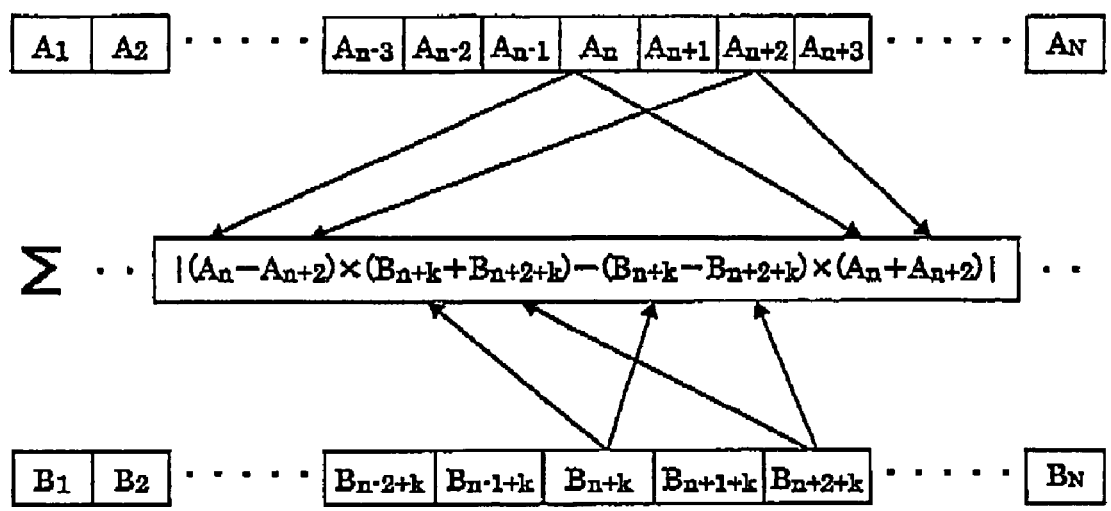
FIG. 24 shows the data flow in correlation operation processing example 4.

In expression (11), the Σ operation is cumulatively executed with regard to n and the range assumed for n is limited to the range over which the data $A_n$, $A_{n+2}$, $B_{n+k}$ and $B_{n+2+k}$ exist in correspondence to the shift quantity k. FIG. 24 shows the data flow in correlation operation processing example 4. The correlation operation in correlation operation processing example 4 is executed by using a wider range of data compared to the range of data used in correlation operation processing example 3 expressed in (10).

Figure 25:
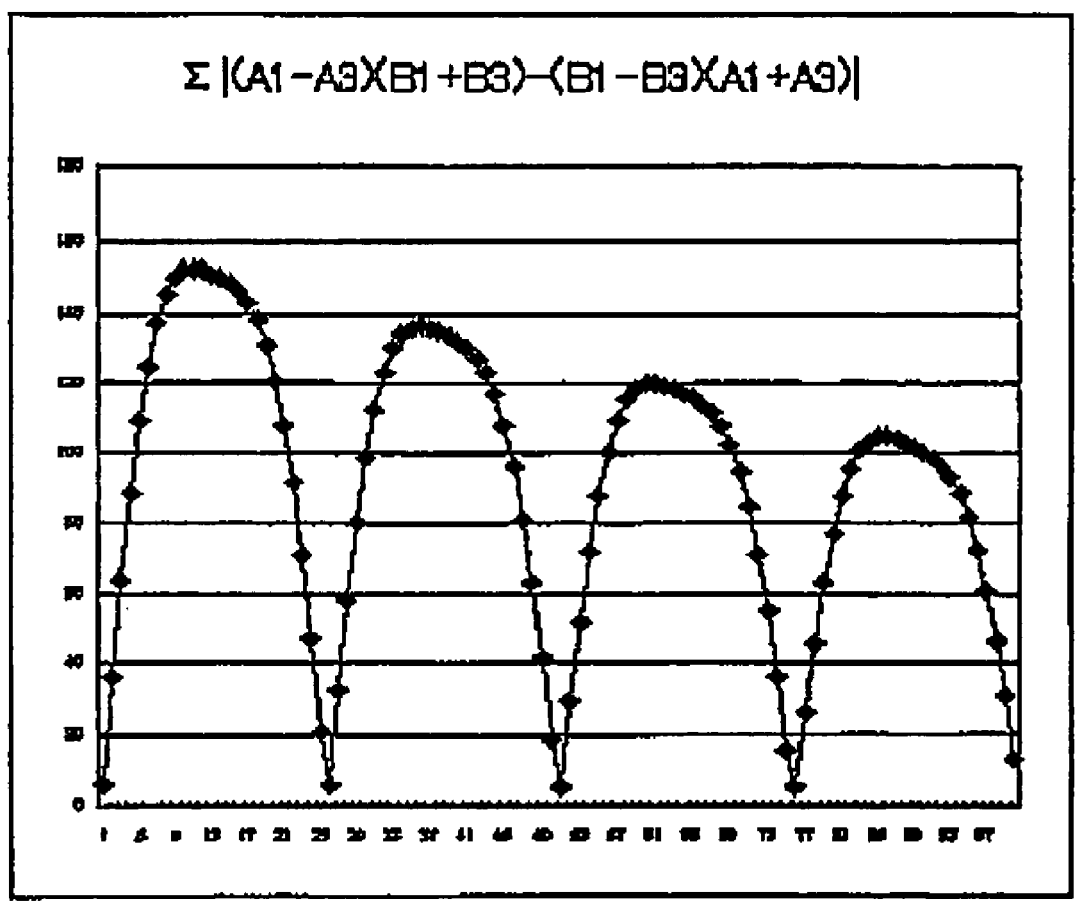
FIG. 25 shows the results obtained by executing the processing in correlation operation processing example 4.

FIG. 25 presents the results of the correlation operation in correlation operation processing example 4 executed on the two signal data strings A and B shown in FIG. 18 manifesting a relative distortion. As FIG. 25 clearly indicates, although the two signal data strings A and B are distorted, a high level of correlation is cyclically achieved (at the dipped positions) by executing the correlation operation in correlation operation processing example 4. In addition to the advantages achieved through correlation operation processing 1, correlation operation processing example 4, in which a wider range of data is used for the arithmetic operations reduces the adverse effects of the high frequency component and noise contained in the signal data strings, resulting in improved anti-noise performance.

CORRELATION OPERATION PROCESSING EXAMPLE 5

The correlation quantity C(k) is determined as expressed below.

$$C(k)=\Sigma|(2\times A_n-A_{n-1}-A_{n+1})\times(B_{n-1+k}+B_{n+k}+B_{n+1+k})-(2\times B_{n+k}-B_{n-1+k}-B_{n+1+k})\times(A_{n-1}+A_n+A_{n+1})| \quad (12)$$

Figure 26:
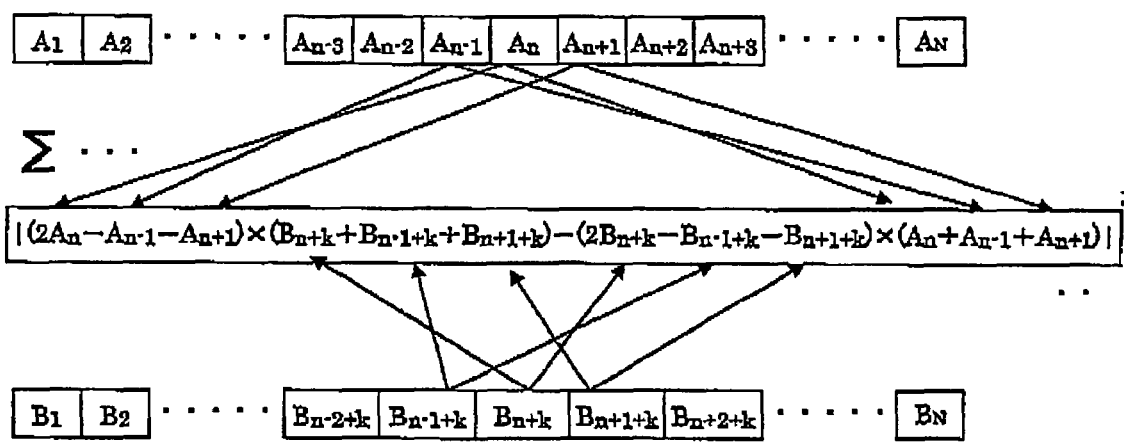
FIG. 26 shows the data flow in correlation operation processing example 5.

In expression (12), the Σ operation is cumulatively executed with regard to n and the range assumed for n is limited to the range over which the data $A_{n-1}$, $A_n$, $A_{n+1}$, $B_{n-1+k}$, $B_{n+k}$ and $B_{n+1+k}$ exist in correspondence to the shift quantity k. FIG. 26 shows the data flow in correlation operation processing example 5. The correlation operation expression used in correlation operation processing example 5 indicates the characteristics of each signal data string as the ratio of the difference between the adjacent sets of data (quadratic differential: equivalent to the first arithmetic operation) and the average of the adjacent sets of data (equivalent to the second arithmetic operation).

Figure 27:
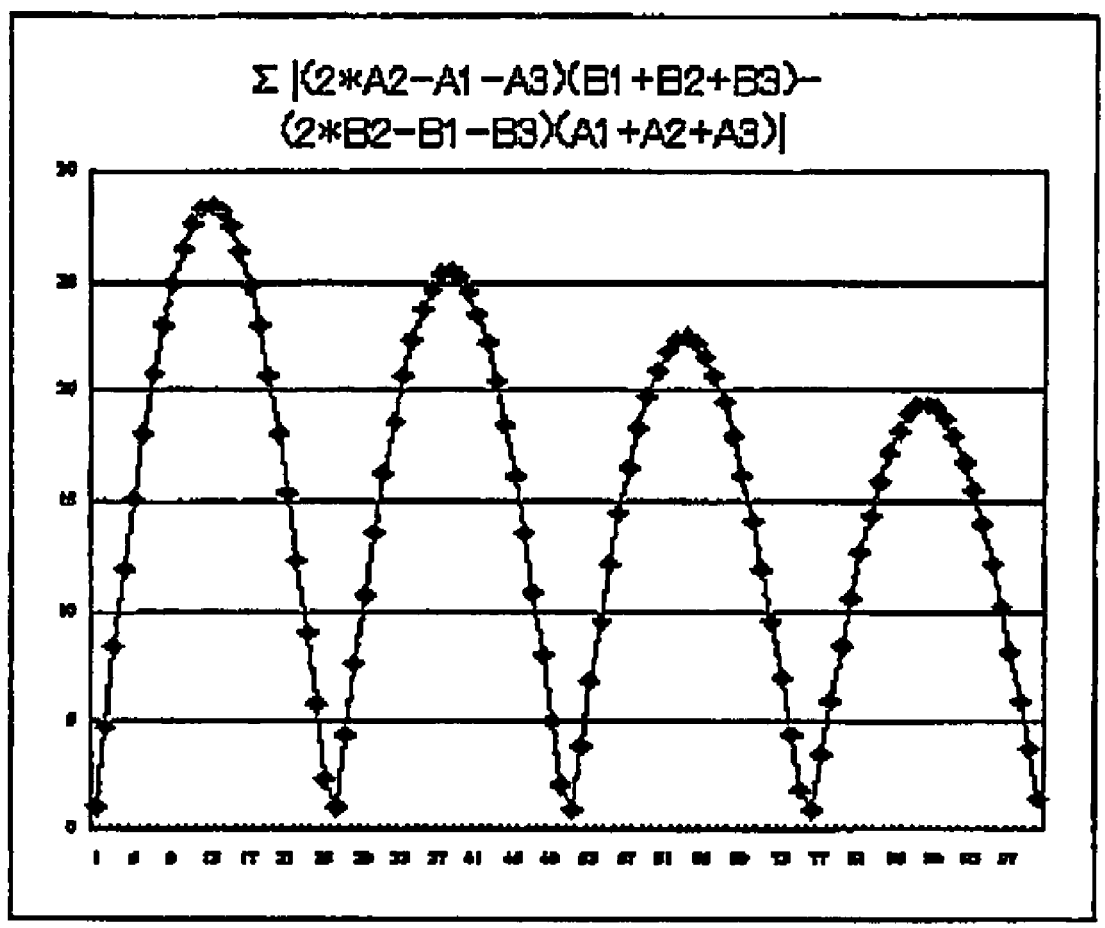
FIG. 27 shows the results obtained by executing the processing in correlation operation processing example 5.

FIG. 27 presents the results of the correlation operation in correlation operation processing example 5 executed on the two signal data strings A and B shown in FIG. 18 manifesting a relative distortion. As FIG. 27 clearly indicates, although the two signal data strings A and B are distorted, a high level of correlation is cyclically achieved (at the dipped positions) by executing the correlation operation in correlation operation processing example 5. In addition to the advantages achieved through correlation operation processing 1, correlation operation processing example 5, achieves an advantage in that the adverse effects of the high frequency component and the noise contained in the signal data strings are lessened to result in better anti-noise performance. Furthermore, since the DC component and the linear slope component contained in the signal data strings A and B are eliminated, highly accurate correlation detection is enabled even when a DC offset or a difference in the linear slope component is contained in the two signal data strings A and B.

CORRELATION OPERATION PROCESSING EXAMPLE 6

The correlation quantity C(k) is determined as expressed below.

$$C(k)=\Sigma|(2\times A_n-A_{n-2}-A_{n+2})\times(B_{n-2+k}+B_{n+k}+B_{n+2+k})-(2\times B_{n+k}-B_{n-2+k}-B_{n+2+k})\times(A_{n-2}+A_n+A_{n+2})| \quad (13)$$

Figure 28:
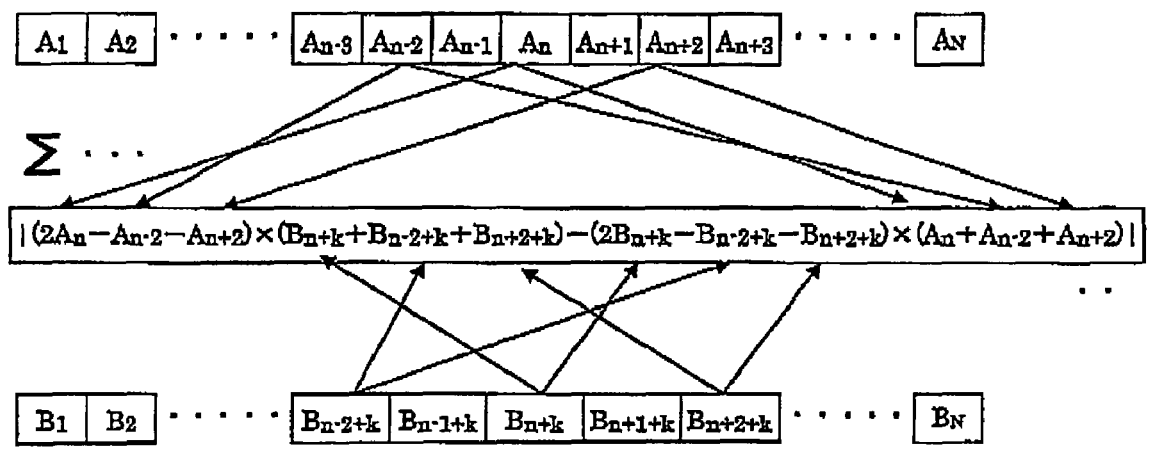
FIG. 28 shows the data flow in correlation operation processing example 6.

In expression (13), the Σ operation is cumulatively executed with regard to n and the range assumed for n is limited to the range over which the data $A_{n-2}$, $A_n$, $A_{n+2}$, $B_{n-2+k}$, $B_{n+k}$ and $B_{n+2+k}$ exist in correspondence to the shift quantity k. FIG. 28 shows the data flow in a correlation operation processing example 6. The correlation operation in correlation operation processing example 6 is executed by using a wider range of data compared to the range of data used in correlation operation processing example 5 expressed in (12).

Figure 29:
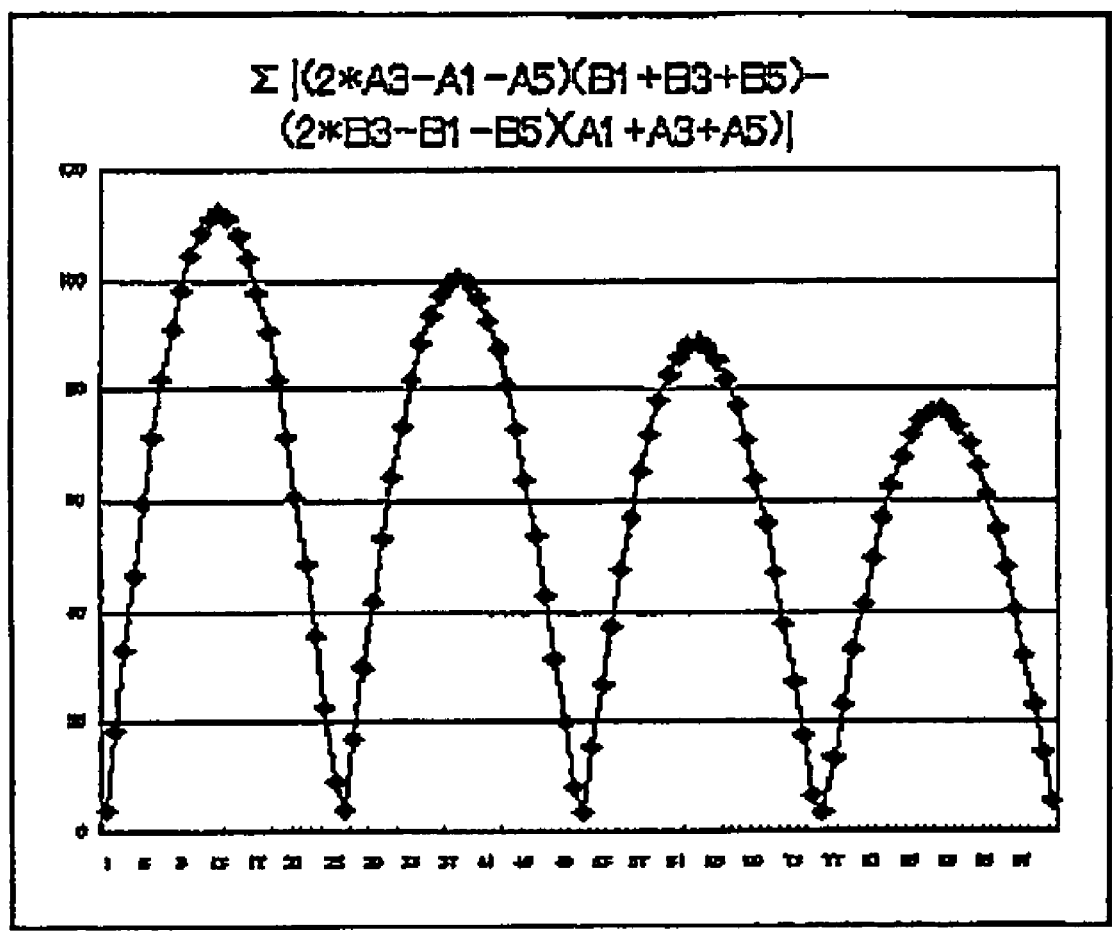
FIG. 29 shows the results obtained by executing the processing in correlation operation processing example 6.

FIG. 29 presents the results of the correlation operation in correlation operation processing example 6 executed on the two signal data strings A and B shown in FIG. 18 manifesting a relative distortion. As FIG. 29 clearly indicates, although the two signal data strings A and B are distorted, a high level of correlation is cyclically achieved (at the dipped positions) by executing the correlation operation in correlation operation processing example 6. In addition to the advantages achieved through correlation operation processing 5, correlation operation processing example 6, in which a wider range of data is used for the arithmetic operations, reduces the adverse effects of the high frequency component and noise contained in the signal data strings, resulting in improved anti-noise performance.

CORRELATION OPERATION PROCESSING EXAMPLE 7

The correlation quantity C(k) is determined as expressed below.

$$C(k)=\Sigma|(A_n^2\times B_{n-1+k}\times B_{n+1+k})-(B_{n+k}^2\times A_{n-1}\times A_{n+1})| \quad (14)$$

Figure 30:
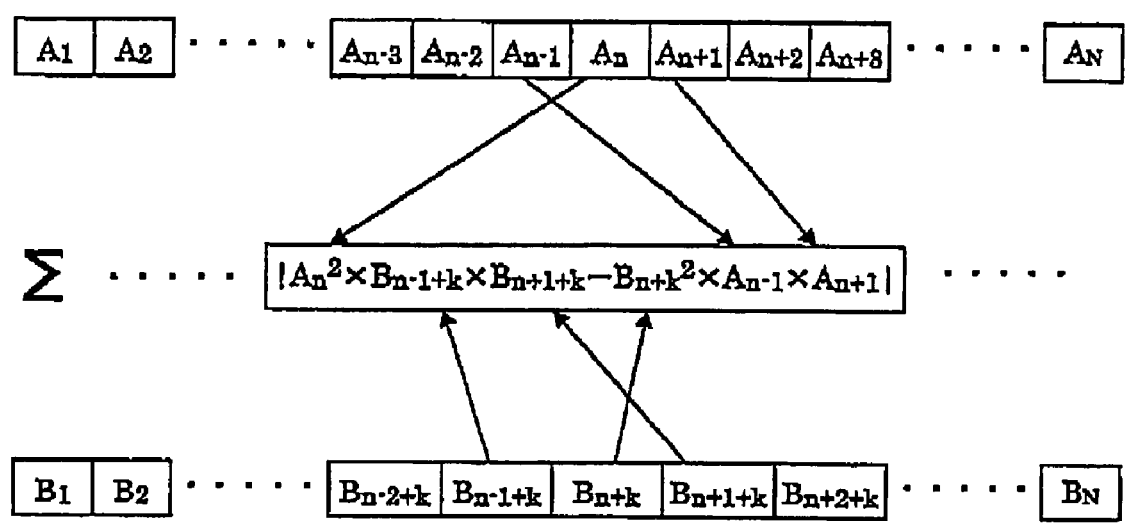
FIG. 30 shows the data flow in correlation operation processing example 7.

In expression (14), the Σ operation is cumulatively executed with regard to n and the range assumed for n is limited to the range over which the data $A_{n-1}$, $A_n$, $A_{n+1}$, $B_{n-1+k}$, $B_{n+k}$ and $B_{n+1+k}$, exist in correspondence to the shift quantity k. FIG. 30 shows the data flow in correlation operation processing example 7.

Figure 31:
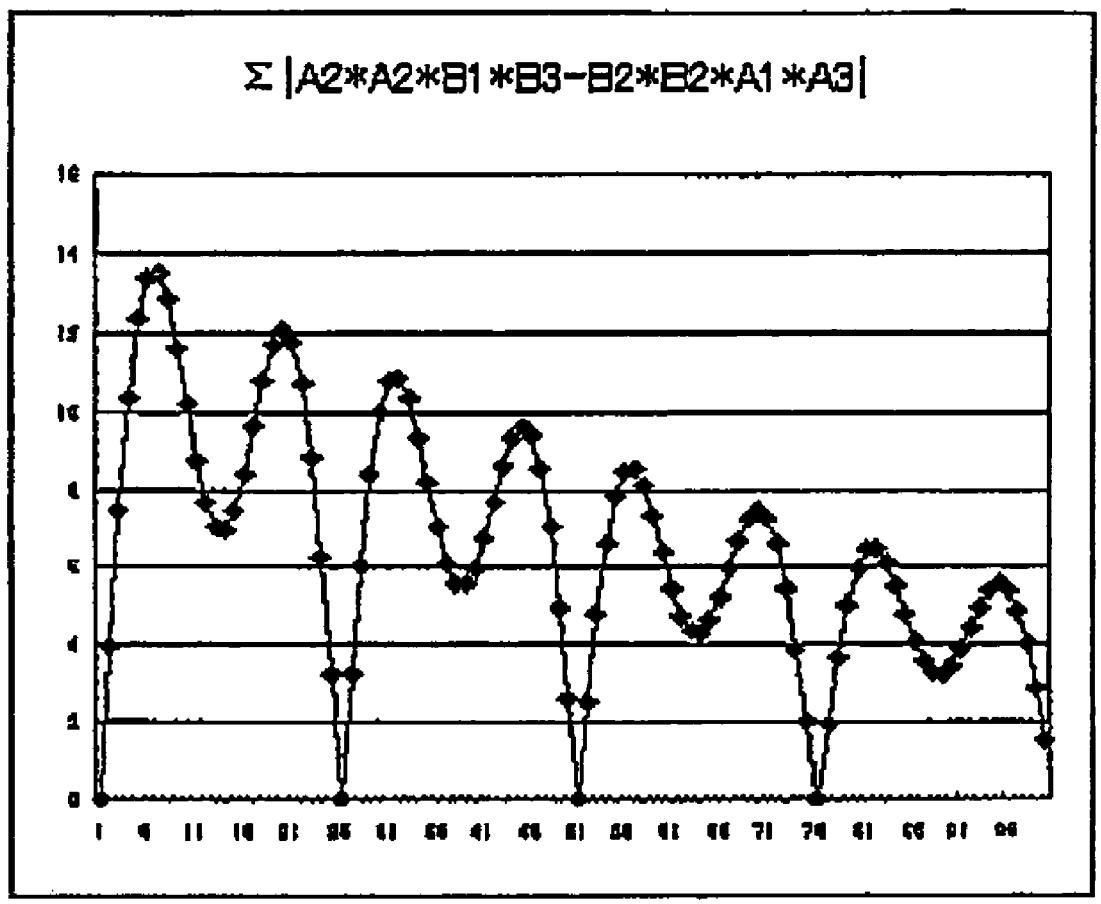
FIG. 31 shows the results obtained by executing the processing in correlation operation processing example 7.

FIG. 31 presents the results of the correlation operation in correlation operation processing example 7 executed on the two signal data strings A and B, in FIG. 18 manifesting a relative distortion. As FIG. 31 clearly indicates, although the two signal data strings A and B are distorted, a high level of correlation is cyclically achieved (at the dipped positions) by executing the correlation operation in correlation operation processing example 7. In addition, since the correlation operation expression (14) used in correlation operation processing example 7 does not assume a fraction format, an operational divergence that would occur if the value of 0 is assumed for a denominator, is prevented and the adverse effect of noise manifesting when a denominator takes on a value close to 0 is eliminated as well.

CORRELATION OPERATION PROCESSING
EXAMPLE 8

The correlation quantity C(k) is determined as expressed below.

$$C(k)=\Sigma|(A_n^2 \times B_{n-2+k} \times B_{n+2+k})-(B_{n+k}^2 \times A_{n-2} \times A_{n+2})| \quad (15)$$

Figure 32:
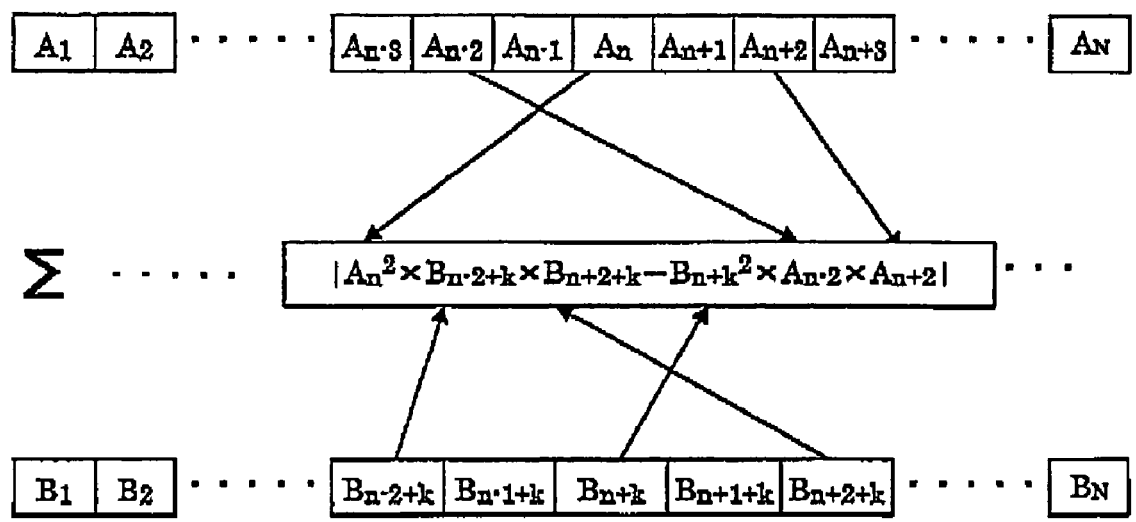
FIG. 32 shows the data flow in correlation operation processing example 8.

In expression (15), the Σ operation is cumulatively executed with regard to n and the range assumed for n is limited to the range over which the data $A_{n-2}$, $A_n$, $A_{n+2}$, $B_{n-2+k}$, $B_{n+k}$ and $B_{n+2+k}$ exist in correspondence to the shift quantity k. The correlation operation in correlation operation processing example 8 is executed by using a wider range of data compared to correlation operation processing example 7 expressed in (14). FIG. 32 shows the data flow in a correlation operation processing example B.

Figure 33:
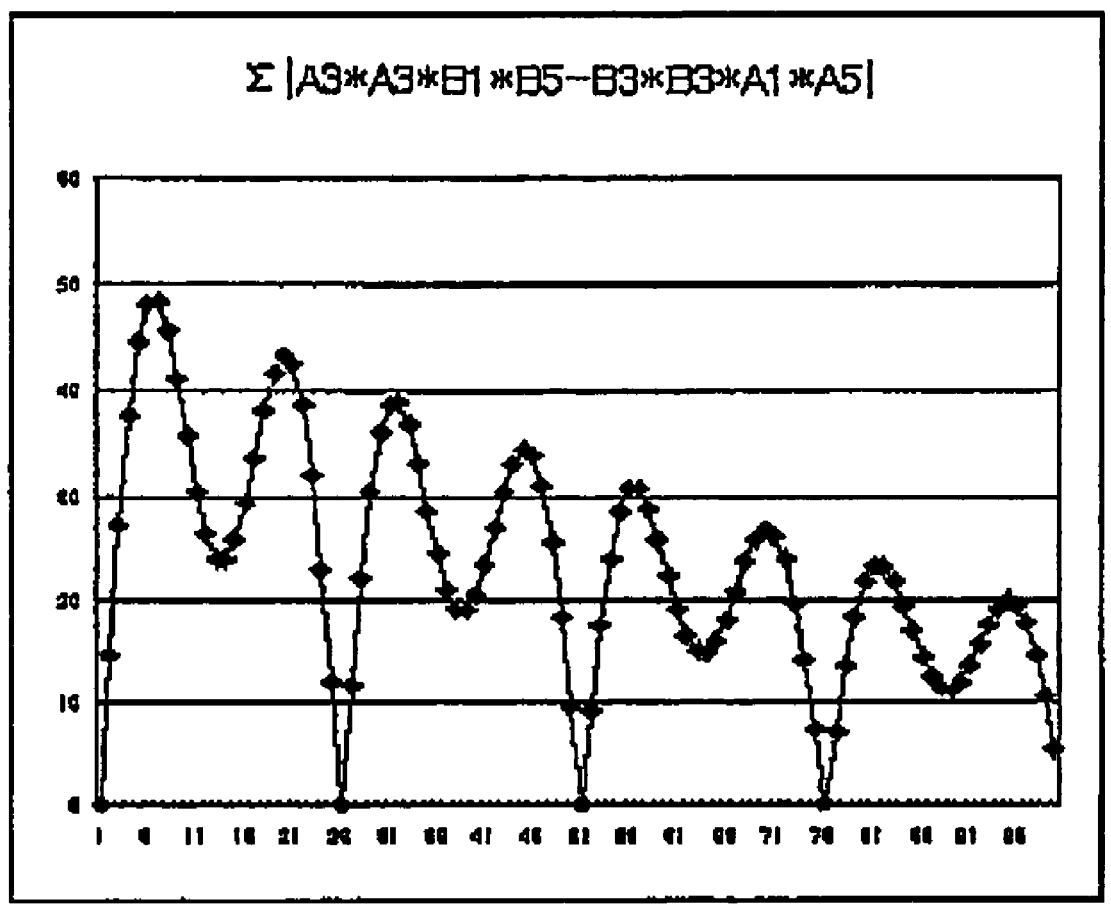
FIG. 33 shows the results obtained by executing the processing in correlation operation processing example 8.

FIG. 33 presents the results of the correlation operation in correlation operation processing example 8 executed on the two signal data strings A and B shown in FIG. 18 manifesting a relative distortion. As FIG. 33 clearly indicates, although the two signal data strings A and B are distorted, a high level of correlation is cyclically achieved (at the dipped positions) by executing the correlation operation in correlation operation processing example 8. In addition to the advantages achieved through correlation operation processing 7, correlation operation processing example 8, in which a wider range of data is used for the arithmetic operations, reduces the adverse effects of the high frequency component and noise contained in the signal data strings, resulting in improved anti-noise performance.

Variations of the First Embodiment

Figure 34:
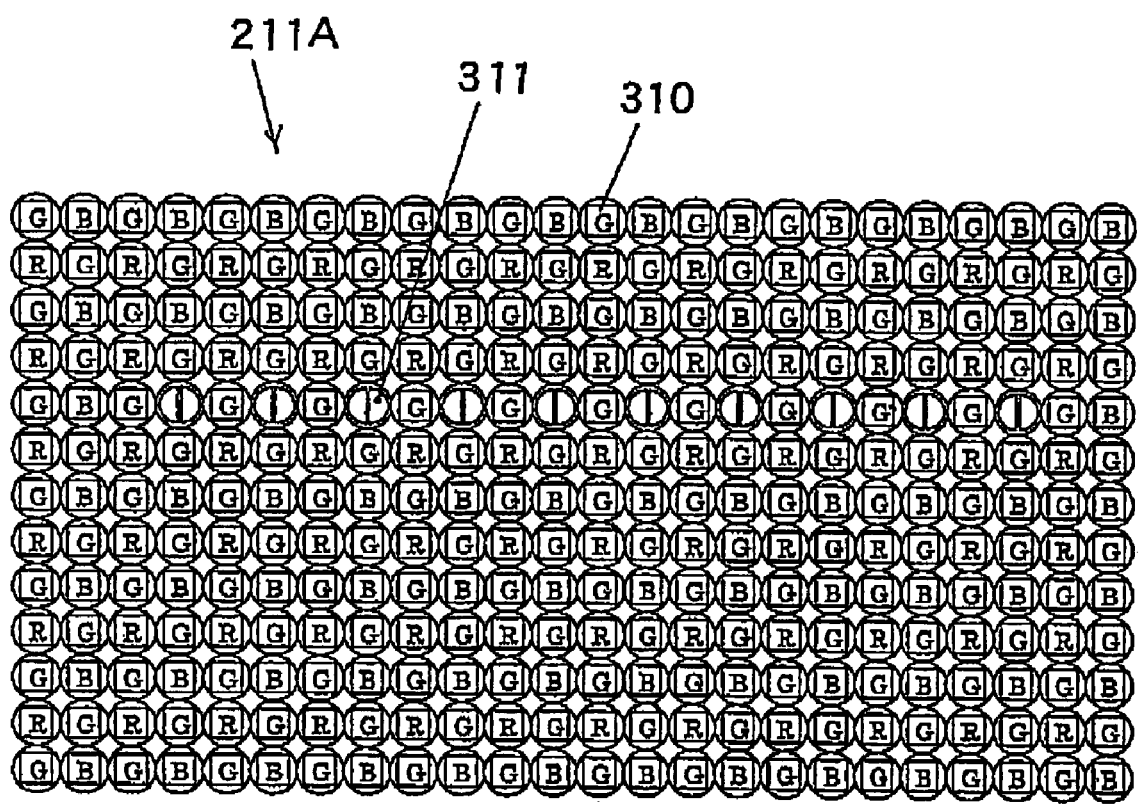
FIG. 34 presents an example of an image sensor that includes focus detection pixels disposed in a single row and each occupying every second position that would otherwise be occupied by a blue pixel.

While the image sensor 211 shown in FIG. 3 includes focus detection pixels 311 disposed with one directly beside the next without any intervals in between, FIG. 34 shows an image sensor 211A with focus detection pixels 311 disposed in a single row, each taking up every other pixel position, which would otherwise be taken up by a blue imaging pixel 310. While this positional arrangement, with the focus detection pixels 311 spaced with intervals from each other, somewhat reduces the focus detection accuracy, the lower density with which the focus detection pixels 311 are arrayed helps improve the quality of the image resulting from interpolation processing executed to obtain image signals at positions occupied by the focus detection pixels 311.

Figure 35A:
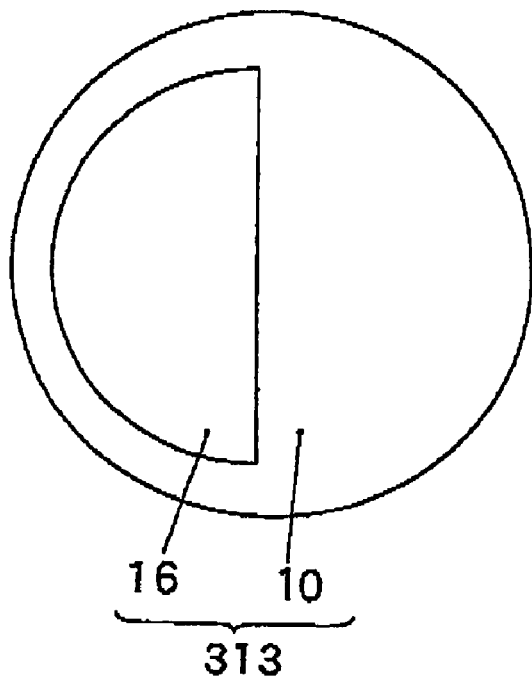
FIGS. 35A and 35B each show a focus detection pixel equipped with a single photoelectric conversion unit.
Figure 35B:
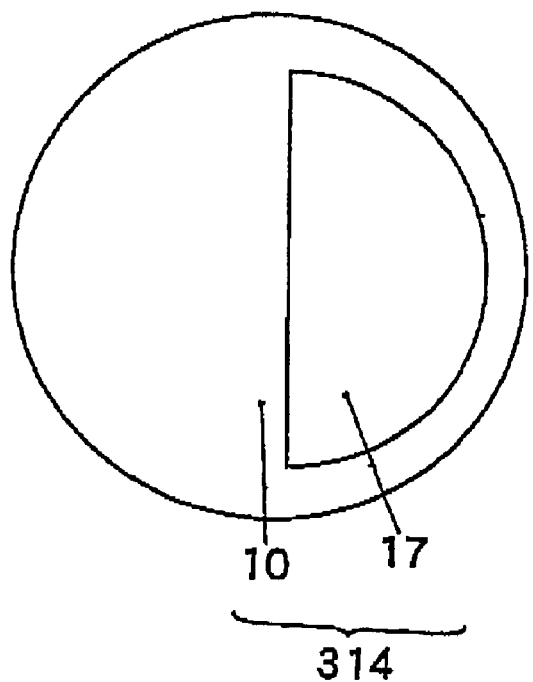

The focus detection pixels 311 at the image sensor 211 in FIG. 3 each include a pair of photoelectric conversion units 12 and 13, as shown in FIG. 5. FIGS. 35A and 35B show focus detection pixels 313 and 314 each equipped with a single photoelectric conversion unit. As shown in FIG. 35A, the focus detection pixel 313 includes a micro-lens 10 and a photoelectric conversion unit 16. The focus detection pixel 314 includes a micro-lens 10 and a photoelectric conversion unit 17, as shown in FIG. 35B. The photoelectric conversion units 16 and 17 projected on to the exit pupil of the exchangeable lens via the micro-lenses 10 form the range-finding peoples 92 and 93 in FIG. 10. Thus, a pair of image outputs to be used in focus detection can be obtained via the focus detection pixels 313 and 314.

Figure 36:
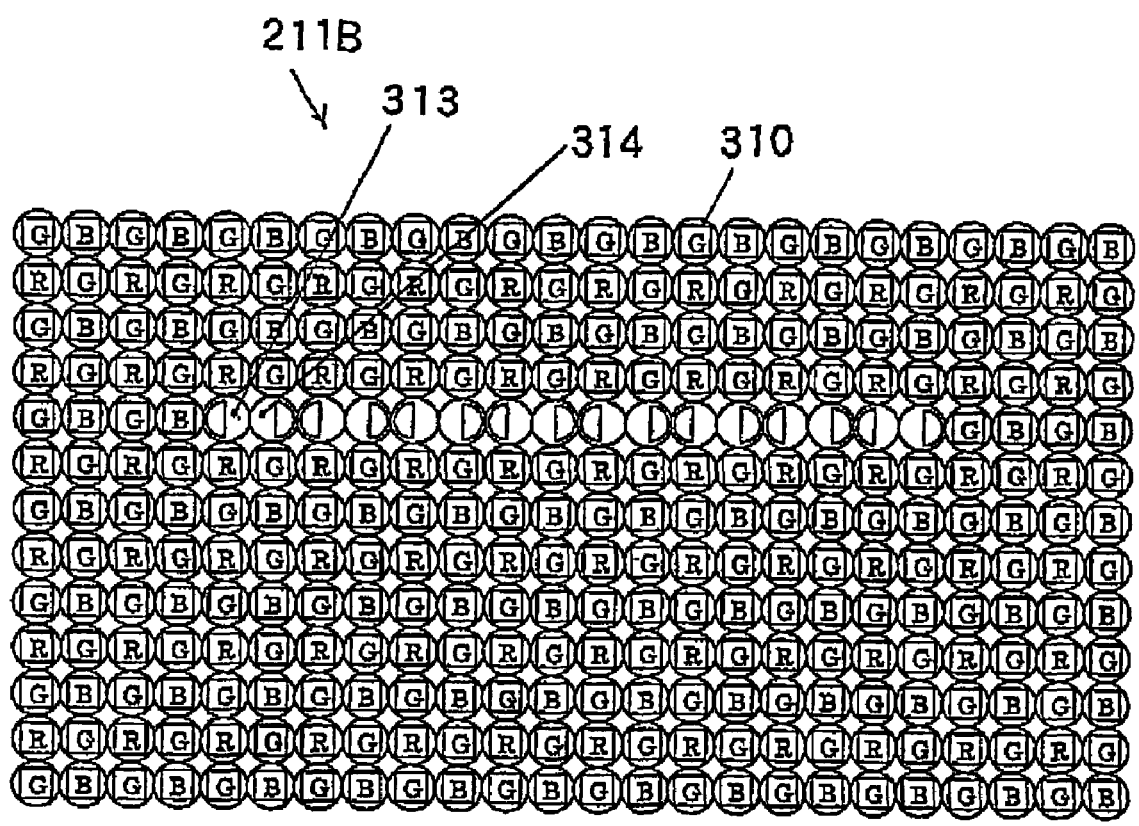
FIG. 36 presents an example of an image sensor that includes the focus detection pixels shown in FIGS. 35A and 35B disposed in a single row and occupying alternate positions.

FIG. 36 shows an image sensor 211B with focus detection pixels 313 and 314 in FIGS. 35A and 35B alternately disposed in a single row. A focus detection pixel 313 and the adjacent focus detection pixel 314, paired up with each other, are equivalent to a focus detection pixel 311 in the image sensor 211 in FIG. 3, and a pair of image outputs to be used in the focus detection are obtained via the pair of focus detection pixels 313 and 314.

Figure 37A:
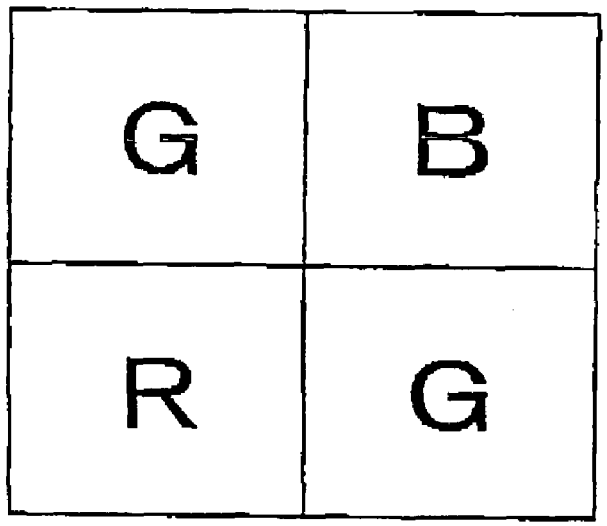
FIGS. 37A and 37B respectively show a Bayer array and a complementary-color array.
Figure 37:
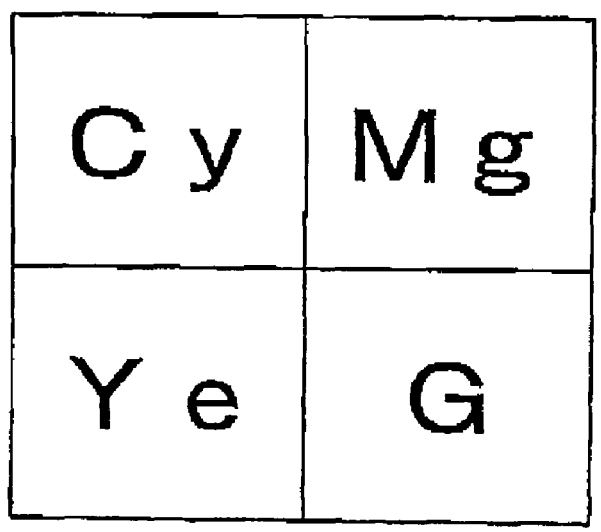

While the imaging pixels 310 each equipped with a red (R), green (G) or blue (B) color filter in the image sensor 211 in FIG. 3 assume a Bayer array as illustrated in FIG. 37A, color filters adopting structures and arrays other than those in the embodiment may be used instead. For instance, green (G) filters, yellow (Ye) filters, magenta (Mg) filters and cyan (Cy) filters disposed in a complementary-color array, as shown in FIG. 37B, may be used. In conjunction with such complementary color filters, the focus detection pixels 311 should be disposed at positions that would otherwise be taken up by pixels equipped with cyan filters and magenta filters, since cyan and magenta contain a blue component, which does not produce a significant output error.

While no color filters are present at the focus detection pixels 311 in the image sensor 211 in FIG. 3, the present invention may be adopted in conjunction with focus detection pixels each equipped with a color filter assuming one of the colors matching those of the color filters disposed at the imaging pixels 310, e.g., a green color filter.

While corrected image data that include interpolated data generated by obtaining the image signals at positions occupied by the focus detection pixels 311 through interpolation processing are stored in the memory card 213 in the imaging operation shown in FIG. 13, the corrected image data may also be displayed at the electronic viewfinder 215 or on the screen of a rear monitor (not shown) disposed at the rear surface of the body.

It is to be noted that the image sensors 211, 211A and 211B may each be constituted with a CCD image sensor or a CMOS image sensor.

While an explanation is given above in reference to the embodiment on an example in which focus detection is executed through a split-pupil method by using micro-lenses, the correlation operation method according to the present invention may also be adopted in focus detection achieved through a split image-reforming pupil method to achieve similar advantages, as well as in the focus detection achieved through the split-pupil method described above.

Figure 38:
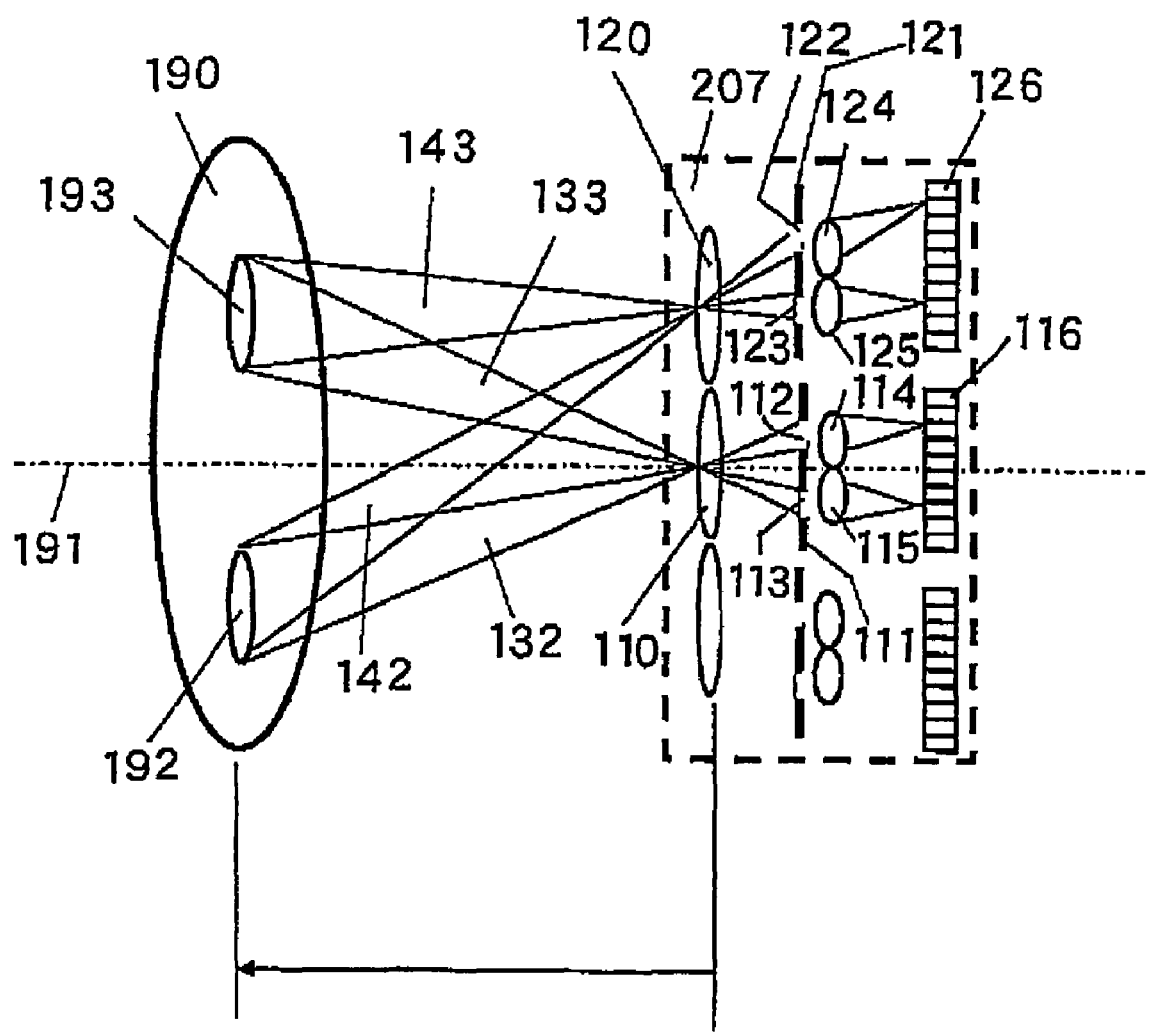
FIG. 38 illustrates how focus detection may be executed through a split image-reforming pupil method by adopting the correlation operation method achieved in an embodiment of the present invention.

An explanation is now given in reference to FIG. 38 on the focus detection achieved by executing the correlation operation in the embodiment of the present invention in conjunction with a split image-reforming pupil method. In the figure, reference numeral 191 indicates the optical axis of the exchangeable lens, reference numerals 110 and 120 each indicate a condenser lens, reference numerals 111 and 121 each indicate an aperture mask, reference numerals 112, 113, 122 and 123 each indicate an aperture opening, reference numerals 114, 115, 124 and 125 each indicate an image reforming lens and reference numerals 116 and 126 each indicate an image sensor (CCD) used for focus detection. In addition, reference numerals 132, 133, 142 and 143 each indicate a focus detection light flux and reference numeral 190 indicates an exit pupil set over a distance d5 further frontward relative to the predetermined imaging plane of the exchangeable lens. It is to be noted that the distance d5, which is determined in correspondence to the focal length of the condenser lenses 110 and 120, the distances to the aperture openings 112, 113, 122 and 123 relative to the condenser lenses 110 and 120 and the like, is referred to as the range-finding pupil distance. Reference numeral 192 indicates the area (range-finding pupil) over which the aperture openings 112 and 122 are projected via the condenser lenses 110 and 120, whereas reference numeral 193 indicates the area (range-finding pupil) over which the aperture openings 113 and 123 are projected via the condenser lenses 110 and 120.

The condenser lens 110, the aperture mask 111, the aperture openings 112 and 113, the image reforming lenses 114 and 115, and the image sensor 116 constitute a focus detection unit engaged in focus detection at a given position through split-pupil phase difference detection by adopting the image reforming method. FIG. 30 schematically illustrates the focus detection unit set on the optical axis 191 and a focus detection unit set off the optical axis. By using a plurality of focus detection units in combination, an exclusive focus detection sensor exclusively used for focus detection through split-pupil phase difference detection by adopting the image reforming method at the five focus detection positions G1~G5 in FIG. 2, is realized.

The focus detection unit, which includes the condenser lens 110, comprises the condenser lens 110 disposed near the predetermined imaging plane of the exchangeable lens, the image sensor 116 disposed to the rear of the condenser lens 110, the pair of image reforming lenses 114 and 115 disposed between the condenser lens 110 and the image sensor 116, which reform a primary image having been formed near the predetermined imaging plane, onto the image sensor 116 and the aperture mask 111 having formed therein the pair of aperture openings 112 and 113, which is disposed near (to the front in the figure) the pair of image reforming lenses. The image sensor 116 is a line sensor with a plurality of photoelectric conversion units densely disposed along a straight line and the direction along which the photoelectric conversion units are disposed is aligned with the direction along which the pair of range-finding pupils are separated from each other (i.e., the direction along which the aperture openings are set side-by-side).

Information corresponding to the image intensity distribution of the pair of images reformed on the image sensor 116 is output from the image sensor 116, and by executing image shift detection operation processing (correlation processing and phase difference detection processing) to be detailed later on this information, the image shift quantity indicating the extent of image shift manifesting between the pair of images is detected through the split-pupil phase difference detection method (image reforming method). Then, the image shift quantity is multiplied by a predetermined conversion coefficient so as to calculate the extent of deviation (defocus amount) of the current imaging plane relative to the predetermined imaging plane.

The image sensor 116 is projected onto the predetermined imaging plane via the image reforming lenses 114 and 115, and the detection accuracy with which the defocus amount (image shift quantity) is detected is determined in correspondence to the image shift quantity detection pitch (the pitch with which the photoelectric conversion units, projected onto the predetermined imaging plane, are arrayed in the image reforming method).

The aperture openings 112 and 113 at the aperture mask 111 are projected via the condenser lens 110 over the areas 192 and 193 on the exit pupil 190. These areas 192 and 193 are referred to as range-finding pupils. In other words, the pair of images are reformed on the image sensor 116 with the light fluxes passing through the pair of range-finding pupils 192 and 193 on the exit pupil 190. The light fluxes 132 and 133 passing through the pair of range-finding pupils 192 and 193 on the exit pupil 190 are referred to as focus detection light fluxes.

Figure 39:
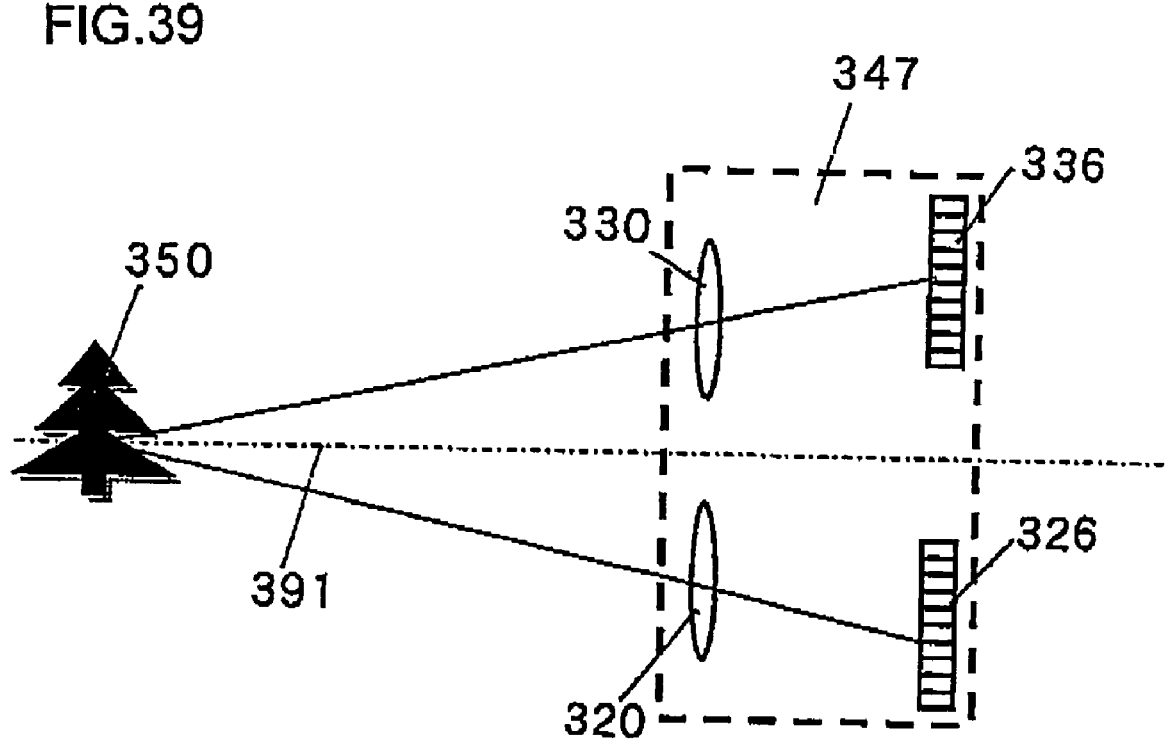
FIG. 39 shows how distance measurement may be executed through external light trigonometric measurement by adopting the correlation operation method achieved in the embodiment of the present invention.

In addition, the present invention may also be adopted equally effectively in distance measurement through an external light trigonometric range-finding method, as well as in the focus detection executed through the split-pupil method by using light fluxes passing through the photographic optical system. In reference to FIG. 39, distance measurement through an external light trigonometric range-finding method adopting the correlation operation executed in the embodiment of the present invention is explained. A unit comprising a lens 320 and an image sensor 326 disposed at the imaging plane of the lens 320 and a unit comprising a lens 330 and data an image sensor 336 disposed at the imaging plane of the lens 330 are set over the distance matching the baseline length. The pair of units constitutes a range-finding device 347. Images of a range-finding target 350 are formed on the image sensors 326 and 336 via the lenses 320 and 330 respectively.

The positional relationship between the images formed on the image sensors 326 and 336 changes in correspondence to the distance from the range-finding device 347 to the range-finding target 350. Accordingly, the positional relationship between the two images relative to each other can be detected by executing the image shift detection according to the present invention on signal data provided from the image sensors 326 and 336 and then, the distance to the range-finding target 350 can be determined based upon the positional relationship. A level difference between the pair of signals may occur or distortion may occur in the pair of signals as dirt builds up or raindrops settle on the lenses 320 and 330 used in the external light trigonometric range-finding method. However, even if such a problem occurs, the correlation between the pair of image signal data strings output from the image sensors 326 and 330 can be detected accurately by adopting the correlation operation method according to the present invention.

It is to be noted that while the correlation level is determined through an arithmetic operation based upon the sum of the absolute values representing the differences between the two sets of data in the explanation provided above, the correlation level may be determined through another correlation operation method. For instance, the correlation quantity may be calculated as the sum of the products of the two sets of data and the extent of offset of the two signal data strings relative to each other may then be detected based upon the shift quantity at which the correlation quantity peaks. Alternatively, the correlation quantity may be calculated based upon the sum of the max values of the two sets of data, and in such a case, the offset quantity indicating the extent of offset of the two signal data strings relative to each other may be detected in correspondence to the shift quantity at which the correlation quantity bottoms out. As a further alternative, the correlation quantity may be determined based upon the sum of the MIN values of the two sets of data and in such a case, the extent of offset of the two signal data strings relative to each other may be detected in correspondence to the shift quantity at which the correlation quantity peaks.

The imaging device achieved in the embodiment of the present invention may be adopted in a digital still camera or a film still camera with an integrated lens, or a video camera, as well as a digital still camera or a film still camera constituted with an exchangeable lens and a camera body. In addition, the present invention may also be adopted in a compact camera module built into a portable telephone or the like or in a surveillance camera. Furthermore, it may be adopted in a focus detection device or a range-finding device used in a system other than a camera, or it may be adopted in a stereo range-finding device as well.

The embodiment described above may also be adopted in a device that detects movement of a subject image or vibration of a camera by detecting a correlation manifesting between signals output by an image sensor at different time points. In addition, it may be adopted in pattern matching, whereby the pattern of an image signal provided from an image sensor is matched against a specific image signal. Moreover, the advantages described above can be achieved by adopting the embodiment in detection of all types of correlation between to signals, e.g., correlation manifesting between two sets of audio data, instead of in detection of the correlation between two sets of image signal data.

As described above, the correlation that manifests between two signal data strings can be detected accurately by adopting the embodiment, even if, for instance, an eclipse attributable to the photographic optical system occurs in one of the pair of focus detection light fluxes and a relative distortion occurs in the pair of signal data strings output from the image sensor.

Second Embodiment

Through the focus detection operation method (correlation operation method) achieved in the first embodiment described above, the correlation between a pair of operation target signal data strings, i.e., the first signal data string and the second signal data string, can be detected accurately even when there is a gain difference between the first signal data string and the second signal data string. However, if both a gain difference and an offset manifest between the first signal data string and the second signal data string, the reliability of the correlation operation results is lowered. Accordingly, an optimal focus detection operation method (correlation operation method) that assures accuracy even when a gain difference and an offset manifest between the first signal data string and the second signal data string is explained in reference to the second embodiment. It is to be noted that the explanation given in reference to the second embodiment focuses on differences from the first embodiment and its variations.

(Focus Detection Operation)

FIG. 40 presents a detailed flowchart of the focus detection operation executed in the second embodiment. It is to be noted that the same step numbers are assigned to steps in which processing similar to that in FIG. 14 is executed and the following explanation focuses on differences from the processing in FIG. 14. After starting the focus detection operation processing, i.e., the correlation operation processing, in step 300, high-frequency cut filter processing such as that expressed in (16) below is executed on a pair of signal data strings ($\alpha_1 \sim \alpha_M$ and $\beta_1 \sim \beta_M$; M indicates the number of sets of data) output from the focus detection pixel row so as to generate a first signal data string $a_1 \sim a_N$ and a second signal data string $b_1 \sim b_N$ (N indicates the number of sets of data), from which a noise component or a high-frequency component that would adversely affect the correlation processing has been eliminated.

$$a_n = \alpha_n + 2 \times \alpha_{n+1} + \alpha_{n+2},$$

$$b_n = \beta_n + 2 \times \beta_{n+1} + \beta_{n+2} \quad (16)$$

In expression (16) above, n=1–N. It is to be noted that the high-frequency cut filter processing in step 310 may be skipped if the arithmetic operation needs to be completed faster or if the extent of defocusing is already significant and thus it is obvious that only a very small high-frequency component is present.

In step 315, average values ax and bx of the first signal data string and the second signal data string are respectively subtracted from each set of data in the first signal data string $a_1 \sim a_N$ and each set of data in the second signal data string $b_1 \sim b_N$, thereby generating a first signal data string $A_1 \sim A_N$ and a second signal data string $B_1 \sim B_N$. It is to be noted that while identical codes $A_1 \sim A_N$ and $B_1 \sim B_N$ are assigned to refer to the first signal data string and the second signal data string in the first embodiment and the first signal data string and the second signal data string in the second embodiment for purposes of convenience, the first signal data string $A_1 \sim A_N$ and the second signal data string $B_1 \sim B_N$ in the second embodiment are signal data strings having undergone arithmetic operations expressed as in (17) and (18) below.

$$ax = (\Sigma a_n)/N$$

$$bx = (\Sigma b_n)/N \quad (17)$$

$$A_n = a_n - ax$$

$$B_n = b_n - bx \quad (18)$$

In expressions (17) and (18), n=1~N.

As detailed later, by subtracting the average values, the correlation between the first signal data string and the second signal data string can be accurately detected through the correlation operation processing to be explained later even when an offset has occurred between the first signal data string and the second signal data string.

In step 320, the second' signal data string $B_1 \sim B_N$ is shifted relative to the first' signal data string $A_1 \sim A_N$ by a predetermined extent k in order to determine through an arithmetic operation the correlation quantity indicating the level of correlation between the first' signal data string $A_1 \sim A_N$ and the second' signal data string $B_1 \sim B_N$ at the shift quantity k (k is an integer).

In the following step 330, operation data are obtained by executing a first arithmetic operation (to be detailed later) on data over a given range in the first' signal data string $A_1 \sim A_N$, i.e., data that include target data $A_n$ and nearby data $A_{n-r} \sim A_{n+s}$ (r and s each indicate a given integer: hereafter this range is to be referred to as a "miniscule range") and also, operation data are obtained by executing a second arithmetic operation (to be detailed later) on data $B_{n+k}$ corresponding to the target data $A_n$ in the first' signal data string and nearby data $B_{n-r} \sim B_{n+s}$ present over the miniscule range data in the second' signal data string $B_1 \sim B_N$, having been shifted by the shift quantity k. Then, by calculating the product of these operation data, first operation data are obtained.

In step 340, operation data are obtained by executing the first arithmetic operation on the miniscule range data $B_{n-r} \sim B_{n+s}$ in the second' signal data string $B_1 \sim B_N$, and also operation data are obtained by executing the second arithmetic operation on the miniscule range data $A_{n-r} \sim A_{n+s}$ in the first' signal data string $A_1 \sim A_N$. Then, the product of these operation data is calculated, and thus, second operation data are obtained.

It is to be noted that the first operation data and the second operation data to be detailed later, which result from the arithmetic operations executed in steps 330 and 340, are data in which the distortion in the first' signal data string and the second' signal data string is canceled out over the given "miniscule range".

In addition, while the operation data are obtained by executing the first arithmetic operation and the second arithmetic operation on the data in the first' signal data string and the second' signal data string over the "miniscule range" in steps 330 and 340 described above, first operation data may be generated by multiplying the target data $A_n$ present at a given position in the first' signal data string $A_1 \sim A_N$ by, for instance, data such as $B_{n+1+k}$ or $B_{n+2+k}$ present near the data $B_{n+k}$ corresponding to the position of the target data $A_n$ in the second' signal data string $B_1 \sim B_N$ shifted by the shift quantity k and second operation data may be generated by multiplying the data $B_{n+k}$ in the second' signal data string $B_1 \sim B_N$ by nearby data such as $A_{n+1}$ or $A_{n+2}$ present near the target data $A_n$ in the first' signal data string $A_1 \sim A_N$, instead.

In step 350, the absolute value of the difference between the first operation data and the second operation data is calculated. The results of this calculation indicate the level of correlation (similarity level) between the first' signal data string and the second' signal data string over the "miniscule range". In the following step 360, the processing in steps 330~350 is repeatedly executed by shifting the "miniscule range" and thus, the correlation quantity C(k) corresponding to the predetermined shift quantity k is is determined by calculating the cumulative sum of the operation results indicating the correlation level determined in step 350.

Since the processing subsequently executed in steps 330~400 is identical to the processing shown in FIG. 14, its explanation is omitted.

(Correlation Operation)

Figure 41:
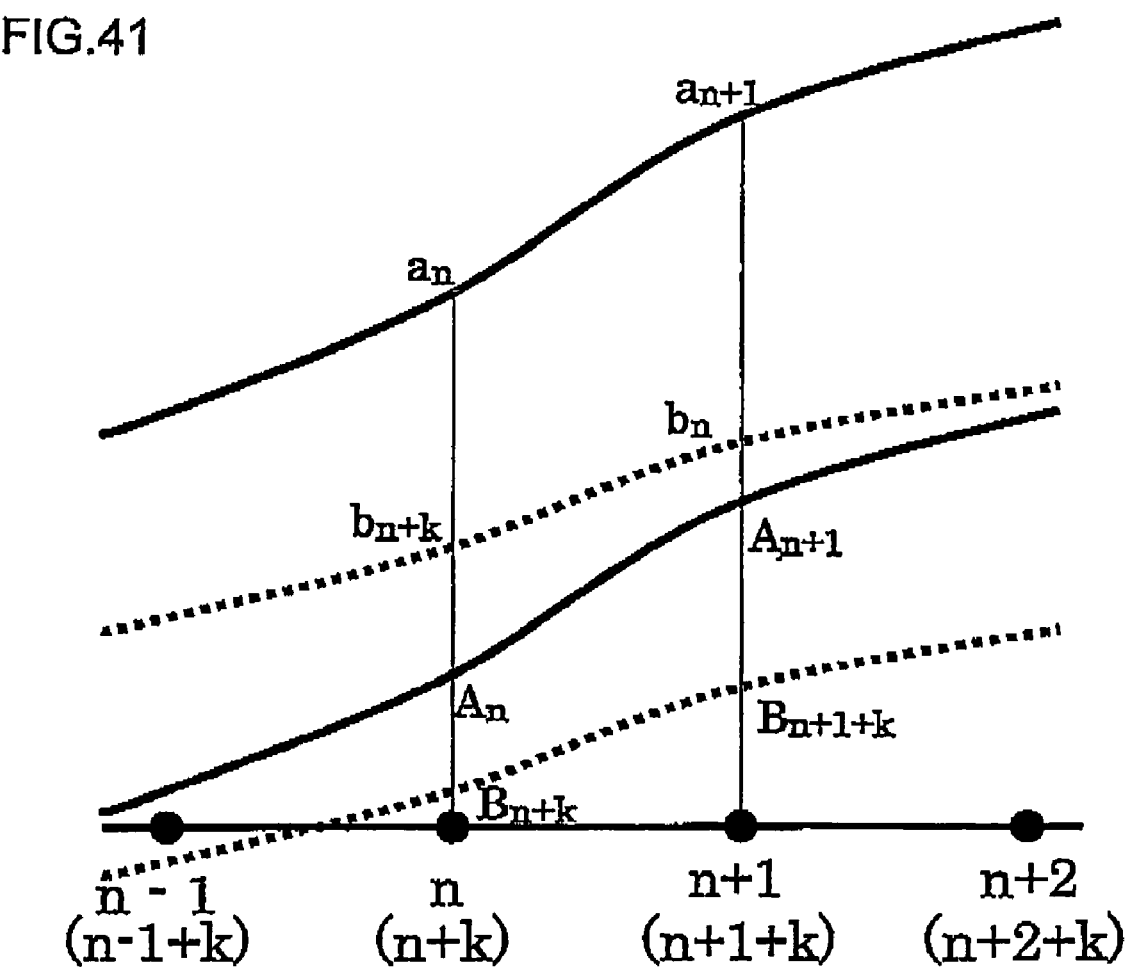
FIG. 41 illustrates the concept of the correlation operation executed in the second embodiment.

Next, an embodiment of the correlation operation processing shown in FIG. 40 is explained. FIG. 41, provided to illustrate the concept of the correlation operation executed in the second embodiment, indicates that a gain difference and an offset have manifested in the waveforms of the two signal data strings, due to distortion occurring in the first signal data string $a_1 \sim a_N$ represented by the solid line and the second signal data string $b_1 \sim b_N$ represented by the dotted line, which may be attributable to an eclipse at the exchangeable lens 202.

The offset is eliminated in the first' signal data string $A_1 \sim A_N$ and the second' signal data string $B_1 \sim B_N$ obtained by subtracting the corresponding average values from the individual sets of data in the first signal data string $a_1 \sim a_N$ and the second signal data string $b_1 \sim b_N$ respectively. The gain difference still manifesting between the first' signal data string $A_1 \sim A_N$ and the second' signal data string $B_1 \sim B_N$ can then be eliminated as explained next. The characteristics of the signal data strings over the "miniscule range", i.e., the ratios $A_n/A_{n+1}$ and $B_{n+k}/B_{n+1+k}$ of the adjacent sets of data, are not greatly affected even when a gain difference occurs. Since the characteristics $A_n/A_{n+1}$ and $B_{n+k}/B_{n+1+k}$ over this "miniscule range" contain denominators, the adverse effect of divergence that would occur if either denominator takes on the value of 0 or the adverse effect of noise occurring when the denominators assumed small values can be minimized by multiplying the characteristics over the "miniscule range" by the common term $(A_{n+1} \times B_{n+1+k})$ which is the product of values taken in the denominators.

For instance, $A_n \times B_{n+1+k}$ and $B_{n+k} \times A_{n+1}$ may be obtained by multiplying the ratios $A_n/A_{n+1}$ and $B_{n+k}/B_{n+1+k}$ of the adjacent sets of data by the common term $(A_{n+1} \times B_{n+1+k})$ which is the product of values taken in the denominators. Then, by determining the correlation of the characteristics of the two signal data strings over the "miniscule range" calculated as described above, e.g., by determining the absolute value of the difference between the characteristics, the correlation level (similarity level) indicating the level of correlation between the two signal data strings can be detected with high accuracy. In addition, by cumulatively calculating the correlation level while shifting the position of the "miniscule range" over a predetermined range, any chance correlation that has occurred can be eliminated and thus, very accurate correlation detection is enabled.

First operation data $(A_n \times B_{n+1+k})$ or $(A_n \times B_{n+2+k})$ are generated by multiplying a given set of data $A_n$ in the first' signal data string $A_1 \sim A_N$ by nearby data present near the data $B_{n+k}$ in the second' signal data string $B_1 \sim B_N$ shifted by the shift quantity k, which correspond to the data $A_n$, e.g., data $B_{n+1+k}$ directly adjacent to the data $B_{n+k}$ or data $B_{n+2+k}$, which are the second set of data obtained after the data $B_{n+k}$. Also, second operation data $(B_{n+k} \times A_{n+1})$ or $(B_{n+k} \times A_{n+2})$ are generated by multiplying the data $B_{n+k}$ in the second' signal data string $B_1 \sim B_N$ by nearby data present near the target data $A_n$ in the first' signal data string $A_1 \sim A_N$ e.g., data $A_{n+1}$ directly adjacent to the data $A_n$ or data $A_{n+2}$, which are the second set of data obtained after the data $A_n$. Then, based upon the first operation data and the second arithmetic operation data, the level of correlation existing between a third signal data string and a fourth signal data string is determined as expressed in (2). Since the correlation can be determined through the correlation operation having been explained in reference to either processing example 1 or processing example 2, a repeated explanation is omitted.

As an alternative to the correlation operation described above, operation data may be obtained by executing a first arithmetic operation on data present over a given range in the first' signal data string $A_1 \sim A_N$, i.e., the miniscule range $A_{n-r} \sim A_{n+s}$ containing the target data $A_n$, and operation data may also be obtained by executing a second arithmetic operation on the data $B_{n+k}$ in the second' signal data string $B_1 \sim B_N$ shifted by the shift quantity k, which correspond to the target data $A_n$ in the first' signal data string, and data in the miniscule range $B_{n-r} \sim B_{n+s}$ containing the data $B_{n+k}$. Then, first operation data may be obtained by calculating the product of these operation data.

In this alternative, operation data may also be obtained by executing the first arithmetic operation on the data $B_{n-r} \sim B_{n+s}$ over the miniscule range in the second' signal data string $B_1 \sim B_N$ and operation data may also obtained by executing the second arithmetic operation on the data $A_{n-r} \sim A_{n+s}$, over the miniscule range in the first' signal data string $A_1 \sim A_N$. Then, second operation data may be obtained by calculating the product of these operation data.

Consequently, the correlation existing between the first signal data string and the second signal data string is determined as expressed in (2) based upon the first operation data and the second operation data having been obtained as described above Since the correlation can be examined by executing a correlation operation similar to any of the correlation operations in processing examples 3 through 8 having been explained earlier, a repeated explanation is omitted.

The results of the correlation operation executed by using the first' signal data string $A_n$ and the second' signal data string $B_n$ provides very accurate correlation operation results, free of any error attributable to the gain difference and the offset manifesting in the first signal data string $a_n$ and the second signal data string $b_n$.

Figure 42:
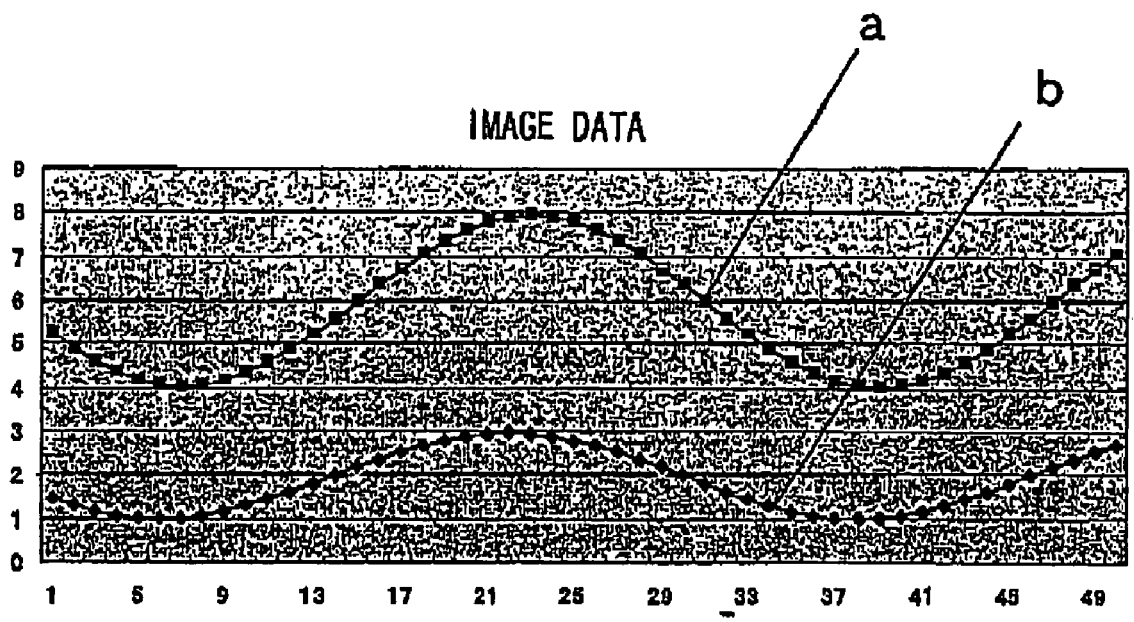
FIG. 42 illustrates a correlation operation processing example achieved by adopting the second embodiment.
Figure 43:
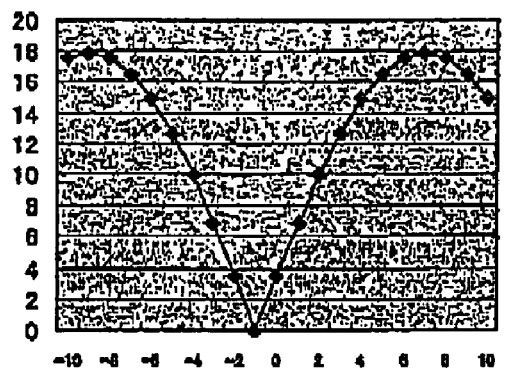
FIGS. 43A, 43B and 43C show the results of the correlation operation processing executed in the second embodiment.
Figure 43:
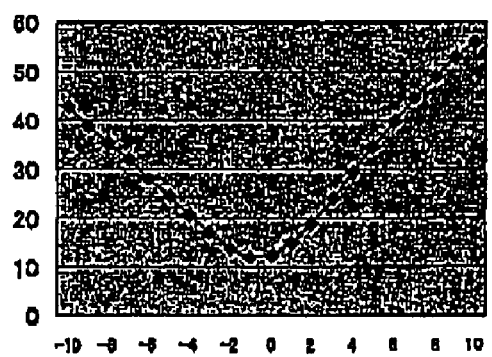
Figure 43:
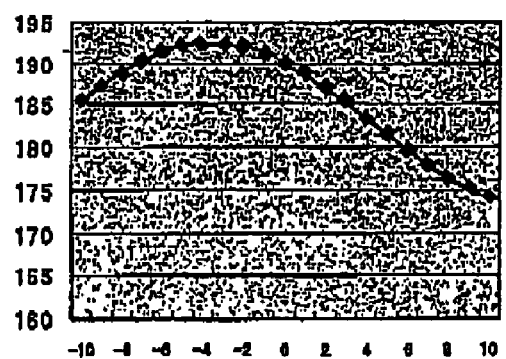

Now let us consider the correlation operation in correlation operation processing example 1 executed on a pair of image signal data strings a and b such as those shown in FIG. 42. Two image functions 2*(2+sin ω)+2 and (2+sin ω) with a gain difference of a factor of 2 and an offset of 2 are set as a pair of image signal data strings $(a_1, a_2 \ldots a_N)$ and $(b_1, b_2 \ldots b_N)$ output from the image, sensor 211. In correspondence to this pair of image signal data strings a and b, signal data strings A and B are generated, from which the offset is eliminated by subtracting the respective average values. FIG. 43A presents the results of the correlation operation in correlation operation processing example 1 executed on these two signal data strings A and B. As FIG. 43A clearly indicates, a high level of correlation is cyclically achieved at the dipped portions by executing the correlation operation in correlation operation processing 1, although a gain difference and an offset manifest in the initial two signal data strings a and b.

FIG. 43B presents the results of the correlation operation in correlation operation example 1 executed on the pair of image signal data strings a and b without first subtracting the average values. As the figure clearly indicates, the initial two signal data strings a and b manifest the gain difference and the offset and the graph does not dip as sharply as that in FIG. 43A representing the results obtained by first subtracting the average values. This, in turn, indicates a lower level of correlation operation accuracy. In addition, FIG. 43C presents the results obtained by executing the correlation operation (C(k)=Σ|$A_n$−$B_{n+k}$|) in the related art on the pair of image signal data strings a and b. As the figure indicates, when the two signal data strings a and b manifest a gain difference and an offset, the dip in the correlation graph does not occur at the correct shift position and thus, correlation detection is not possible.

While the correlation operation processing is executed in the second embodiment by first determining the average values corresponding to the initial pair of data strings, subtracting the average values from the corresponding data strings and then executing correlation operation in any of correlation operation processing examples 1 through 8 on the resulting pair of data strings, the average values may be subtracted during the actual correlation operation instead. For instance, correlation operation processing example 1 may be modified as expressed in (19) below.

$$C(k)=\Sigma|(a_n-ax)\times(b_{n+1+k}-bx)-(b_{n+k}-bx)\times(A_{n+1}-ax)| \quad (19)$$

In addition, if the Σ operation in expression (19) is executed over a narrower range compared to the range of the initial data strings, average values ax' and bx' of the data strings in the Σ operation range, instead of the average values ax and bx over the entire initial data strings, may be used. Such a measure assures accurate correlation operation results even when the gain difference fluctuates depending upon the position assumed in the data strings.

Third Embodiment

Refer to the explanation of the first embodiment for details of the structure adopted in the digital camera, the imaging operation and the focus detection operation executed therein in the third embodiment, since they are identical to those of the first embodiment. The following is an explanation of the third embodiment, starting with a description of the focus detection operation executed in the third embodiment.

(Focus Detection Operation)

Figure 44:
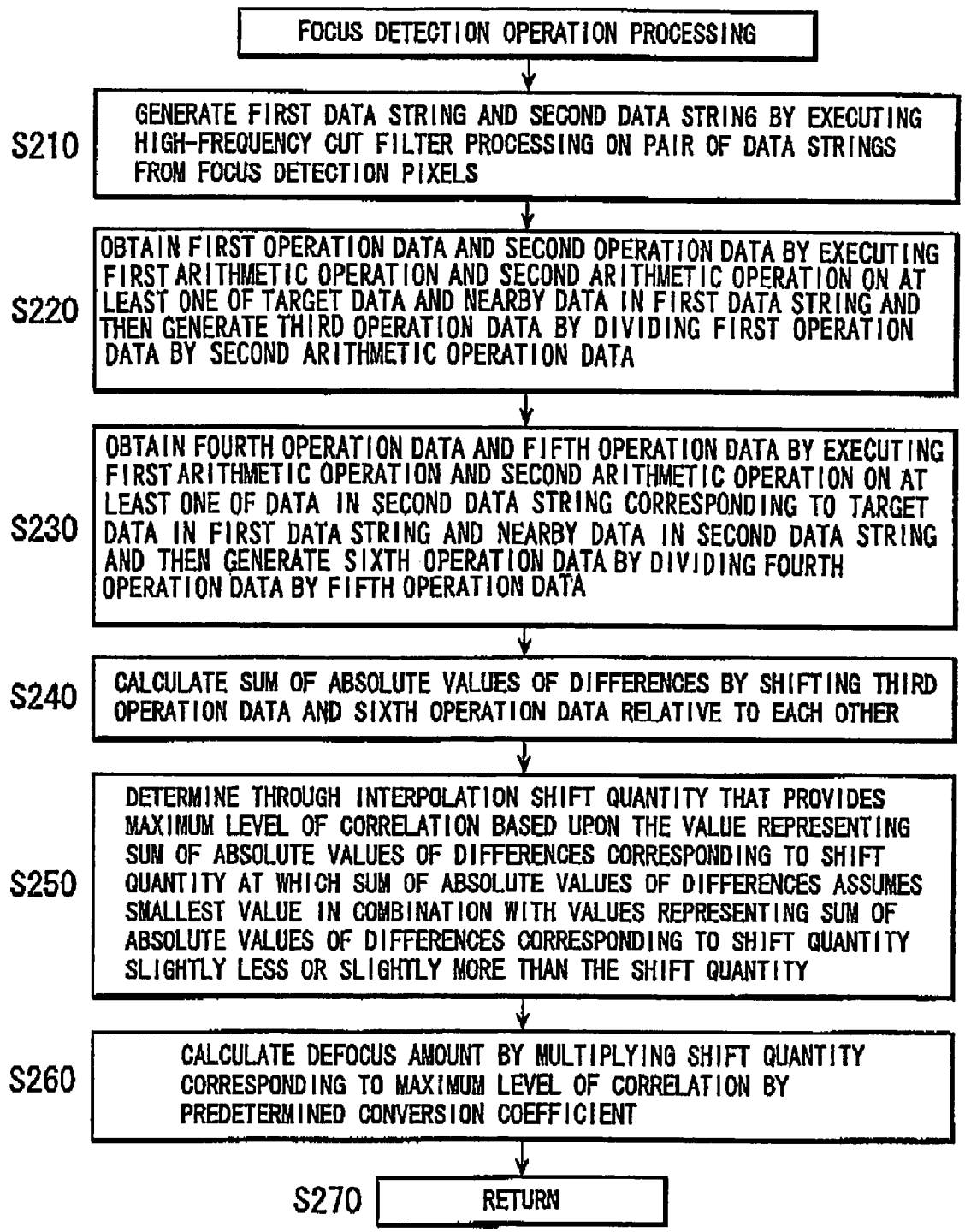
FIG. 44 presents a detailed flowchart of the focus detection operation.

FIG. 44 presents a detailed flowchart of the focus detection operation executed in the third embodiment in step 130 during the imaging operation shown in FIG. 13 of the first embodiment. After starting the focus detection operation processing, i.e., the correlation operation processing, in step 200, high-frequency cut filter processing such as that expressed in (101) below is executed on a pair of signal data strings ($\alpha_1$~$a_M$ and $\beta_1$~$\beta_M$; M indicates the number of sets of data) output from the focus detection pixel row so as to generate a first signal data string $A_1$~$A_N$ and a second signal data string $B_1$~$B_N$ (N indicates the number of sets of data), from which a noise component or a high-frequency component that would adversely affect the correlation processing has been eliminated, as in the first embodiment.

$$A_n=\alpha_n+2\times\alpha_{n+1}+\alpha_{n+2},$$

$$B_n=\beta_n+2\times\beta_{n+1}+\beta_{n+2} \quad (101)$$

In expression (101) above, n=1~N. It is to be noted that the high-frequency cut filter processing in step 210 may be skipped if the arithmetic operation needs to be completed faster or if the extent of defocusing is already significant and thus it is obvious that only a very small high-frequency component is present.

In step 220, first operation data are generated by executing a first arithmetic operation on at least one of target data $A_n$ in the first signal data string $A_1$~$A_N$ (hereafter $A_n$ is simply referred to as target data) and nearby data present near the target data and also second operation data are generated by executing a second arithmetic operation on the target data and the nearby data. Then, the first operation data are divided by the second operation data thereby generating third operation data $E_n$ related to the first signal data string $A_1$~$A_N$. The first arithmetic operation and the second arithmetic operation are to be described in detail later. Subsequently, third operation data $E_n$ are accumulated and a third operation data string $E_1$~$E_L$ is thus generated by shifting the position of the target data $A_n$ in the first signal data string $A_1$~$A_N$. The third operation data string $E_1$~$E_L$ is a data string with the normalized gain over a data range $A_{n-r}$~$A_{n+s}$ (r and s each represent an arbitrary integer; this range is hereafter referred to as a "miniscule range") containing the target data $A_n$.

Next, in step 230, fourth operation data are generated by executing a first arithmetic operation on at least one of data $B_{n+k}$ (k indicates the shift quantity (to be detailed later) indicating the extent to which one data string in the pair of data strings is shifted relative to the other) in the second signal data string $B_1$~$B_N$ corresponding to the target data $A_n$ in the first signal data string and nearby data present near the data $B_{n+k}$ and fifth operation data are also generated by executing a second arithmetic operation on the data $B_{n+k}$ and the nearby data. Then, the fourth operation data are divided by the fifth operation data thereby generating sixth operation data $F_n$ related to the second signal data string $B_1$~$B_N$. It is to be noted that the first arithmetic operation and the second arithmetic operation, similar to the first arithmetic operation and the second arithmetic operation executed in step 220, are to be described in detail later. Subsequently, sixth operation data $F_n$ are accumulated and a sixth operation data string $F_1$~$F_L$ is generated by shifting the position of the target data $B_{n+k}$ in the second signal data string $B_1$~$B_N$. The sixth operation data string $F_1$~$F_L$ is a data string with the normalized gain over the data range $B_{n-r+k}$~$B_{n+s+k}$ (r and s each represent an arbitrary integer; this range is hereafter referred to as a "miniscule range") containing the target data $B_{n+k}$.

In step 240, the correlation level C(k) is determined through an arithmetic operation, as expressed in (102) below, by shifting the third operation data string $E_1$~$E_L$ corresponding to the first signal data string $A_1$~$A_N$ and the sixth operation data string $F_1$~$F_L$ corresponding to the second data string $B_1$~$B_N$ relative to each other by k.

$$C(k)=\Sigma|E_n-F_{n+k}| \quad (102)$$

In expression (102) the range assumed for n in the Σ operation is limited to the range over which the data $E_n$ and $F_{n+k}$ exist in correspondence to the shift quantity k. In addition, the shift quantity k, indicating the extent to which the pair of data strings $E_1$~$E_L$ and $F_1$~$F_L$ are shifted relative to each other, is an integer and represents a relative shift quantity assuming a value taken in units matching the detection pitch with which the pair of sets of data are detected.

The results of the arithmetic operation executed as expressed in (102) may indicate that the correlation quantity C(k) assumes the smallest value (the smaller the value, the higher the correlation level) at the shift quantity k=kj=2 at which the pair of sets of data achieve a high level of correlation as shown in FIG. 15A, in reference to which the first embodiment has been explained. In step 250, the shift quantity x, which gives the smallest value C(x) in the continuous correlation quantity graph is determined by adopting a three-point interpolation method as expressed in (103)~(106) below.

$$x = kj + D/\text{SLOP} \tag{103}$$

$$C(x) = C(kj) - |D| \tag{104}$$

$$D = \{C(kj-1) - C(kj+1)\}/2 \tag{105}$$

$$\text{SLOP} = \text{MAX}\{C(kj+1) - C(kj), C(kj-1) - C(kj)\} \tag{106}$$

In step 260, a defocus amount DEF indicating the extent of defocusing of the subject image plane relative to the predetermined imaging plane is determined as expressed in (107) below in correspondence to the shift quantity x determined as expressed in (103).

$$DEF = KX \cdot PY \cdot x \tag{107}$$

In expression (107), PY represents the detection pitch and KX represents a conversion coefficient determined in conformance to the opening angle formed by the gravitational centers of the pair of range-finding pupils. The judgment as to whether or not the calculated defocus amount DEF is reliable is made as follows. As shown in FIG. 15B, in reference to which the first embodiment has been described, the interpolated minimum value C(x) of the correlation quantity increases when the level of correlation between the pair of sets of data is low. Accordingly, if C(x) is equal to or greater than a predetermined value, the defocus amount is judged to be less reliable. Alternatively, C(x) may be standardized with regard to the data contrast, and in such a case, if the value obtained by dividing C(x) by SLOP indicating a value in proportion to the contrast is equal to or greater than a predetermined value, the defocus amount should be judged to be not reliable. As a further alternative, if SLOP indicating the value in proportion to the contrast is equal to or less than a predetermined value, the subject should be judged to be a low contrast subject and, accordingly, the reliability of the calculated defocus amount DEF should be judged to be low.

In step 270, the focus detection operation processing (correlation operation processing) ends and the operation makes a return.

(Correlation Operation)

Next, an embodiment of the correlation operation processing shown in FIG. 44 is explained. The concept of the correlation operation executed in the embodiment is explained in reference to FIG. 16 used earlier in the explanation of the first embodiment. FIG. 16 indicates that again difference has manifested between the waveforms of the two signal data strings, due to distortion occurring in the first signal data string $A_1 \sim A_N$ represented by the solid line and the second signal data string $B_1 \sim B_N$ represented by the dotted line, which may be attributable to an eclipse at the exchangeable lens 202. Even when such a gain difference manifests, the characteristics of the signal data strings over the "miniscule range", i.e., the ratios of the adjacent sets of data, are not greatly affected and thus, the level of correlation (similarity level) manifesting between the two signal data strings $A_1 \sim A_N$ and $B_1 \sim B_N$ can be detected accurately. In addition, by accumulating values representing the correlation level by shifting the "miniscule range" over a predetermined range, the correlation can be detected with an even higher level of accuracy by eliminating any chance correlation.

In this embodiment, first operation data are generated by executing the first arithmetic operation on at least one of the target data $A_n$ in the first signal data string $A_1 \sim A_N$ and nearby data and also second operation data are generated by executing the second arithmetic operation on the target data and the nearby data. Then, the first operation data are divided by the second operation data thereby generating a third operation data string $E_1 \sim E_L$ related to the first signal data string $A_1 \sim A_N$.

In addition, fourth operation data are generated by executing the first arithmetic operation on at least one of the data $B_{n+k}$ in the second signal data string $B_1 \sim B_N$ corresponding to the position of the target data $A_n$ in the first signal data string and nearby data present near the data $B_{n+k}$ and fifth operation data are also generated by executing the second arithmetic operation on the data $B_{n+k}$ and the nearby data. Then, the fourth operation data are divided by the fifth operation data thereby generating a sixth operation data string $F_1 \sim F_L$ related to the second signal data string $B_1 \sim B_N$.

Next, the correlation between the first signal data string $A_1 \sim A_N$ and the second signal data string $B_1 \sim B_N$ is determined as expressed in (102) based upon the third operation data string $E_1 \sim E_L$ and the sixth operation data string $F_1 \sim F_L$. The following is an explanation of the correlation operation provided by quoting specific correlation operation processing examples.

CORRELATION OPERATION PROCESSING EXAMPLE 1

The correlation quantity C(k) is determined as expressed below.

$$C(k) = \Sigma |(A_n/A_{n+1}) - (B_{n+k}/B_{n+1+k})| \tag{108}$$

Figure 45:
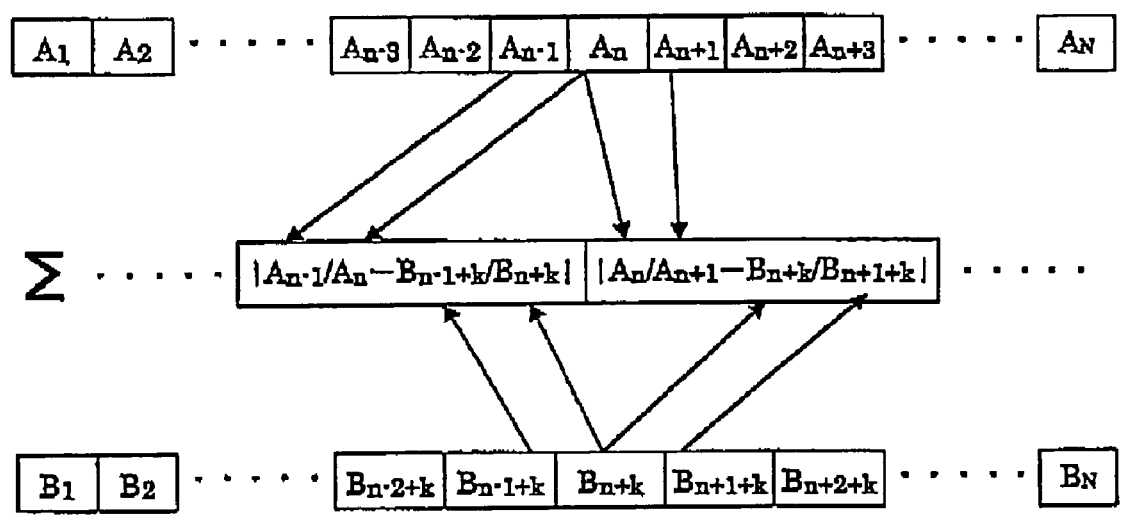
FIG. 45 shows the data flow in correlation operation processing example 1.

In expression (108), the $\Sigma$ operation is cumulatively executed with regard to n and the range assumed for n is limited to the range over which the data $A_n$, $A_{n+1}$, $B_{n+k}$ and $B_{n+1+k}$ exist in correspondence to the shift quantity k. FIG. 45 shows the data flow in correlation operation processing example 1.

In correlation operation processing example 1, the target data $A_n$ in the first signal data string A are designated as first operation data and the nearby data $A_{n+1}$ present near the target data $A_n$ are designated as second operation data. A third operation data string $(A_n/A_{n+1})$ related to the first signal data string $A_1 \sim A_N$ is generated by dividing the first operation data $A_n$ by the second operation data $A_{n+1}$. In addition, the data $B_{n+k}$ in the second signal data string B, which correspond to the target data $A_n$ in the first signal data string, are designated as fourth operation data and the nearby data $B_{n+1+k}$ present near the data $B_{n+k}$ are designated as fifth operation data. A sixth operation data string $(B_{n+k}/B_{n+1+k})$ related to the second signal data string $B_1 \sim B_N$ is generated by dividing the fourth operation data $B_{n+k}$ by the fifth operation data $B_{n+1+k}$. The correlation level C(k) of the correlation manifesting between the first signal data string A and the second signal data string B is determined by calculating the total sum of the absolute values of the differences between the third operation data and the sixth operation data. Since the first arithmetic operation and the second arithmetic operation are each executed as; (operation target data×1), no substantial operation is actually executed as the first arithmetic operation or the second arithmetic operation in correlation operation processing example 1.

Figure 46:
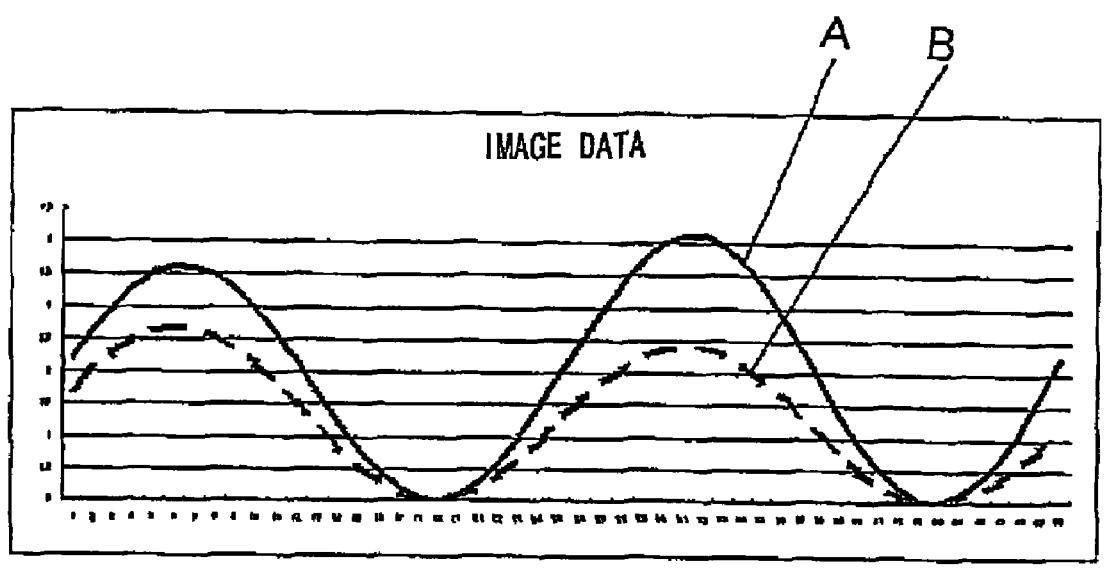
FIG. 46 shows a relative distortion manifesting with regard to two signal data strings A and B.
Figure 47:
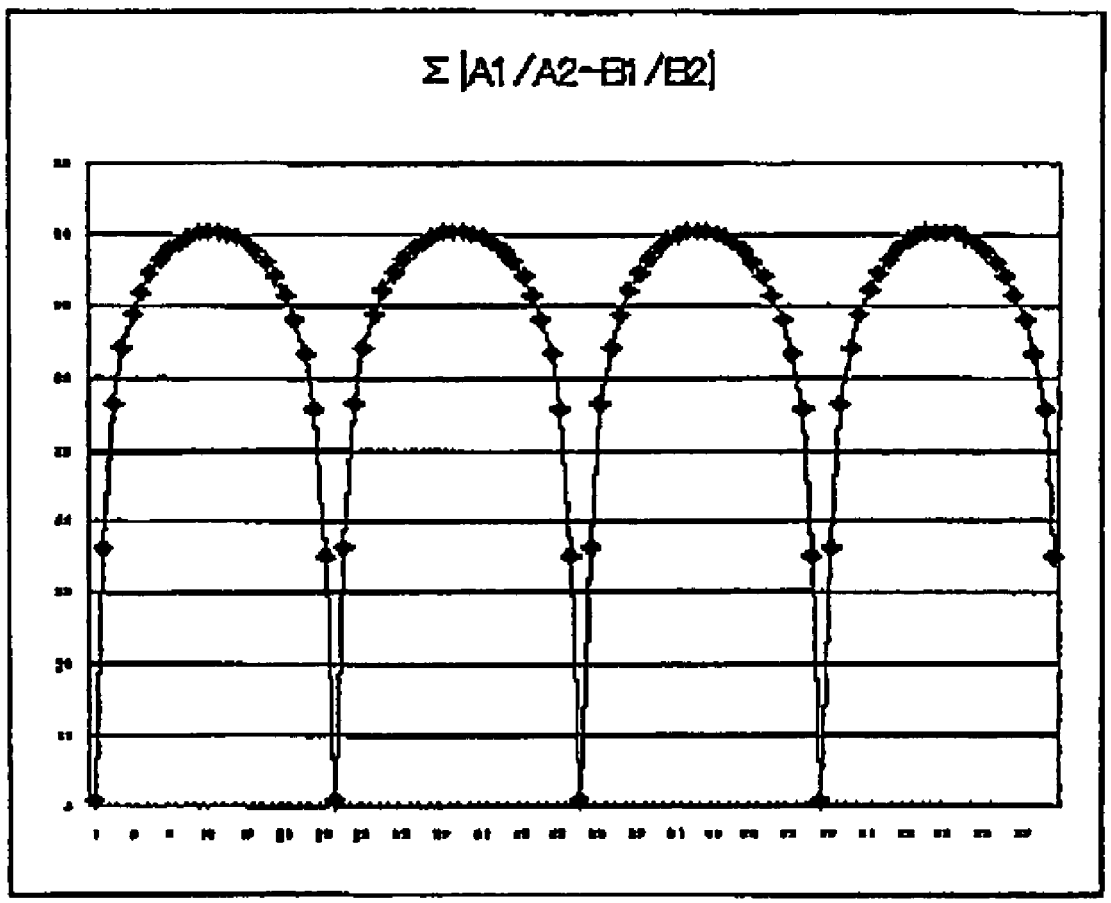
FIG. 47 shows the results obtained by executing the processing in correlation operation processing example 1.

Now, let us consider the correlation operation in correlation operation processing example 1 executed on a pair of image signal data strings A and B such as those shown in FIG. 46. Let us assume that a relative distortion has occurred in the pair of image signal data strings $(A_1, A_2, \ldots A_N)$ and $(B_1, B_2, \ldots B_N)$ output from the image sensor 211 and that differences in the gain and the slope between the waveforms $(1+\sin \omega)$ of the two image signal data strings have resulted as shown in FIG. 46. FIG. 47 presents the results of the correlation operation in correlation operation processing example 1 executed on these two signal data strings A and B. As FIG. 47 clearly indicates, although the two signal data strings A and B are distorted, a high level of correlation is cyclically achieved (at the dipped positions) by executing the correlation operation in correlation operation processing example 1.

Compared to the correlation operation method in the related art described earlier in which the correlation quantity C(k) for the two signal data strings is calculated simply as the total sum $\Sigma|A_n - B_{n+k}|$ of the absolute values of the differences between the two signal data strings A and B, the correlation quantity indicating the level of correlation between the two signal data strings A and B can be determined with a higher level of accuracy even when a relative distortion has occurred in the two signal data strings A and B by adopting correlation operation processing example 1. In addition, since the denominators in correlational operation expression (108) contain no data multiplication or division, the probability of operational divergence that will occur when a denominator assumes the value of 0 is lowered. Furthermore, since the numerators contain no data multiplication or division either, the length of time required for the correlation operation is reduced.

CORRELATION OPERATION PROCESSING EXAMPLE 2

The correlation quantity C(k) is determined as expressed below.

$$C(k)=\Sigma\{|(A_n/A_{n+1})-(B_{n+k}/B_{n+1+k})|\times \mathrm{MIN}(A_{n+1}, B_{n+1+k})\} \qquad (109)$$

Figure 48:
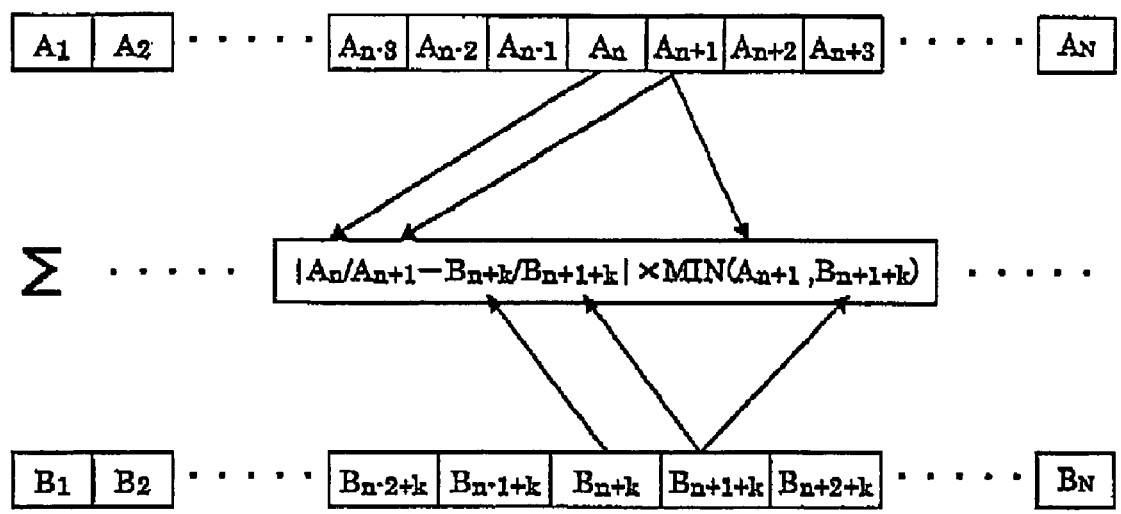
FIG. 48 shows the data flow in correlation operation processing example 2.

In expression (109), the $\Sigma$ operation is cumulatively executed with regard to n and the range assumed for n is limited to the range over which the data $A_n$, $A_{n+}$, $B_{n+k}$ and $B_{n+1+k}$ exist in correspondence to the shift quantity k. In addition, MIN ( ) represents a function through which the minimum value among the data values indicated by the plurality of sets of data is selected. FIG. 48 shows the data flow in a correlation operation processing example 2.

In expression (109) used in correlation operation processing example 2, which is obtained by modifying expression (108) in correlation operation processing example 1 explained above, expression (108) is weighted based upon the minimum value among the values used in the denominators. Since the first operation data and the second operation data explained earlier are each obtained as; (operation target data× 1), no substantial operation is actually executed as the first arithmetic operation or the second arithmetic operation in correlation operation processing example 2.

Figure 49:
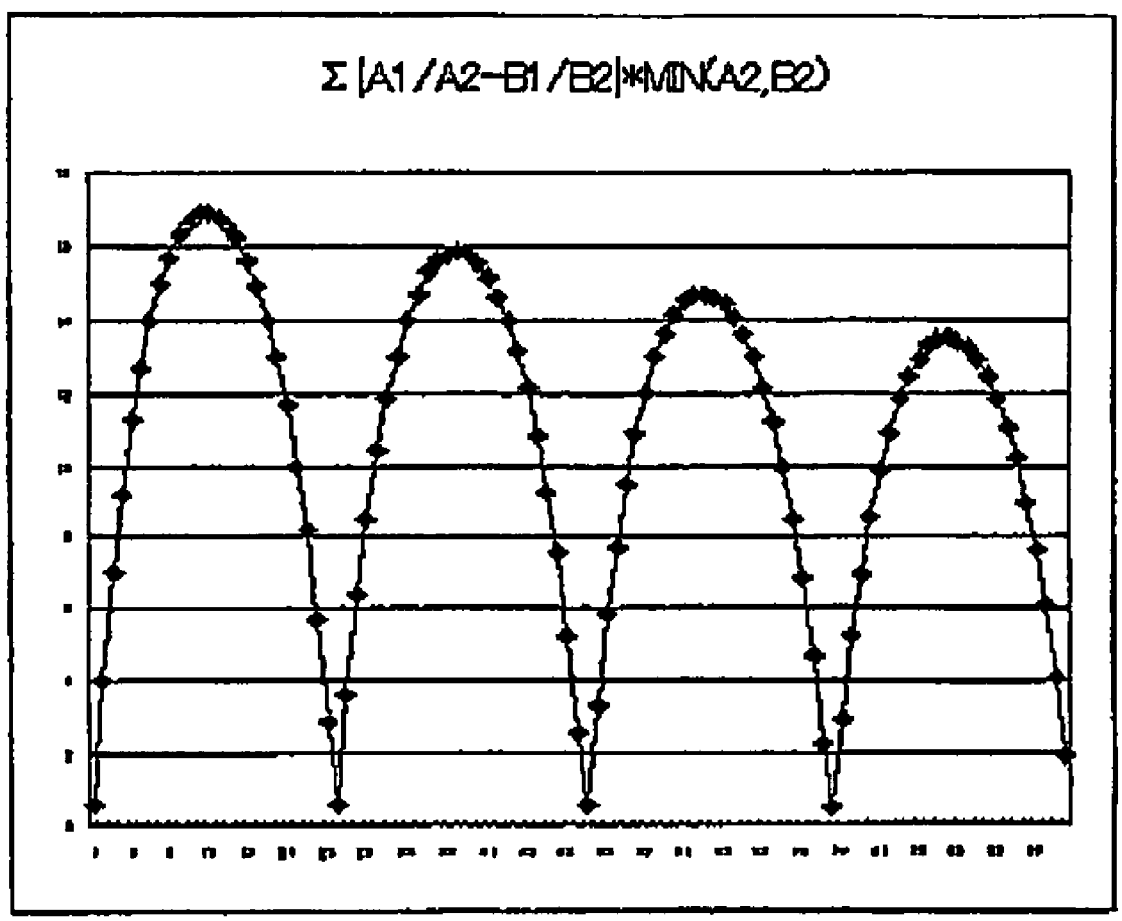
FIG. 49 shows the results obtained by executing the processing in correlation operation processing example 2.

FIG. 49 presents the results of the correlation operation in correlation operation processing example 2 executed on the two signal data strings A and B shown in FIG. 46 manifesting a relative distortion. As FIG. 49 clearly indicates, although the two signal data strings A and B are distorted, a high level of correlation is cyclically achieved (at the dipped positions) by executing the correlation operation in correlation operation processing example 2. In addition to achieving advantages similar to those of correlation operation processing example 1 described above, correlation operation processing example 2 assures better anti-noise performance by preventing the correlation detection accuracy from becoming lowered due to fluctuations in the value calculated as expressed in (108), which may be caused by the noise component contained in the data when the denominators assume small values.

CORRELATION OPERATION PROCESSING EXAMPLE 3

The correlation quantity C(k) is determined as expressed below.

$$C(k)=\Sigma|A_n/(A_n+A_{n+1})-B_{n+k}/(B_{n+k}+B_{n+1+k})| \qquad (110)$$

Figure 50:
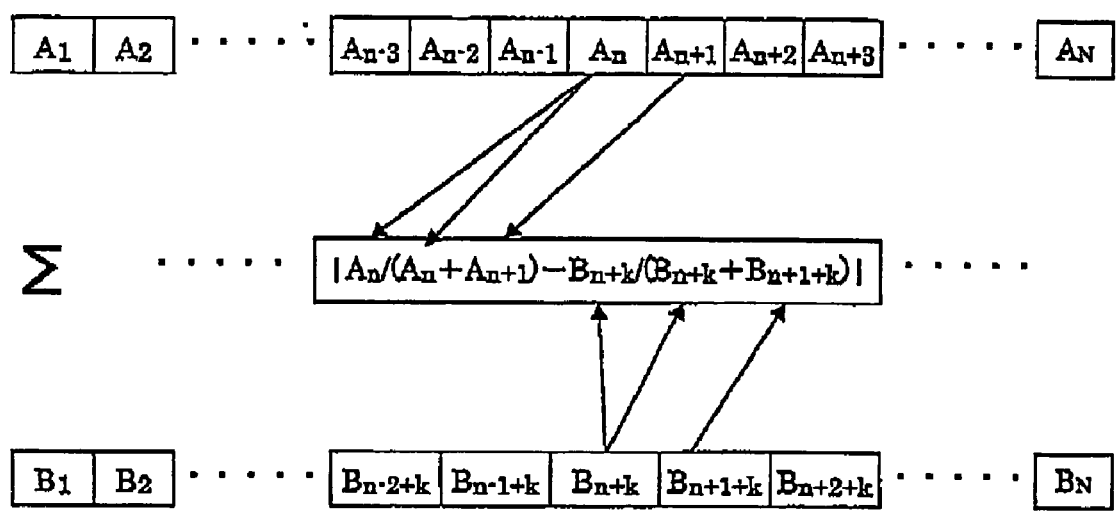
FIG. 50 shows the data flow in correlation operation processing example 3.

In expression (110) the $\Sigma$ operation is cumulatively executed with regard to n and the range assumed for n is limited to the range over which the data $A_n$, $A_{n+1}$, $B_{n+k}$ and $B_{n+1+k}$ exist in correspondence to the shift quantity k. FIG. 50 shows the data flow in correlation operation processing example 3.

In correlation operation expression (110) used in correlation operation processing example 3, which is obtained by modifying expression (108), the denominators each assume the value representing the sum of the two sets of data, i.e., the value obtained by multiplying the average value of the two sets of data by 2. In correlation operation processing example 3, the first arithmetic operation is executed as; (operation target data×1) and thus, no substantial operation is executed in the first arithmetic operation. The second arithmetic operation executed for the first signal data string A, on the other hand, is an averaging operation through which the sum of the target data $A_n$ and the nearby data $A_{n+1}$ is calculated and the second arithmetic operation executed for the second signal data string B is an averaging operation through which the sum of the target data $B_{n+k}$ (the data corresponding to the target data $A_n$ in the first signal data string) and the nearby data $B_{n+1+k}$ is calculated.

Figure 51:
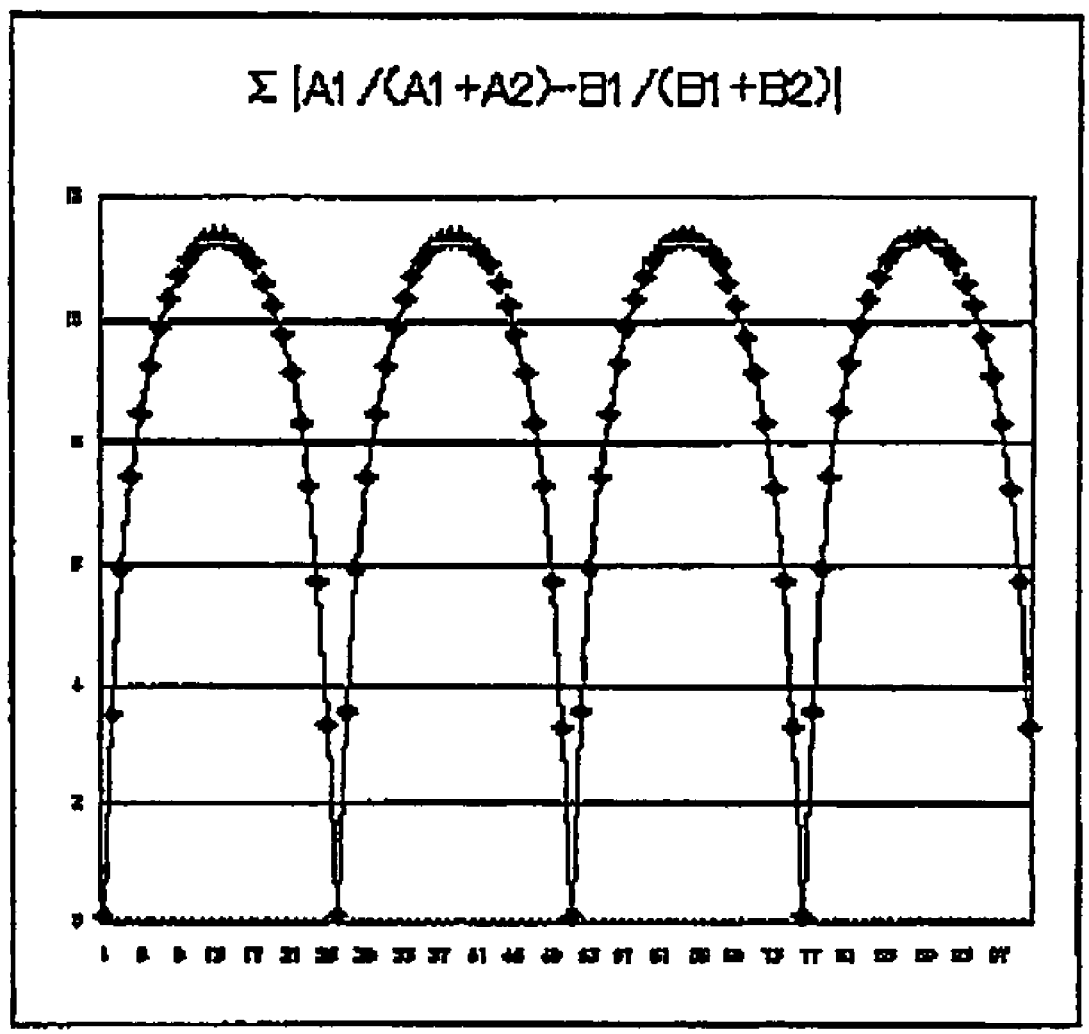
FIG. 51 shows the results obtained by executing the processing in correlation operation processing example 3.

FIG. 51 presents the results of the correlation operation in correlation operation processing example 3 executed on the two signal data strings A and B shown in FIG. 46 manifesting a relative distortion. As FIG. 57 clearly indicates, although the two signal data strings A and B are distorted, a high level of correlation is cyclically achieved (at the dipped positions) by executing the correlation operation in correlation operation processing example 3. In addition to achieving advantages similar to those of correlation operation processing example 1 described above, correlation operation processing example 3 assures better anti-noise performance by preventing the correlation detection accuracy from becoming lowered since the probability of a noise component contained in the denominators is reduced.

CORRELATION OPERATION PROCESSING EXAMPLE 4

The correlation quantity C(k) is determined as expressed below.

$$C(k)=\Sigma|(A_n-A_{n+1})/(A_n+A_{n+1})-(B_{n+k}-B_{n+1+k})/(B_{n+k}+B_{n+1+k})| \qquad (111)$$

Figure 52:
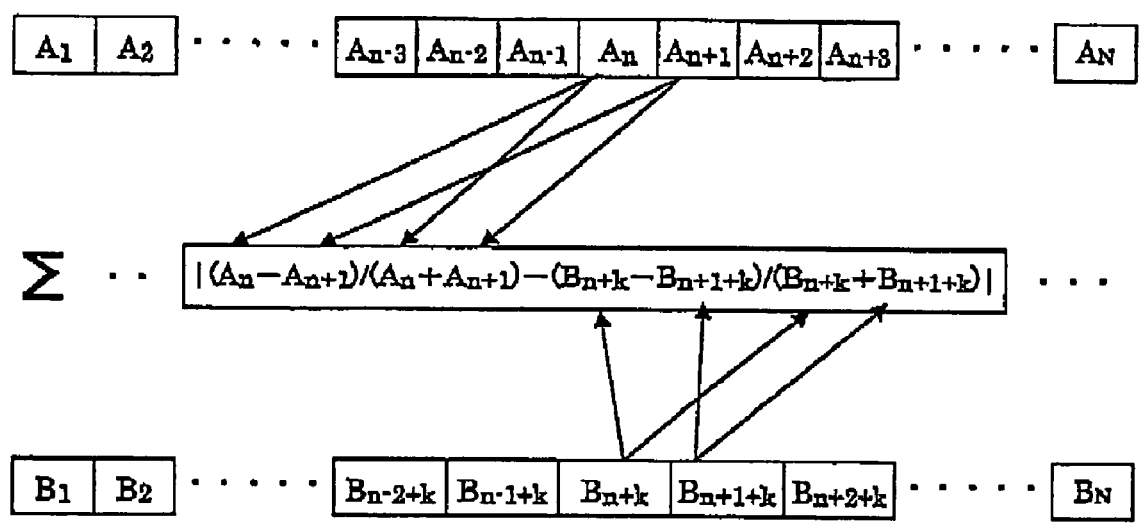
FIG. 52 shows the data flow in correlation operation processing example 4.

In expression (111), the $\Sigma$ operation is cumulatively executed with regard to n and the range assumed for n is limited to the range over which the data $A_n$, $A_{n+1}$, $B_{n+k}$ and $B_{n+1+k}$ exist in correspondence to the shift quantity k. FIG. 52 shows the data flow in correlation operation processing example 4.

In correlation operation expression (111) used in correlation operation processing example 4, the numerators in expression (110) in correlation operation processing example 3 are each replaced with the difference between the two sets of data, i.e., the linear differential determined by using the two sets of data. In correlation operation expression (111) in correlation operation processing example 4, the first arithmetic operation executed for the first signal data string A is a linear differentiation through which the nearby data $A_{n+1}$ are subtracted from the target data $A_n$, and the first arithmetic operation executed for the second signal data string B is a linear differentiation through which the nearby data $B_{n+1+k}$ are subtracted from the target data $B_{n+k}$ (the data corresponding to the target data $A_n$ in the first signal data string). The second arithmetic operation executed for the first signal data string A, on the other hand, is an averaging operation through which the sum of the target data $A_n$ and the nearby data $A_{n+1}$ is calculated and the second arithmetic operation executed for the second signal data string B is an averaging operation through which the sum of the target data $B_{n+k}$ and the nearby data $B_{n+1+k}$ is calculated.

Figure 53:
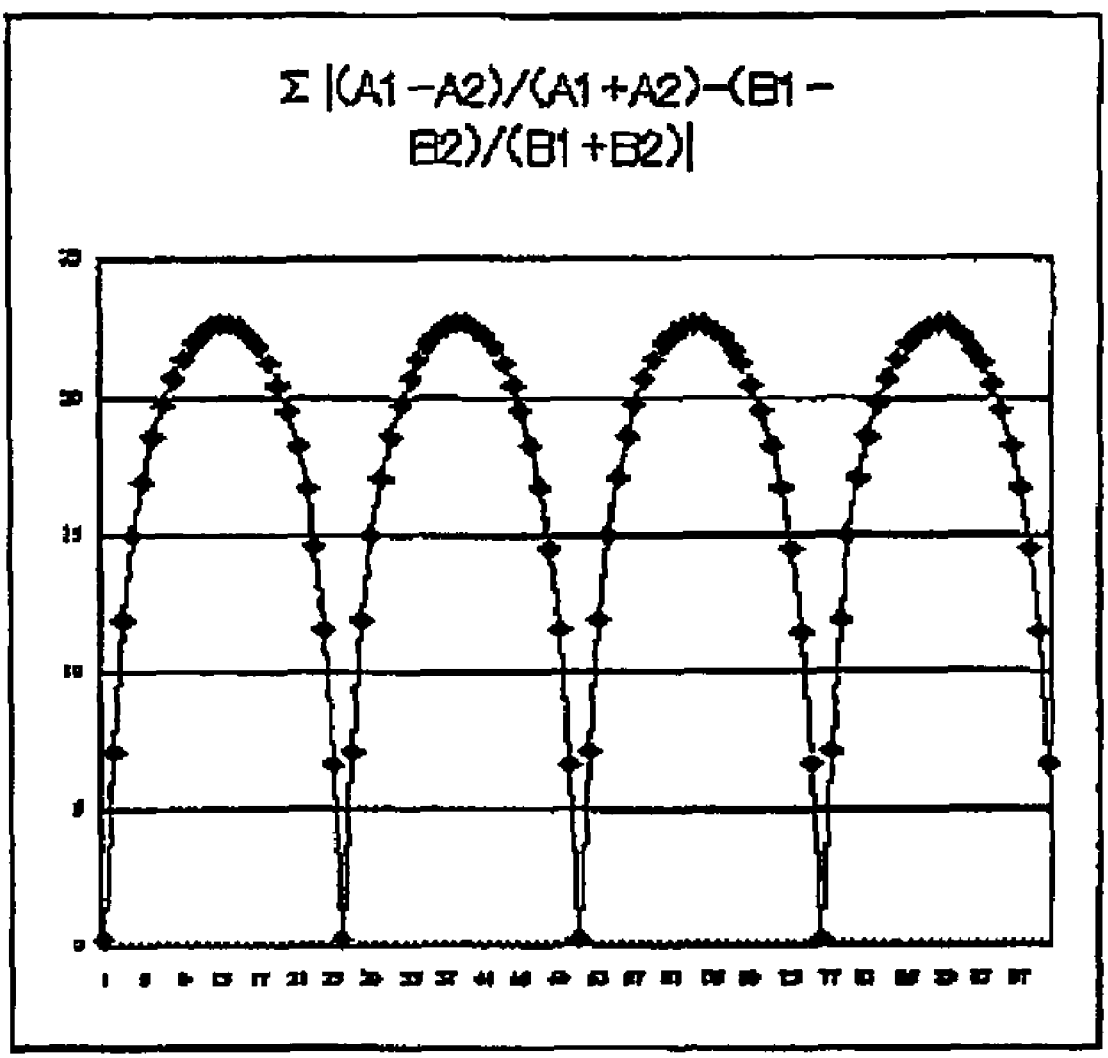
FIG. 53 shows the results obtained by executing the processing in correlation operation processing example 4.

FIG. 53 presents the results of the correlation operation in correlation operation processing example 4 executed on the two signal data strings A and B shown in FIG. 46 manifesting a relative distortion. As FIG. 53 clearly indicates, although the two signal data strings A and B are distorted, a high level of correlation is cyclically achieved (at the dipped positions) by executing the correlation operation in correlation operation processing example 4. In addition to achieving advantages similar to those of correlation operation processing example 1 and correlation operation processing example 3 described above, correlation operation processing example 4 assures better anti-noise performance by preventing the correlation detection accuracy from becoming lowered since the probability of a noise component contained in the denominators is reduced. In addition, highly accurate correlation detection is enabled even when a DC offset manifests in the two data strings A and B by eliminating the DC component contained in the data strings and thus, an improvement in the anti-DC offset performance is achieved.

VARIATION OF CORRELATION OPERATION PROCESSING EXAMPLE 4

The correlation quantity C(k) is determined as expressed below.

$$C(k)=\Sigma|(A_n-A_{n+2})/(A_n+A_{n+2})-(B_{n+k}-B_{n+2+k})/(B_{n+k}+B_{n+2+k})| \quad (112)$$

In expression (112), the $\Sigma$ operation is cumulatively executed with regard to n and the range assumed for n is limited to the range over which the data $A_n$, $A_{n+2}$, $B_{n+k}$ and $B_{n+2+k}$ exist in correspondence to the shift quantity k. By using correlation operation expression (112), the arithmetic operations are executed by using data sampled over wider ranges compared to the arithmetic operations executed as expressed in correlation operation expression (111), i.e., the "miniscule range" explained earlier is widened and, as a result, the anti-DC offset performance can be adjusted.

CORRELATION OPERATION PROCESSING EXAMPLE 5

The correlation quantity C(k) is determined as expressed below.

$$C(k)=\Sigma|(2\times A_n-A_{n-1}-A_{n+1})/(A_{n-1}+A_n+A_{n+1})-(2\times B_{n+k}-B_{n-1+k}-B_{n+1+k})/(B_{n-1+k}+B_{n+k}+B_{n+1+k})| \quad (113)$$

Figure 54:
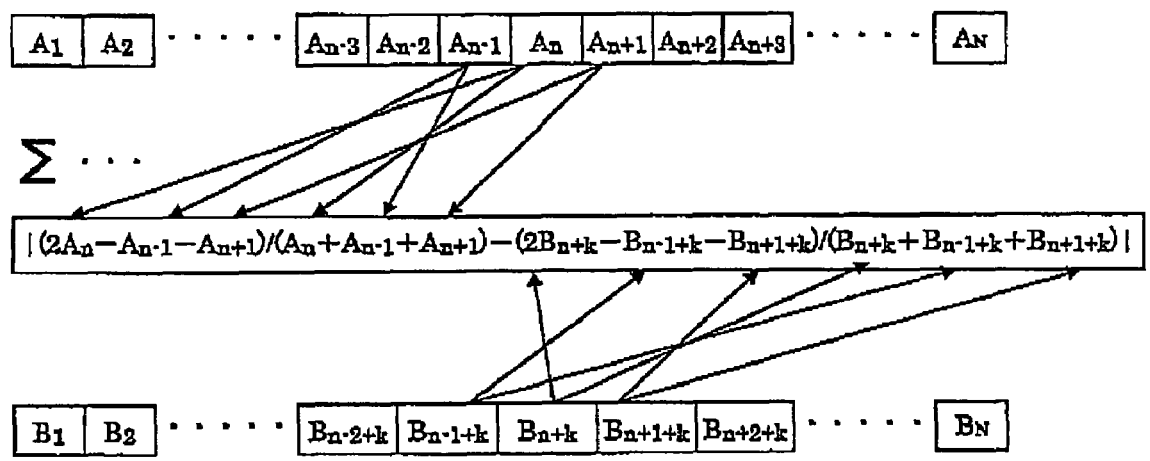
FIG. 54 shows the data flow in correlation operation processing example 5.

In expression (113), the $\Sigma$ operation is cumulatively executed with regard to n and the range assumed for n is limited to the range over which the data $A_{n-}$, $A_n$, $A_{n+1}$, $B_{n-1+k}$, $B_{n+k}$ and $B_{n+1+k}$ exist in correspondence to the shift quantity k. FIG. 54 shows the data flow in correlation operation processing example 5.

In expression (113) used in correlation operation processing example 5, which is obtained by modifying correlation operation expression (110), the numerators in correlation operation expression (110) are each replaced with addition and subtraction of three sets of data, i.e., a quadratic differentiation. In expression (113) in correlation operation processing example 5, the first arithmetic operation executed for both the first signal data string A and the second signal data string B is a quadratic differentiation over the "miniscule range" containing the target data and nearby data and the second arithmetic operation executed for both the first signal data string A and the second signal data string B is an averaging operation over the "miniscule range" containing the target data and the nearby data.

Figure 55:
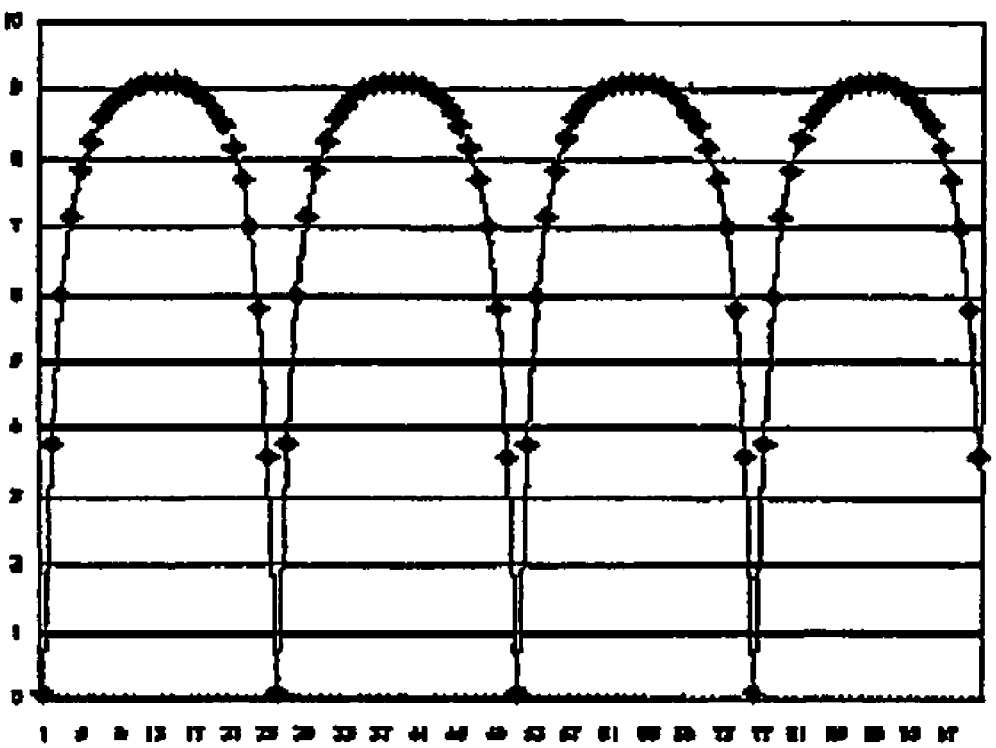
FIG. 55 shows the results obtained by executing the processing in correlation operation processing example 5.

FIG. 55 presents the results of the correlation operation in correlation operation processing example 5 executed on the two signal data strings A and B shown in FIG. 46 manifesting a relative distortion. As FIG. 5 clearly indicates, although the two signal data strings A and B are distorted, a high level of correlation is cyclically achieved (at the dipped positions) by executing the correlation operation in correlation operation processing example 5. In addition to achieving advantages similar to those of correlation operation processing example 1 and correlation operation processing example 4 described above, correlation operation processing example 5 assures better anti-noise performance by preventing the correlation detection accuracy from becoming lowered since the probability of a noise component contained in the denominators is reduced. In addition, highly accurate correlation detection is enabled even when a DC offset manifests in the two data strings A and B or a difference in the linear slope component is contained in the two data strings A and B by eliminating the DC component and the linear slope component contained in the data strings and thus, an improvement in the anti-DC offset performance is achieved.

VARIATION OF CORRELATION OPERATION PROCESSING EXAMPLE 5

The correlation quantity C(k) is determined as expressed below.

$$C(k)=\Sigma|(2\times A_n-A_{n-2}-A_{n+2})/(A_{n-2}+A_n+A_{n+2})-(2\times B_{n+k}-B_{n-2+k}-B_{n+2+k})/(B_{n-2+k}+B_{n+k}+B_{n+2+k})| \quad (114)$$

In expression (114), the $\Sigma$ operation is cumulatively executed with regard to n and the range assumed for n is limited to the range over which the data $A_{n-2}$, $A_n$, $A_{n+2}$, $B_{n-2+k}$, $B_{n+k}$ and $B_{n+2+k}$, exist in correspondence to the shift quantity k. By using correlation operation expression (114), the arithmetic operations are executed by using data sampled over wider ranges compared to the arithmetic operations executed as expressed in correlation operation expression (113), i.e., the "miniscule range" explained earlier is widened and, as a result, the anti-DC offset performance can be adjusted.

CORRELATION OPERATION PROCESSING EXAMPLE 6

The correlation quantity C(k) is determined as expressed below.

$$C(k)=\Sigma\{|A_n^2/(A_{n-1}\times A_{n+1})-B_{n+k}^2/(B_{n-1+k}\times B_{n+1+k})|\times \text{MIN}(A_{n-1},A_{n+1},B_{n-1+k},B_{n+1+k})\} \quad (115)$$

Figure 56:
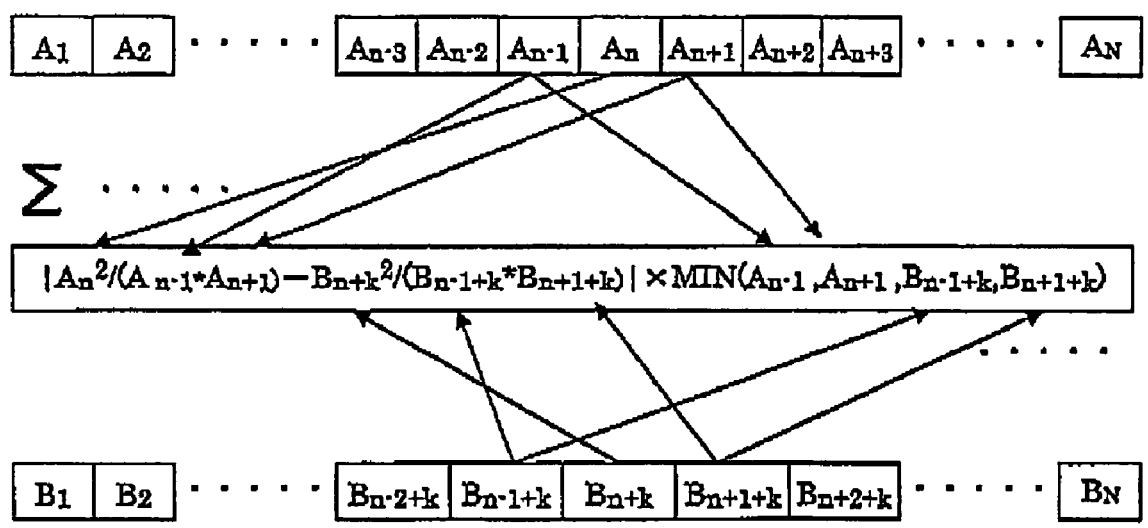
FIG. 56 shows the data flow in correlation operation processing example 6.

In expression (115), the Σ operation is cumulatively executed with regard to n and the range assumed for n is limited to the range over which the data $A_{n-1}$, $A_n$, $A_{n+1}$, $B_{n-1+k}$, $B_{n+k}$, $B_{n+1+k}$, exist in correspondence to the shift quantity k. In addition, MIN ( ) represents a function through which the minimum value among the data values indicated by the plurality of sets of data is selected. FIG. 56 shows the data flow in correlation operation processing example 6.

Operation expression (115) used in correlation operation processing example 6 is weighted based upon the minimum value among the values used in the denominators. In operation expression (115), the first arithmetic operation is executed for the first signal data string A and the second signal data string B by squaring the target data and the second arithmetic operation is executed for the first signal data string A and the second signal data string B by calculating the product of the nearby sets of data present near the target data.

Figure 57:
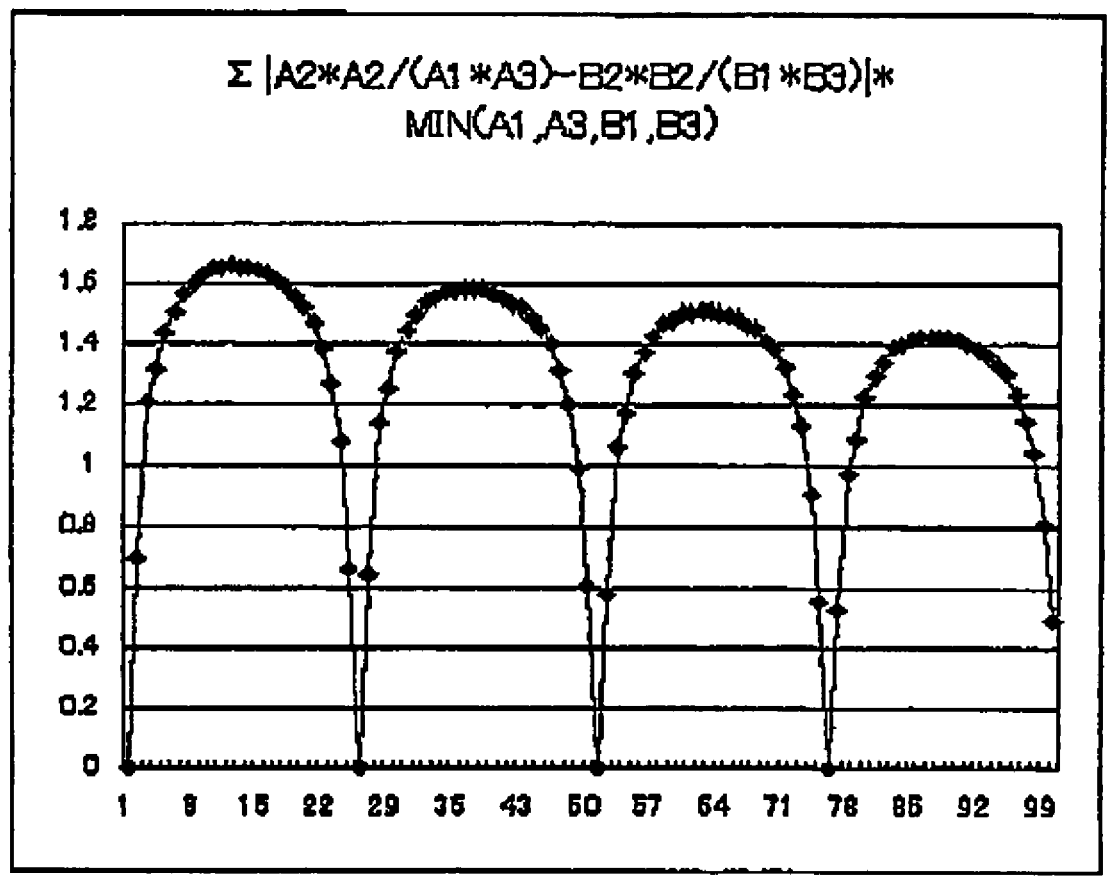
FIG. 57 shows the results obtained by executing the processing in correlation operation processing example 6.
Figure 58:
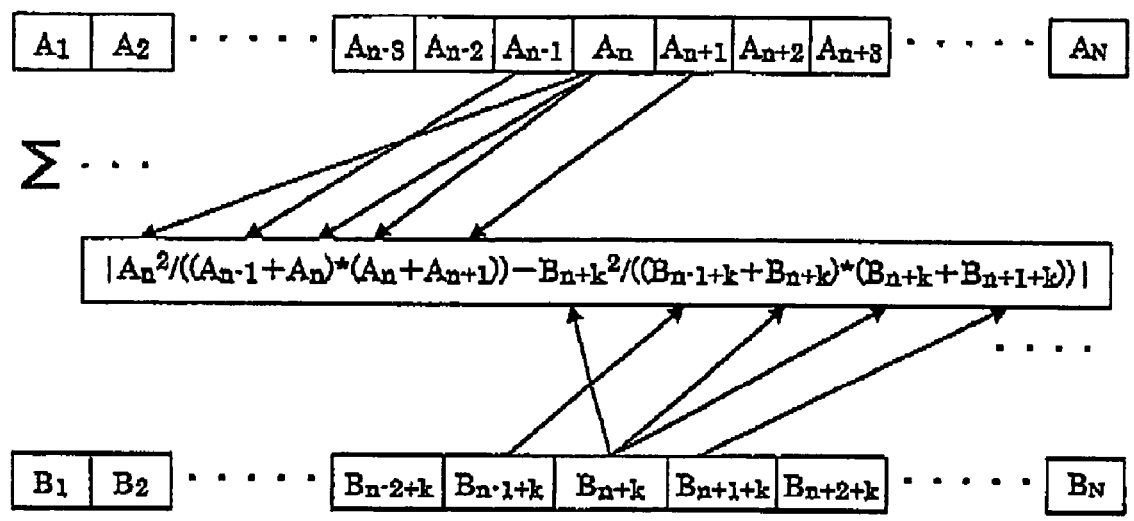
FIG. 58 shows the data flow in correlation operation processing example 7.

FIG. 57 presents the results of the correlation operation in correlation operation processing example 6 executed on the two signal data strings A and B shown in FIG. 46 manifesting a relative distortion. As FIG. 57 clearly indicates, although the two signal data strings A and B are distorted, a high level of correlation is cyclically achieved (at the dipped positions) by executing the correlation operation in correlation operation processing example 6. In addition to achieving advantages similar to those of correlation operation processing example 1 described above, correlation operation processing example 6 assures better anti-noise performance by preventing the correlation detection accuracy from becoming lowered due to fluctuations of the correlation operation results which may be caused by the noise component contained in the data when the denominators assume small values.

CORRELATION OPERATION PROCESSING EXAMPLE 7

The correlation quantity C(k) is determined as expressed below.

$$C(k)=\Sigma |A_n^2/\{(A_{n-1}+A_n)\times(A_n+A_{n+1})\}-B_{n+k}^2/\{(B_{n-1+k}+B_{n+k})\times(B_{n+k}+B_{n+1+k})\}| \qquad (116)$$

In expression (116), the Σ operation is cumulatively executed with regard to n and the range assumed for n is limited to the range over which the data $A_{n-1}$, $A_n$, $A_{n+1}$, $B_{n-1+k}$, $B_{n+k}$ and $B_{n+1+k}$ exist in correspondence to the shift quantity k. FIG. 5B shows the data flow in correlation operation processing example 7.

In operation expression (116) used in correlation operation processing example 7, the first arithmetic operation is executed by squaring the target data for both the first signal data string A and the second signal data string B. The second arithmetic operation, on the other hand, is executed by calculating the product of the sum of the target data and a set of nearby data and the sum of the target and another set of nearby data for both the first signal data string A and the second signal data string B.

Figure 59:
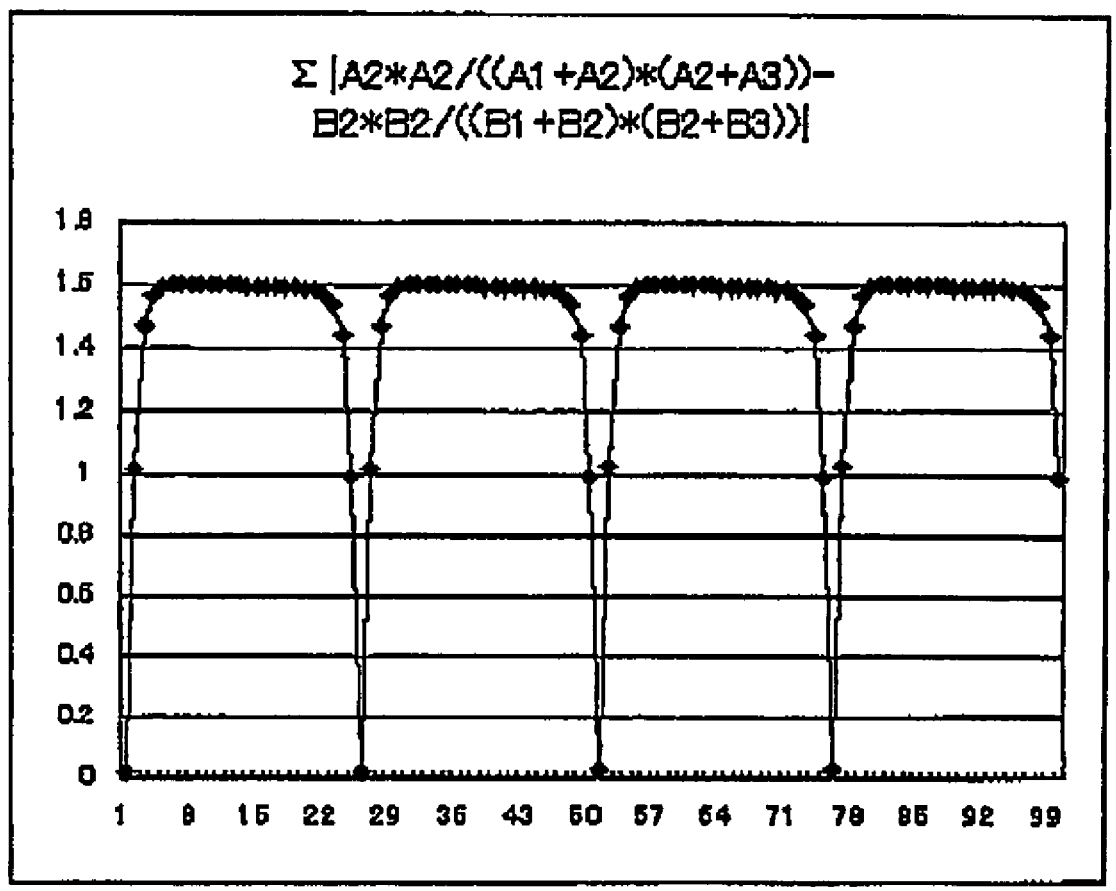
FIG. 59 shows the results obtained by executing the processing in correlation operation processing example 7.

FIG. 59 presents the results of the correlation operation in correlation operation processing example 7 executed on the two signal data strings A and B shown in FIG. 46 manifesting a relative distortion. As FIG. 59 clearly indicates, although the two signal data strings A and B are distorted, a high level of correlation is cyclically achieved (at the dipped positions) by executing the correlation operation in correlation operation processing example 7. In addition to achieving advantages similar to those of correlation operation processing example 1 described above, correlation operation processing example 7 assures better anti-noise performance by preventing the correlation detection accuracy from becoming lowered since the probability of a noise component contained in the denominators is reduced, with each denominator assuming the product of the two values each representing the sum of two sets of data in the miniscule range containing the target data in either the signal data string A or the signal data string B.

CORRELATION OPERATION PROCESSING EXAMPLE 8

The correlation quantity C(k) is determined as expressed below.

$$C(k)=\Sigma |(A_{n-1}-A_n)\times(A_n-A_{n+1})/\{(A_{n-1}+A_n)\times(A_n+A_{n+1})\}-(B_{n-1+k}-B_{n+k})\times(B_{n+k}-B_{n+1+k})/\{(B_{n-1+k}+B_{n+k})\times(B_{n+k}+B_{n+1+k})\}| \qquad (117)$$

Figure 60:
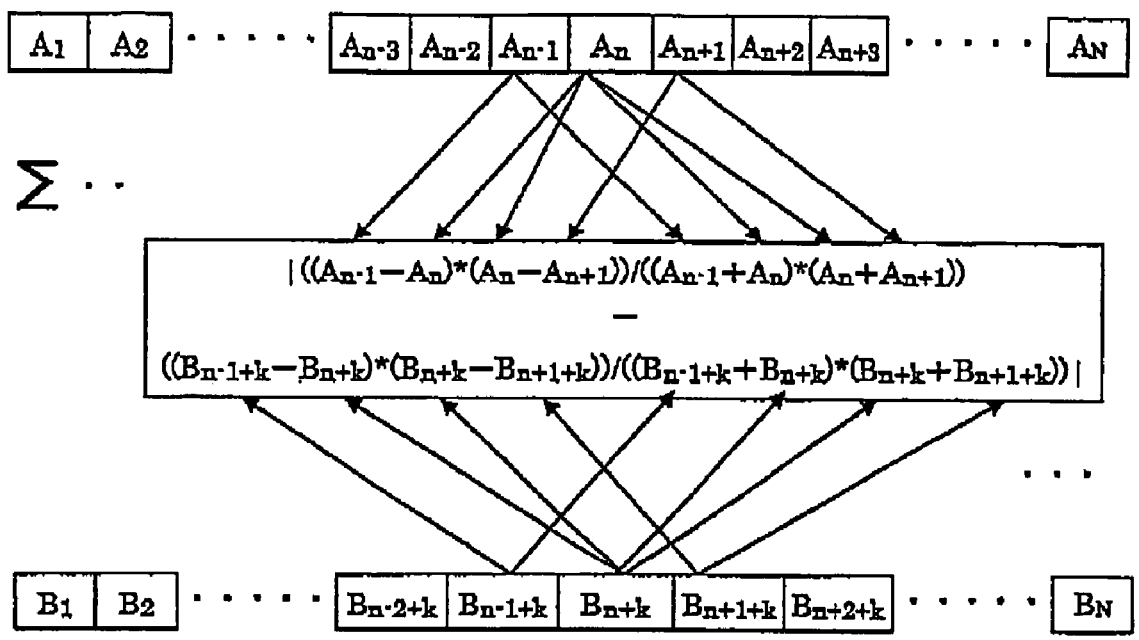
FIG. 60 shows the data flow in correlation operation processing example 8.

In expression (117), the Σ operation is cumulatively executed with regard to n and the range assumed for n is limited to the range over which the data $A_{n-1}$, $A_n$, $A_{n+1}$, $B_{n-1+k}$, $B_{n+k}$ and $B_{n+1+k}$ exist in correspondence to the shift quantity k. FIG. 60 shows the data flow in correlation operation processing example 8.

In operation expression (117) used in correlation operation processing example 8, obtained by modifying the numerators (first arithmetic operation) in expression (116), the first arithmetic operation is executed by calculating the product of the two values each representing the difference between the target data and a set of nearby data, i.e., the two values resulting from linear differentiation, for both the signal data string A and the signal data string B. The second arithmetic operation is executed by calculating the product of the two values each representing the sum of the target data and a set of nearby data for both the signal data string A and the signal data string B as in expression (116).

Figure 61:
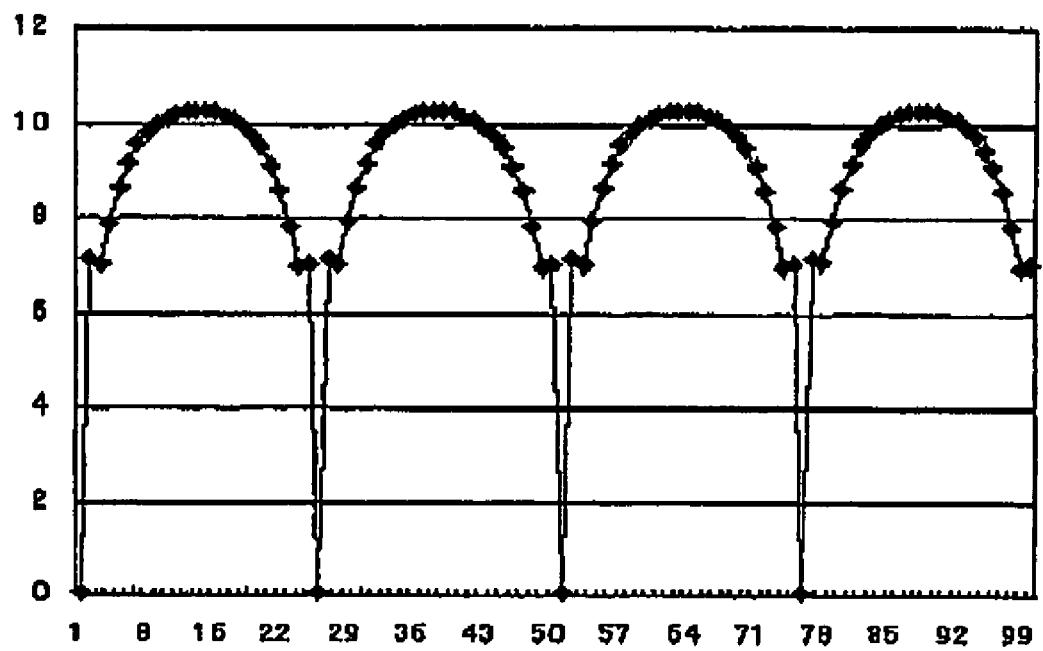
FIG. 61 shows the results obtained by executing the processing in correlation operation processing example 8.

FIG. 61 presents the results of the correlation operation in correlation operation processing example 8 executed on the two signal data strings A and B shown in FIG. 46 manifesting a relative distortion. As FIG. 61 clearly indicates, although the two signal data strings A and B are distorted, a high level of correlation is cyclically achieved (at the dipped positions) by executing the correlation operation in correlation operation processing example B. In addition to achieving advantages similar to those of correlation operation processing example 1 and correlation operation processing example 7 described above, correlation operation processing example 8 assures highly accurate correlation detection even when a DC offset is contained in the signal data strings A and B by executing linear differentiation of the target data and the nearby data in the numerators and thus eliminating the DC component contained in the two signal data strings A and B.

VARIATIONS OF CORRELATION OPERATION PROCESSING EXAMPLES 1~8

While the data used in each session of the first arithmetic operation or the second arithmetic operation belong in a single signal data string, i.e., the ratio of data present over the miniscule range in a single signal data string such as $A_n/A_{n+1}$ or $B_{n+k}/B_{n+1+k}$, is used as the representation of the characteristics of the particular data string, in the correlation operations in correlation operation processing examples 1~8 explained above, similar advantages can be achieved by using the ratios of data present over the miniscule range in the different signal data strings, e.g. r $A_n/B_{n+k}$ and $A_{n+1}/B_{n+1+k}$, as characteristics of the data strings in the correlation operation. The following is an explanation of variations in which expressions (118)~

(127), instead of correlation operation expressions (108)~(117) in correlation operation processing examples 1-8 explained above, are used.

VARIATION OF CORRELATION OPERATION PROCESSING EXAMPLE 1

The correlation level C(k) is determined by using expression (118) below instead of correlation operation expression (108) in correlation operation processing example 1.

$$C(k)=\Sigma |A_n/B_{n+k} - A_{n+1}/B_{n+1+k}| \quad (118)$$

In expression (118), the Σ operation is cumulatively executed with regard to n and the range assumed for n is limited to the range over which the data $A_n$, $A_{n+1}$, $B_{n+k}$ and $B_{n+1+k}$ exist in correspondence to the shift quantity k.

VARIATION OF CORRELATION OPERATION PROCESSING EXAMPLE 2

The correlation level C(k) is determined by using expression (119) below instead of correlation operation expression (109) in correlation operation processing example 2.

$$C(k)=\Sigma\{(A_n/B_{n+k} - A_{n+1}/B_{n+1+k}) \times \text{MIN}(B_{n+k}, B_{n+1+k})\} \quad (119)$$

In expression (119), the Σ operation is cumulatively executed with regard to n and the range assumed for n is limited to the range over which the data $A_n$, $A_{n+1}$, $B_{n+k}$ and $B_{n+1+k}$ exist in correspondence to the shift quantity k. In addition, MIN( ) represents a function through which the minimum value among the values indicated in the plurality of sets of data is selected.

VARIATION OF CORRELATION OPERATION PROCESSING EXAMPLE 3

The correlation level C(k) is determined by using expression (120) below instead of correlation operation expression (110) in correlation operation processing example 3.

$$C(k)=\Sigma |A_n/B_{n+k} - (A_n+A_{n+1})/(B_{n+k}+B_{n+1+k})| \quad (120)$$

In expression (120), the Σ operation is cumulatively executed with regard to n and the range assumed for n is limited to the range over which the data $A_n$, $A_{n+1}$, $B_{n+k}$ and $B_{n+1+k}$ exist in correspondence to the shift quantity k.

VARIATIONS OF CORRELATION OPERATION PROCESSING EXAMPLE 4

The correlation level C(k) is determined by using expression (121) below instead of correlation operation expression (111) in correlation operation processing example 4.

$$C(k)=\Sigma |(A_n-A_{n+1})/(B_{n+k}-B_{n+1+k}) - (A_n+A_{n+1})/(B_{n+k}+B_{n+1+k})| \quad (121)$$

In expression (121), the Σ operation is cumulatively executed with regard to n and the range assumed for n is limited to the range over which the data $A_n$, $A_{n+1}$, $B_n$, $B_{n+1+k}$ exist in correspondence to the shift quantity k.

The correlation level C(k) may be determined by using expression (122) below instead of correlation operation expression (112) in the variation of correlation operation processing example 4 described before.

$$C(k)=\Sigma |(A_n-A_{n+2})/(B_{n+k}-B_{n+2+k}) - (A_n+A_{n+2})/(B_{n+k}+B_{n+2+k})| \quad (122)$$

In expression (122), the Σ operation is cumulatively executed with regard to n and the range assumed for n is limited to the range over which the data $A_n$, $A_{n+2}$, $B_{n+k}$ and $B_{n+2+k}$ exist in correspondence to the shift quantity k.

VARIATIONS OF CORRELATION OPERATION PROCESSING EXAMPLE 5

The correlation level C(k) is determined by using expression (123) below instead of correlation operation expression (113) in correlation operation processing example 5.

$$C(k)=\Sigma |(2 \times A_n - A_{n-1} - A_{n+1})/(2 \times B_{n+k} - B_{n-1+k} - B_{n+1+k}) - (A_{n-1}+A_n+A_{n+1})/(B_{n-1+k}+B_{n+k}+B_{n+1+k})| \quad (123)$$

In expression (123), the Σ operation is cumulatively executed with regard to n and the range assumed for n is limited to the range over which the data $A_{n-1}$, $A_n$, $A_{n+1}$, $B_{n-1+k}$, $B_{n+k}$ and $B_{n+1+k}$ exist in correspondence to the shift quantity k.

The correlation level C(k) may be alternatively determined by using expression (124) below instead of correlation operation expression (114) introduced in the description of correlation operation processing example 5.

$$C(k)=\Sigma |(2 \times A_n - A_{n-2} - A_{n+2})/(2 \times B_{n+k} - B_{n-2+k} - B_{n+2+k}) - (A_{n-2}+A_n+A_{n+2})/(B_{n-2+k}+B_{n+k}+B_{n+2+k})| \quad (124)$$

In expression (124), the Σ operation is cumulatively executed with regard to n and the range assumed for n is limited to the range over which the data $A_{n-2}$, $A_n$, $A_{n+2}$, $B_{n-2+k}$, $B_{n+k}$ and $B_{n+2+k}$ exist in correspondence to the shift quantity k.

VARIATION OF CORRELATION OPERATION PROCESSING EXAMPLE 6

The correlation level C(k) is determined by using expression (125) below instead of correlation operation expression (115) in correlation operation processing example 6.

$$C(k)=\Sigma\{|A_n^2/B_{n+k}^2 - (A_{n-1} \times A_{n+1})/(B_{n-1+k} \times B_{n+1+k})| \times \text{MIN}(B_{n-1+k}, B_{n+k}, B_{n+1+k})\} \quad (125)$$

In expression (125), the Σ operation is cumulatively executed with regard to n and the range assumed for n is limited to the range over which the data $A_{n-1}$, $A_n$, $A_{n+1}$, $B_{n-1+k}$, $B_{n+k}$ and $B_{n+1+k}$ exist in correspondence to the shift quantity k. In addition, MIN( ) represents a function through which the minimum value among the values indicated in the plurality of sets of data is selected.

VARIATION OF CORRELATION OPERATION PROCESSING EXAMPLE 7

The correlation level C(k) is determined by using expression (126) below instead of correlation operation expression (116) in correlation operation processing example 7.

$$C(k)=\Sigma |A_n^2/B_{n+k}^2 - \{(A_{n-1}+A_n) \times (A_n+A_{n+1})\}/\{(B_{n-1+k}+B_{n+k}) \times (B_{n+k}+B_{n+1+k})\}| \quad (26)$$

In expression (126), the Σ operation is cumulatively executed with regard to n and the range assumed for n is limited to the range over which the data $A_{n-1}$, $A_n$, $A_{n+1}$, $B_{n-1+k}$, $B_{n+k}$, $B_{n+1+k}$ exist in correspondence to the shift quantity k.

VARIATION OF CORRELATION OPERATION PROCESSING EXAMPLE 8

The correlation level C(k) is determined by using expression (127) below instead of correlation operation expression (117) in correlation operation processing example 8.

$$C(k)=\Sigma|(A_{n-1}-A_n)\times(A_n-A_{n+1})/(B_{n-1+k}-B_{n+k})\times(B_{n+k}-B_{n+1+k})-\{(A_{n-1}+A_n)\times(A_n+A_{n+1})\}/\{(B_{n-1+k}+B_{n+k})\times(B_{n+k}+B_{n+1+k})\}| \quad (127)$$

In expression (127), the $\Sigma$ operation is cumulatively executed with regard to n and the range assumed for n is limited to the range over which the data $A_{n-1}, A_n, A_{n+1}, B_{n-1+k}, B_{n+k}, B_{n+1+k}$ exist in correspondence to the shift quantity k.

The above described embodiments are examples and various modifications can be made without departing from the spirit and scope of the invention.

The invention claimed is:

1. A correlation operation method adopted when calculating a degree of correlation manifesting between a first signal data string and a second signal data string, comprising:
    a first information generation step of generating first operation data by calculating a product of first data in the first signal data string and nearby data present near second data in the second signal data string which correspond to the first data;
    a second information generation step of generating second operation data by calculating a product of the second data in the second signal data string and nearby data present near the first data in the first signal data string; and
    a correlation degree detection step of calculating a degree of correlation between the first operation data and the second operation data.

2. A correlation operation method according to claim 1, wherein:
    the first signal data string and the second signal data string are each a signal data string corresponding to signals output from an image sensor.

3. A correlation operation method according to claim 1, wherein:
    the first information generation step and the second information generation step are executed after processing for eliminating a high frequency component from the first signal data string and the second signal data string is executed.

4. A correlation operation method according to claim 1, further comprising:
    an average value subtraction step of subtracting an average value corresponding to the first data from the first data in the first signal data string and subtracting an average value corresponding to the second data from the second data in the second signal data string, wherein:
    the first operation data and the second operation data are generated respectively through the first information generation step and the second information generation step by using the first signal data string and the second signal data string having undergone the average value subtraction step.

5. A correlation operation method adopted when calculating a degree of correlation manifesting between a first signal data string and a second signal data string, comprising:
    a first information generation step of generating first operation data by calculating a product of first data in the first signal data string and nearby data present near second data in the second signal data string which correspond to the first data;
    a second information generation step of generating second operation data by calculating a product of the second data in the second signal data string and nearby data present near the first data in the first signal data string; and
    a correlation degree detection step of calculating a degree of correlation between the first operation data and the second operation data by calculating an absolute value representing a difference between the first operation data and the second arithmetic operation data.

6. A correlation operation method according to claim 5, wherein:
    the first information generation step and the second information generation step are both executed by sequentially switching data used as the first data in the first signal data string; and
    in the correlation degree detection step, a sum of absolute values representing differences between the first operation data and the second operation data is calculated.

7. A correlation operation method according to claim 6, wherein:
    the first information generation step and the second information generation step are both executed by shifting the first signal data string and the second signal data string relative to each other along a direction in which data are strung in the data strings; and
    in the correlation degree detection step, the degree of correlation between the first operation data and the second operation data is calculated by sequentially altering an extent to which the first signal data string and the second signal data string are shifted relative to each other.

8. A correlation operation method according to claim 7, wherein:
    in the correlation degree detection step, a shift quantity between the first signal data string and the second signal data string is detected based upon the extent to which the first signal data string and the second signal data string are shifted relative to each other when the degree of correlation peaks.

9. A correlation operation method adopted when calculating a degree of correlation manifesting between a first signal data string and a second signal data string, comprising:
    a first information generation step of obtaining operation data by executing a first arithmetic operation on first data and nearby data present near the first data in the first signal data string, obtaining operation data by executing a second arithmetic operation on second data in the second signal data string corresponding to the first data and nearby data present near the second data in the second signal data string, and obtaining first operation data by calculating a product of the two types of operation data thus obtained;
    a second information generation step of obtaining operation data by executing the first arithmetic operation on the second data and the nearby data in the second signal data string, obtaining operation data by executing the second arithmetic operation on the first data and the nearby data in the first signal data string, and obtaining second operation data by calculating a product of the two types of operation data thus obtained; and
    a correlation degree detection step of calculating a degree of correlation between the first operation data and the second operation data.

10. A correlation operation method according to claim 9, wherein:
    the first arithmetic operation is addition and subtraction executed on the first data and the nearby data present near the first data or addition and subtraction executed on the second data and the nearby data present near the second data.

11. A correlation operation method according to claim 9, wherein:
the second arithmetic operation is an operation for calculating a sum of the first data and the nearby data present near the first data or an operation for calculating a sum of the second data and the nearby data present near the second data.

12. A correlation operation method according to claim 9, wherein:
the second arithmetic operation is an averaging operation for averaging the first data and the corresponding nearby data or an averaging operation for averaging the second data and the corresponding nearby data.

13. A correlation operation method according to claim 9, wherein:
the first arithmetic operation is a differentiation executed on the first data and the nearby data present near the first data or a differentiation executed on the second data and the nearby data present near the second data.

14. A correlation operation method according to claim 9, wherein:
in the correlation degree detection step, an absolute value representing a difference between the first operation data and the second operation data is calculated.

15. A correlation operation device that calculates a degree of correlation manifesting between a first signal data string and a second signal data string, comprising:
a first information generation unit that generates first operation data by calculating a product of first data in the first signal data string and nearby data present near second data in the second signal data string which correspond to the first data;
a second information generation unit that generates second operation data by calculating a product of the second data in the second signal data string and nearby data present near the first data in the first signal data string; and
a correlation degree detection unit that calculates a degree of correlation between the first operation data and the second arithmetic operation data.

16. A correlation operation device that calculates a degree of correlation manifesting between a first signal data string and a second signal data string, comprising:
a first information generation unit that obtains operation data by executing a first arithmetic operation on first data and nearby data present near the first data in the first signal data string, obtains operation data by executing a second arithmetic operation on second data corresponding to the second data in the second signal data string corresponding to the first data and nearby data present near the second data in the second signal data string, and obtains first operation data by calculating a product of the two types of operation data thus obtained;
a second information generation unit that obtains operation data by executing the first arithmetic operation on the second data and the nearby data present near the second data in the second signal data string, obtains operation data by executing the second arithmetic operation on the first data and the nearby data present near the first data in the first signal data string and obtains second operation data by calculating a product of the two types of operation data thus obtained; and a correlation degree detection unit that calculates a degree of correlation between the first operation data and the second arithmetic operation data.

17. A correlation operation device according to claim 15, further comprising:
a subtraction unit that subtracts an average value corresponding to the first data from the first data in the first signal data string and subtracts an average value corresponding to the second data from the second data in the second signal data string, wherein:
the first information generating unit and the second information generating unit respectively generate the first operation data and the second operation data by using the first signal data string and the second signal data string having undergone an average value subtraction.

18. A focus detection device, comprising:
a photoelectric conversion element that receives light fluxes having passed through a pair of pupil areas of a photographic optical system via a focus detection optical system and outputs a pair of subject image signals;
an image shift detection unit that detects an image shift quantity between the pair of subject image signals by executing a correlation operation adopting a correlation operation method according to claim 1 on the pair of subject image signals output from the photoelectric conversion element; and
a focus detection unit that detects a state of focus adjustment achieved at the photographic optical system based upon the image shift quantity.

19. A focus detection device according to claim 18, wherein:
the focus detection optical system is an image reforming optical system that reforms an image formed on an predetermined focal plane of the photographic optical system onto the photoelectric conversion element.

20. A focus detection device, comprising:
a micro-lens;
a photoelectric conversion element disposed in correspondence to the micro-lens, which receives via the micro-lens light fluxes having passed through a pair of pupil areas of a photographic optical system and outputs a pair of subject image signals;
an image shift detection unit that detects an image shift quantity between the pair of subject image signals output from the photoelectric conversion element by executing a correlation operation adopting a correlation operation method according to claim 1 on the pair of subject image signals; and
a focus detection unit that detects a state of focus adjustment achieved at the photographic optical system based upon the image shift quantity.

21. A range-finding device, comprising:
a pair of photoelectric conversion elements that receive image light fluxes from a subject via a pair of optical systems;
an image shift detection unit that detects an image shift quantity between the pair of subject image signals output from the pair of photoelectric conversion elements by executing a correlation operation adopting a correlation operation method according to claim 1 on the pair of subject image signals; and
a range-finding unit that measures a distance to the subject based upon the image shift quantity.

22. An imaging device, comprising:
a photoelectric conversion element that receives light fluxes having passed through a pair of pupil areas of a photographic optical system via a focus detection optical system and outputs a pair of subject image signals:

an image shift detection unit that detects an image shift quantity between the pair of subject image signals by executing a correlation operation adopting a correlation operation method according to claim 1 on the pair of subject image signals output from the photoelectric conversion element;

a focus detection unit that detects a state of focus adjustment achieved at the photographic optical system based upon the image shift quantity; and an image sensor that captures a subject image via the photographic optical system.

23. A correlation operation method adopted when calculating a degree of correlation manifesting between a first signal data string and a second signal data string, comprising:

a first information generation step of generating first operation data and second operation data respectively by executing a first arithmetic operation or a second arithmetic operation on at least one of first data in the first signal data string and nearby data present near the first data in the first signal data string, and generating third operation data by dividing the first operation data by the second operation data;

a second information generation step of generating fourth operation data and fifth operation data respectively by executing the first arithmetic operation or the second arithmetic operation on at least one of second data in the second signal data string corresponding to the first data and nearby data present near the second data in the second signal data string, and generating sixth operation data by dividing the fourth operation data by the fifth operation data; and a correlation degree detection step of calculating a degree of correlation between the third operation data and the sixth operation data.

24. A correlation operation method according to claim 23, wherein:

the first signal data string and the second signal data string are each a signal data string corresponding to signals output from an image sensor.

25. A correlation operation method according to claim 23, wherein:

the first information generation step and the second information generation step are executed after processing for eliminating a high frequency component from the first signal data string and the second signal data string is executed.

26. A correlation operation method according to claim 23, wherein:

the first arithmetic operation is addition and subtraction executed on the first data and the nearby data present near the first data or addition and subtraction executed on the second data and the nearby data present near the second data.

27. A correlation operation method according to claim 23, wherein:

the first arithmetic operation is a differentiation executed on the first data and the nearby data present near the first data or a differentiation executed on the second data and the nearby data present near the second data.

28. A correlation operation method according to claim 23, wherein:

the second arithmetic operation is an operation for calculating the sum of the first data and the nearby data present near the first data or an operation for calculating the sum of the second data and the nearby data present near the second data.

29. A correlation operation method according to claim 23, wherein:

the second arithmetic operation is an averaging operation for averaging the first data and the nearby data present near the first data or an averaging operation for averaging the second data and the nearby data present near the second data.

30. A correlation operation method according to claim 23, wherein:

in the correlation degree detection step, the degree of correlation between the third operation data and the sixth operation data is weighted in correspondence to a smaller value among values indicated by the second operation data and the fifth operation data.

31. A correlation operation method adopted when calculating a degree of correlation manifesting between a first signal data string and a second signal data string, comprising:

a first information generation step generating first operation data and second operation data respectively by executing a first arithmetic operation or a second arithmetic operation on at least one of first data in the first signal data string and nearby data present near the first data in the first signal data string, and generating third operation data by dividing the first operation data by the second arithmetic operation data;

a second information generation step of generating fourth operation data and fifth operation data respectively by executing the first arithmetic operation or the second arithmetic operation on at least one of second data in the second signal data string corresponding to the first data and nearby data present near the second data in the second signal data string, and generating sixth operation data by dividing the fourth operation data by the fifth operation data; and a correlation degree detection step of calculating a degree of correlation between the third operation data and the sixth operation data by calculating an absolute value of a difference between the third operation data and the sixth operation data.

32. A correlation operation method according to claim 31, wherein:

the first information generation step and the second information generation step are both executed by sequentially switching data used as the first data in the first signal data string; and in the correlation degree detection step, a sum of absolute values representing differences between the third operation data and the sixth operation data is calculated.

33. A correlation operation method according to claim 32, wherein:

the first information generation step and the second information generation step are both executed by shifting the first signal data string and the second signal data string relative to each other along a direction in which data are strung in the data strings; and in the correlation degree detection step, the degree of correlation between the third operation data and the sixth operation data is calculated by sequentially altering an extent to which the first signal data string and the second signal data string are shifted relative to each other.

34. A correlation operation method according to claim 33, wherein:

in the correlation degree detection step, a shift quantity between the first signal data string and the second signal data string is detected based upon the extent to which the first signal data string and the second signal data string are shifted relative to each other when the degree of correlation peaks.

35. A correlation operation device that calculates a degree of correlation manifesting between a first signal data string and a second signal data string, comprising:
a first information generation unit that generates first operation data and second operation data respectively by executing a first arithmetic operation or a second arithmetic operation on at least one of first data in the first signal data string and nearby data present near the first data in the first signal data string and generates third operation data by dividing the first operation data by the second arithmetic operation data;
a second information generation unit that generates fourth operation data and fifth operation data respectively by executing the first arithmetic operation or the second arithmetic operation on at least one of second data in the second signal data string corresponding to the first data and nearby data present near the second data in the second signal data string and generates sixth operation data by dividing the fourth operation data by the fifth operation data; and
a correlation degree detection unit that calculates a degree of correlation between the third operation data and the sixth operation data.

36. A correlation operation method adopted when calculating a degree of correlation manifesting between a first signal data string and a second signal data string, comprising:
a first information generation step of generating first operation data by executing a first arithmetic operation on at least one of first data in the first signal data string and nearby data present near the first data in the first signal data string, generating second operation data by executing the first arithmetic operation on at least one of second data in the second signal data string corresponding to the first data and nearby data present near the second data in the second signal data string, and generating third operation data by dividing the first operation data by the second arithmetic operation data;
a second information generation step of generating fourth operation data by executing a second arithmetic operation on at least one of the first data and nearby data present near the first data in the first signal data string, generating fifth operation data by executing the second arithmetic operation on at least one of the second data and nearby data present near the second data in the second signal data string, and generating sixth operation data by dividing the fourth operation data by the fifth operation data; and
a correlation degree detection step of calculating a degree of correlation between the third operation data and the sixth operation data.

37. A correlation operation method according to claim 36, wherein:
the first arithmetic operation and the second arithmetic operation are addition and subtraction executed on the first data and the nearby data present near the first data or addition and subtraction executed on the second data and the nearby data present near the second data.

38. A correlation operation method according to claim 37, wherein:
in the correlation degree detection step, the degree of correlation between the third operation data and the sixth operation data is weighted in correspondence to a smaller value among values indicated by the second operation data and the fifth operation data.

39. A correlation operation method according to claim 38, wherein:
the first arithmetic operation and the second arithmetic operation each include a differentiation executed on the first data and the nearby data present near the first data or a differentiation executed on the second data and the nearby data present near the second data.

40. A correlation operation method according to claim 39, wherein:
in the correlation degree detection step, an absolute value representing a difference between the third operation data and the sixth operation data is calculated.

41. A correlation operation method according to claim 40, wherein:
the first information generation step and the second information generation step are both executed by sequentially switching data used as the first data in the first signal data string; and
in the correlation degree detection step, a sum of absolute values representing differences between the third operation data and the sixth operation data is calculated.

42. A correlation operation method according to claim 41, wherein:
the first information generation step and the second information generation step are both executed by shifting the first signal data string and the second signal data string relative to each other along a direction in which data are strung in the data strings; and
in the correlation degree detection step, the degree of correlation between the third operation data and the sixth operation data is calculated by sequentially altering an extent to which the first signal data string and the second signal data string are shifted relative to each other.

43. A correlation operation method according to claim 42, wherein:
in the correlation degree detection step, a shift quantity between the first signal data string and the second signal data string is detected based upon the extent to which the first signal data string in the second signal data string are shifted relative to each other when the degree of correlation degree peaks.

44. A correlation operation method according to claim 36, wherein:
the first signal data string and the second signal data string are each a signal data string corresponding to signals output from an image sensor.

45. A correlation operation method according to claim 36, wherein:
the first information generation step and the second information generation step are executed after processing for eliminating a high frequency component from the first signal data string and the second signal data string is executed.

46. A correlation operation device that calculates a degree of correlation manifesting between a first signal data string and a second signal data string, comprising:
a first information generation unit that generates first operation data by executing a first arithmetic operation on at least one of first data in the first signal data string and nearby data present near the first data in the first signal data string, generates second operation data by executing the first operation data on at least one of second operation data in the second signal data string corresponding to the first data and nearby data present near the second data in the second signal data string, and generates third operation data by dividing the first operation data by the second arithmetic operation data;

a second information generation unit that generates fourth operation data by executing a second arithmetic operation on at least one of the first data and nearby data present near the first data in the first signal data string, generates fifth operation data by executing the second arithmetic operation on at least one of the second data and nearby data present near the second data in the second signal data string, and generates sixth operation data by dividing the fourth operation data by the fifth operation data; and a correlation degree detection unit that calculates a degree of correlation between the third operation data and the sixth operation data.

47. A focus detection device, comprising:

a photoelectric conversion element that receives light fluxes having passed through a pair of pupil areas of a photographic optical system via a focus detection optical system and outputs a pair of subject image signals;

an image shift detection unit that detects an image shift quantity indicating an extent of image shift manifested by the pair of subject image signals by executing a correlation operation adopting a correlation operation method according to claim 23 on the pair of subject image signals output from the photoelectric conversion unit; and a focus detection unit that detects a state of focus adjustment achieved at the photographic optical system based upon the image shift quantity.

48. A focus detection device, comprising:

a photoelectric conversion element that receives light fluxes having passed through a pair of pupil areas of a photographic optical system via a focus detection optical system and outputs a pair of subject image signals;

an image shift detection unit that detects an image shift quantity indicating an extent of image shift manifested by the pair of subject image signals by executing a correlation operation adopting a correlation operation method according to claim 36 on the pair of subject image signals output from the photoelectric conversion unit; and a focus detection unit that detects a state of focus adjustment achieved at the photographic optical system based upon the extent of image shift.

49. A focus detection device, comprising:

a micro-lens;

a photoelectric conversion element disposed in correspondence to the micro-lens, which receives via the micro-lens light fluxes having passed through a pair of pupil areas of a photographic optical system and outputs a pair of subject image signals;

an image shift detection unit that detects an image shift quantity indicating an extent of image shift manifested by the pair of subject image signals output from the photoelectric conversion element by executing a correlation operation adopting a correlation operation method according to claim 23 on the pair of subject image signals; and a focus detection unit that detects a state of focus adjustment achieved at the photographic optical system based upon the image shift quantity.

50. A focus detection device, comprising:

a micro-lens;

a photoelectric conversion element disposed in correspondence to the micro-lens, which receives via the micro-lens light fluxes having passed through a pair of pupil areas of a photographic optical system and outputs a pair of subject image signals;

an image shift detection unit that detects an image shift quantity indicating an extent of image shift manifested by the pair of subject image signals output from the photoelectric conversion element by executing an operation adopting a correlation operation method according to claim 36 on the pair of subject image signals; and a focus detection unit that detects a state of focus adjustment achieved at the photographic optical system based upon the image shift quantity.

51. A focus detection device according to claim 47, wherein:

the focus detection optical system is an image reforming optical system that reforms an image formed on an predetermined focal plane of the photographic optical system onto the photoelectric conversion element.

52. A focus detection device according to claim 48, wherein:

the focus detection optical system is an image reforming optical system that reforms an image formed on an predetermined focal plane of the photographic optical system onto the photoelectric conversion element.

53. A range-finding device, comprising:

a pair of photoelectric conversion elements that receive image light fluxes from a subject via a pair of optical systems;

an image shift detection unit that detects an image shift quantity indicating an extent of image shift manifested by the pair of subject image signals output from the pair of photoelectric conversion unit by executing a correlation operation adopting a correlation operation method according to claim 23 on the pair of subject image signals; and a range-finding unit that measures a distance to the subject based upon the image shift quantity.

54. A range-finding device, comprising:

a pair of photoelectric conversion elements that receive image light fluxes from a subject via a pair of optical systems:

an image shift detection unit that detects an image shift quantity indicating an extent of image shift manifested by the pair of subject image signals output from the pair of photoelectric conversion unit by executing a correlation operation adopting a correlation operation method according to claim 36 on the pair of subject image signals; and a range-finding unit that measures a distance to the subject based upon the image shift quantity.

55. An imaging device, comprising:

a photoelectric conversion element that receives light fluxes, having passed through a pair of pupil areas of a photographic optical system, via a focus detection optical system and outputs a pair of subject image signals;

an image shift detection unit that detects an image shift quantity indicating an extent of image shift manifested by the pair of subject image signals by executing a correlation operation adopting an correlation operation method according to claim 23 on the pair of subject image signals output from the photoelectric conversion element;

a focus detection unit that detects a state of focus adjustment achieved at the photographic optical system based upon the image shift quantity; and an image sensor that captures a subject image via the photographic optical system.

56. An imaging device, comprising:

a photoelectric conversion element that receives light fluxes, having passed through a pair of pupil areas of a photographic optical system, via a focus detection optical system and outputs a pair of subject image signals;

an image shift detection unit that detects an image shift quantity indicating an extent of image shift manifested by the pair of subject image signals by executing a correlation operation adopting a correlation operation method according to claim 36 on the pair of subject image signals output from the photoelectric conversion element;

a focus detection unit that detects a state of focus adjustment achieved at the photographic optical system based upon the image shift quantity; and an image sensor that captures a subject image via the photographic optical system.

57. A correlation operation method adopted when calculating a degree of correlation manifesting between a first signal data string and a second signal data string, comprising:

a first information generation step of generating first operation data by dividing first data in the first signal data string by nearby data present near the first data;

a second information generation step of generating second operation data by dividing second data in the second signal data string corresponding to the first data by nearby data present near the second data; and a correlation degree detection step of calculating a degree of correlation between the first operation data and the second operation data.

* * * * *